(12) United States Patent
Beshai

(10) Patent No.: US 9,277,302 B2
(45) Date of Patent: Mar. 1, 2016

(54) LARGE-SCALE PACKET SWITCH

(71) Applicant: Maged E. Beshai, Maberly, CA (US)

(72) Inventor: Maged E. Beshai, Maberly, CA (US)

( * ) Notice: Subject to any disclaimer, the term of this patent is extended or adjusted under 35 U.S.C. 154(b) by 57 days.

(21) Appl. No.: 14/094,789

(22) Filed: Dec. 3, 2013

(65) Prior Publication Data

US 2014/0086239 A1 Mar. 27, 2014

Related U.S. Application Data

(62) Division of application No. 12/838,494, filed on Jul. 19, 2010, now Pat. No. 8,605,716.

(51) Int. Cl.
*H04L 12/931* (2013.01)
*H04Q 11/06* (2006.01)
*H04L 12/933* (2013.01)
*H04L 12/937* (2013.01)

(52) U.S. Cl.
CPC ............. *H04Q 11/06* (2013.01); *H04L 49/15* (2013.01); *H04L 49/254* (2013.01); *H04L 49/45* (2013.01)

(58) Field of Classification Search
CPC ....... H04L 49/15; H04L 49/254; H04L 49/45; H04L 49/357; H04L 49/101; H04L 49/10
See application file for complete search history.

(56) References Cited

U.S. PATENT DOCUMENTS

| | | | | |
|---|---|---|---|---|
| 5,150,357 A * | 9/1992 | Hopner et al. | ............... | 370/354 |
| 7,154,887 B2 * | 12/2006 | Wu et al. | ....................... | 370/388 |
| 7,545,808 B2 * | 6/2009 | Sindhu et al. | ................. | 370/389 |
| 8,422,508 B2 * | 4/2013 | Beshai | ........................ | 370/422 |
| 2002/0141423 A1 * | 10/2002 | Namihira | ..................... | 370/411 |
| 2003/0021267 A1 * | 1/2003 | Wu et al. | ....................... | 370/388 |
| 2003/0189938 A1 * | 10/2003 | Beshai | ........................ | 370/396 |
| 2003/0193955 A1 * | 10/2003 | Beshai | ...................... | 370/395.4 |
| 2003/0219037 A1 * | 11/2003 | Toskala et al. | ................ | 370/496 |
| 2008/0317015 A1 * | 12/2008 | Beshai | ........................ | 370/380 |
| 2011/0026541 A1 * | 2/2011 | Beshai | ........................ | 370/422 |
| 2013/0201994 A1 * | 8/2013 | Beshai | ........................ | 370/401 |
| 2014/0064144 A1 * | 3/2014 | Beshai | ........................ | 370/254 |

* cited by examiner

*Primary Examiner* — Fan Ng

(57) ABSTRACT

A packet switch that scales gracefully from a capacity of a fraction of a terabit per second to thousands of terabits per second is disclosed. The packet switch comprises edge nodes interconnected by independent switch units. The switch units are arranged in a matrix having multiple rows and multiple columns and may comprise instantaneous or latent space switches. Each edge node has a channel to a switch unit in each column and a channel from each switch unit in a selected column. A simple path traversing only one of the switch units may be established from each edge node to each other edge node. Where needed, a compound path comprising at most two simple paths may be established for any edge-node pair. In a preferred configuration, the switch units connect at input to orthogonal sets of edge nodes. A distributed control system expedites connection-request processing.

19 Claims, 51 Drawing Sheets

| Originating Edge Node | 4412 First Switch Unit Indices (j,k) | 4414 Index of Intermediate Edge Node | 4416 Second Switch Unit Indices (x,y) | 4418 Indices of Confirming Switch Units | Destination Edge Node |
|---|---|---|---|---|---|
| 2312(10) | (0, 2) | (0) (1) (2) (3) | (4, 0) (4, 1) (4, 2) (4, 3) | (2,2) (0,4) | 2318(17) |
| | (1, 0) | (4) (5) (6) | (4, 1) (4, 2) (4, 3) | (2,2) (1,3) | |
| | (2, 3) | (8) (9) (11) | (4, 2) (4, 3) (4, 0) | (2,2) | |
| | (3, 1) | (12) (14) (15) | (4, 3) (4, 0) (4, 1) | (2,2) (3,1) | |

LARGE-SCALE PACKET SWITCH

CROSS REFERENCE TO RELATED APPLICATIONS

The present application is a division of U.S. patent application Ser. No. 12/838,494 which is a continuation of U.S. patent application Ser. No. 12/119,377. Application Ser. No. 12/119,377 claims the benefit of provisional application 60/945,356 filed Jun. 21, 2007.

FIELD OF THE INVENTION

The present invention relates to communication nodes. In particular, it is directed to a large-scale telecommunication switch which may serve as a versatile edge router or a core node.

BACKGROUND

Network complexity increases sharply with the increase of the mean number of hops for connections traversing a network. The mean number of hops is determined by the network structure and the method of route allocation. Deploying switching nodes of large dimension enables the construction of simple network structures that simplify routing and reduce the mean number of hops. The basic building block of a switching node is a non-blocking switch element. A switching node of large dimension may comprise non-blocking switch elements interconnected in a multi-stage structure and the dimension of the multi-stage switching node is determined by the dimensions of the constituent switch elements and the number of stages. It is well known that the complexity of a multi-stage switching node increases, its efficiency decreases, and its performance deteriorates as the number of stages increases. It is therefore desirable to explore alternative switching-node structures that permit scalability to large dimensions while providing operational simplicity, high performance, and overall efficiency. It is also desirable that a switching node, serving as a packet switch, be versatile with the ability to handle data traffic of different formats, provide multi-granular connections, and handle data of widely varying flow rates.

SUMMARY

The present invention provides a packet switch that scales gracefully to a large dimension and high capacity.

In accordance with one aspect, the present invention provides a switch comprising a plurality of switch units, a plurality of source nodes, and a plurality of sink nodes. Each switch unit has m>1 inward ports and n>1 outward ports. Each source node has an outbound channel to each switch unit of a respective primary set of $\mu$ switch units from among the plurality of switch units, and each sink node has an inbound channel from each switch unit of a respective secondary set of $\nu$ switch units from among the plurality of switch units. The primary set of $\mu$ switch units of each source node and the secondary set of $\nu$ switch units of each sink node are selected so that each source node has a simple switched path to each sink node, where a simple switched path traverses only one switch unit. A simple switched path from each source node to each sink node is realized by selecting the primary sets for the source nodes and the secondary sets for the sink nodes so that each primary set of $\mu$ switch units for any source node has one switch unit in common with each secondary set of $\nu$ switch units for any sink node.

In addition to a simple path from any source node to any sink node, $(\Omega-1)$ independent compound paths, $\Omega=\min(\mu,\nu)$, where a compound path comprises two simple switched paths, may be formed. This requires integrating each source node with a respective sink node into a single switching fabric.

Preferably, the primary sets of switch units are selected to be mutually orthogonal. Thus, a primary set of $\mu$ switch units to which any source node connects and a primary set of $\mu$ switch units to which any other source node connects have at most a predefined number, preferably one, of common switch units.

Each switch unit has a switch-unit controller connecting to an input port and an output port of the switch unit. The time domain is organized into slotted time frames. A switch unit may be implemented as an instantaneous space switch or a latent space switch. An instantaneous space switch transfers a data unit from an inward port to an outward port almost instantly, incurring a switching delay which is much smaller than a time slot of the slotted time frame. A latent space switch introduces a systematic delay which is a function of the relative positions of an inward port and an outward port of a connection in order to avoid contention for an outward port. A preferred latent space switch comprises a first rotator, connecting the m inward ports and the switch-unit controller to a bank of at least (m+1) transit memory devices, and a second rotator connecting the bank of at least (m+1) transit memory devices to the n outward ports and the switch-unit controller.

The m inward ports of a switch unit receive inward control signals from respective source nodes during predefined inward control time slots of a slotted time frame and the n outward ports transmit outward control signals to respective sink nodes during predefined outward control time slots of the slotted time frame. In a switch unit configured as an instantaneous space switch, the inward control time slots are spread over the slotted time frame, and the outward control time slots are spread over the slotted time frame so that control-signal transfer to and from the switch-unit controller is contention free. In a switch unit configured as a latent space switch, the m inward control time slots are preferably concurrent, thereby permitting contention-free transfer of m inward control signals from the m inward ports to different transit memory devices to be further transferred during consecutive time slots to the switch-unit controller. The switch-unit controller transmits control signals directed to the n outward ports during consecutive time slots and the outward ports are selected in an order which ensures that the n outward control time slots are concurrent.

In accordance with another aspect, the present invention provides a switch comprising a plurality of switch units, a plurality of sink nodes, and a plurality of source nodes where each source node is integrated with a respective sink node to form an integrated edge node. Each switch unit has a number m of inward ports and a number n of outward ports, m>1, n>1, and the switch units are arranged in a matrix having $\nu$ rows and $\mu$ columns, $\nu>1$, $\mu>1$, where $\nu$ and $\mu$ are selected so that $\nu \times m = \mu \times n$. Each sink node has an inbound channel from each of $\nu$ switch units of one of the $\mu$ columns and each source node has an outbound channel to each of selected $\mu$ switch units from among the plurality of switch units, where the selected $\mu$ switch units belong to $\mu$ different columns.

Preferably, at least two switch units of the selected $\mu$ switch units are in different rows of the matrix and a first set of source nodes connecting to any switch unit is orthogonal to a second set of source nodes connecting to any other switch unit, where any two sets of source nodes are said to be orthogonal if the two sets have a number of common source nodes not exceeding a predefined upper bound which defines an orthogonality index. In a special case where n=m, ν=μ, m is a prime number, and μ is a prime number, the connectivity of switch units to source nodes is preferably arranged such that a switch unit in column c, $0 \le c < \mu$, and row r, $0 \le r < \nu$, connects to a set of m source nodes of indices:

$$\{j \times (1 + m \times c) + m \times r\}_{modulo\ S},\ 0 \le j < m,$$

where $S = \mu \times m$ is a number of source nodes in the plurality of source nodes and the source nodes in the plurality of source nodes are indexed sequentially between 0 and (S−1). This connectivity pattern ensures that the sets of source nodes connecting to the switch units in the plurality of switch units are mutually orthogonal with an orthogonality index of 1.

Each switch unit has a time-multiplexed switching fabric and a switch-unit controller for scheduling connections. An outbound channel from an edge node carries time-multiplexed outbound signals arranged in a repetitive time-frame having a number T of time slots exceeding the number m and exceeding the number n. An inbound channel to an edge node carries time-multiplexed inbound signals from a switch unit. A switch unit may be configured as an instantaneous space switch or a latent space switch.

An outbound channel from an edge node to a switch unit carries inward control signals during a cyclic inward control time slot within the repetitive time frame, to be switched to a switch-unit controller of the switch unit. An outward channel from a switch unit to an edge node carries outward control signals from the switch-unit controller of the switch unit to the edge controller during a cyclic outward control time slot within the time frame. The inward control time slot and the outward control time slot are preferably permanently assigned as control time slots.

A simple path from a first source node from among the plurality of source nodes to a first sink node having an inbound channel from each switch unit in a column c, $0 \le c < \mu$, from among the μ columns, traverses one switch unit in column c. If a simple path is not available, a compound path is sought from the first source node to the first sink node. The compound path traverses: (1) a first switch unit to which the first source node has an outbound channel, the first switch unit being in column κ, $0 \le \kappa < \mu$, $\kappa \ne c$, from among the μ columns; (2) a second sink node having an inbound channel (outward channel) from the first switch unit; and (3) a second switch unit in column c to which a second source node integrated with the second sink node has an outbound channel.

The integrated edge node comprises a plurality of input ports, a plurality of output ports, and an edge controller communicatively coupled to the input ports and the output ports. The plurality of input ports is divided into ν* ingress ports each connecting to a respective plurality of data sources and ν inbound ports each having an inbound channel from an outward port of a switch unit. The plurality of output ports is divided into f egress ports each connecting to a respective plurality of data sinks and μ outbound ports each connecting to an inward port of a switch unit. To account for compound paths, μ exceeds μ* and ν exceeds ν*. The edge node transfers data blocks from any input port (ingress port or inbound port) to any outbound port and transfers data segments from any input port to any egress port, where a data block comprises an integer number of data segments.

The integrated edge node may be implemented as a shared-memory switching device having (ν*+ν) input ports and (μ*+μ) output ports. To realize a switch of dimension D×D, having a total number, D, of input ports and a total number D of output ports, and setting μ=ν*, μ=ν, m=n, the values of μ*, μ, and m are selected such that $\mu^* \times \mu \times m \ge D$.

In accordance with a further aspect, the present invention provides a switch comprising a plurality of latent space switches and a plurality of edge nodes. An edge controller is associated with each edge node and a switch-unit controller is associated with each latent space switch. Each latent space switch has m>1 inward ports and n>1 outward ports, and the latent space switches are arranged in a matrix having ν rows and μ columns, ν>1, μ>1, where ν and μ are selected so that ν×m=μ×n. Each edge node has an inbound channel from each of ν latent space switches of one of the μ columns and an outbound channel to each latent space switch of a set of μ latent space switches belonging to μ different columns. The edge controller stores a set of identifiers of compound paths from each edge node to each other edge node, each of the compound paths traversing two latent space switches. The edge controller preferably sorts the identifiers of compound paths according to switching latency and selects a path for a connection from a source edge node to a destination edge node according to the switching latency.

Each latent space switch of the plurality of latent space switches comprises a first rotator connecting the m inward ports and the switch-unit controller to a bank of at least (m+1) transit memory devices and a second rotator connecting the bank of at least (m+1) transit memory devices to the n outward ports and the switch-unit controller. Preferably, the plurality of latent switches comprises a first set of latent space switches of a first type interleaved with a second set of latent space switches of a second type. In a latent space switch of the first type, the first rotator is an ascending rotator and the second rotator is a descending rotator. In a latent space switch of the second type, the first rotator is a descending rotator and the second rotator is an ascending rotator. Such an arrangement enables formation of compound paths of distinctly different systematic switching delays from one edge node to another, and hence provides an opportunity to select a path of a relatively small switching delay for a given connection.

In accordance with a further aspect, the present invention provides a method of scheduling applied to a switch having a plurality of switch units arranged in a matrix of ν>1 rows and μ>1 columns, a plurality of source nodes each source node having an outbound channel to a switch unit in each of the μ columns, and a plurality of sink nodes each sink node having an inbound channel from each switch unit of one of the μ columns. The method comprises an initial step of receiving a connection request specifying an identifier of a first source-node, an identifier of a first sink-node, and a number σ of time slots in a slotted time frame. The method further comprises a first process of scheduling a connection along a simple path, the first process comprising steps of: identifying a column k to which the first sink-node connects; identifying a switch unit in the column k to which the first source node connects; and performing a first-order temporal matching process to allocate σ time slots during which the switch unit has free paths connecting the first source node to the first sink node.

The method comprises a second process of scheduling a connection along a compound path, the second process comprising steps of: identifying a column k to which the first sink-node connects; selecting a first switch unit in column j, j≠k, to which the first source node connects; selecting a second sink node connecting to the first switch unit, the second sink node being integrated with a second source node; performing a first-order temporal matching process to allocate σ time slots during which the first switch unit has free paths connecting the first source node to the second sink node; selecting a second switch unit in column k to which the second source node connects; and performing a first-order temporal matching process to allocate σ time slots during which the second switch unit has free paths connecting the second source node to the first sink node.

BRIEF DESCRIPTION OF THE DRAWINGS

Embodiments of the present invention will be further described with reference to the accompanying exemplary drawings, in which:

FIG. 29, FIG. 30, FIG. 31, and FIG. 32 illustrate connectivity patterns of parallel matrices of switch units in the switching node of FIG. 27 in accordance with an embodiment of the present invention;

FIG. 44 lists a multiplicity of compound paths for a given originating source node and destination sink node through the switching node of FIG. 23 or FIG. 27 in accordance with an embodiment of the present invention;

FIG. 49 illustrates an alternative connectivity pattern of switch units in the switch of FIG. 23 which guarantees a simple path from each source node to each sink node in accordance with an embodiment of the present invention;

DETAILED DESCRIPTION

Terminology

Figure 1:
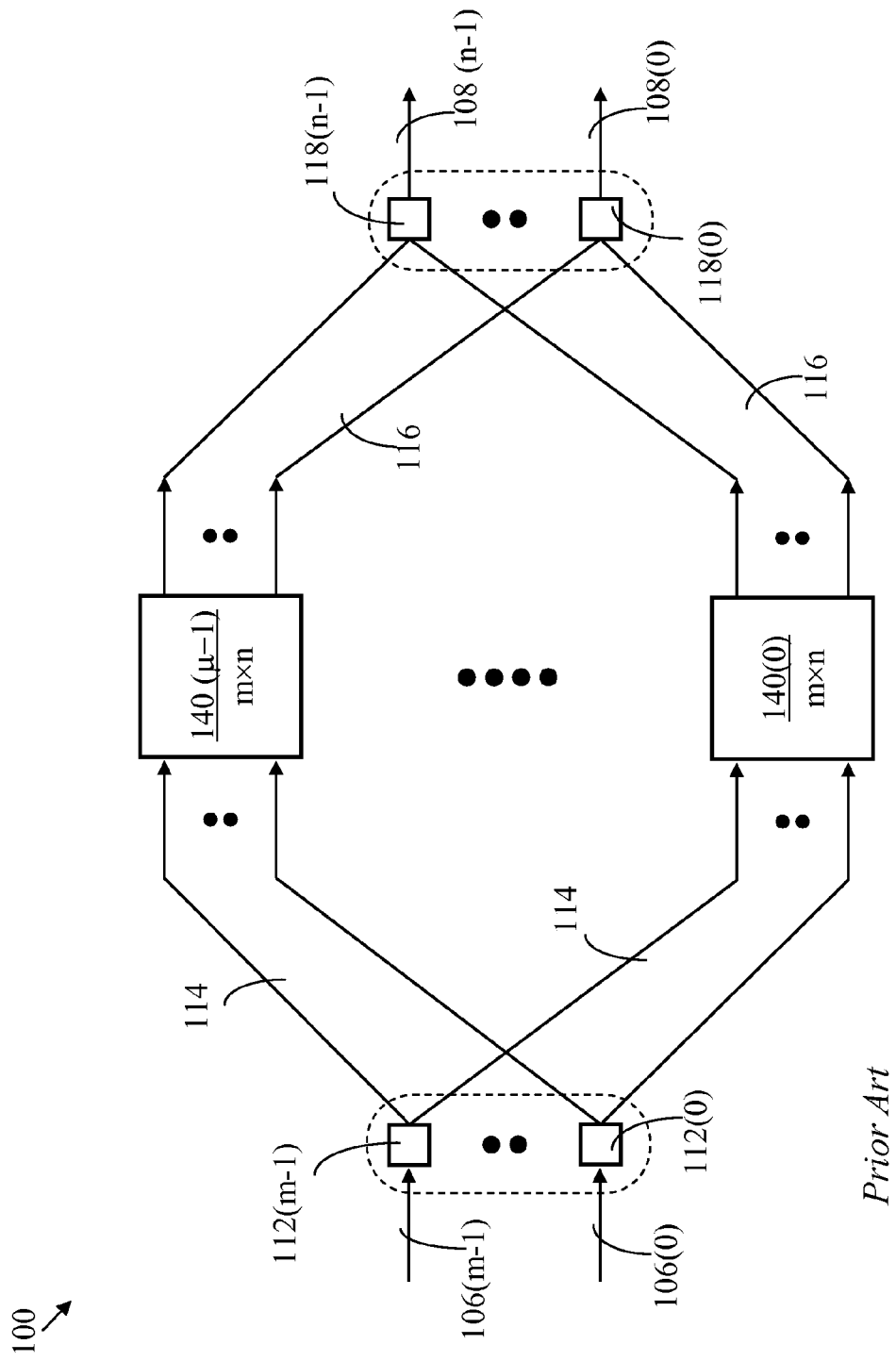
FIG. 1 illustrates a prior-art switching node comprising source nodes connecting to sink nodes through independent switch units where each source node connects to each switch unit and each switch unit connects to each sink node.

First-Order matching process: A first-order matching process, for a connection requesting a single time slot or multiple time slots, requires that two ports traversed by the connection be free during a sufficient number of time slots in a predefined time frame.

$N^{th}$-Order matching process: An $N^{th}$-order matching process, for a connection requesting a single time slot or multiple time slots, requires that (N+1) corresponding ports traversed by the connection be simultaneously free during a sufficient number of time slots, where $N \geq 1$.

Allocable resource: A resource, such as a channel, that is available (free or not currently reserved) for allocation to a connection is an "allocable resource"—where a resource is available during specific time slots in a slotted time frame, each of the specific time slots is herein called an "allocable time slot".

Switching node or switch: The switching node of the present invention, synonymously called "switch" for brevity, comprises source nodes, sink nodes, and at least one switch plane that comprises independent switch units. The switching node may serve as a packet switch.

Switch unit: In the present application, the term refers to a space switch connecting source nodes to sink nodes.

Switch plane: A switch plane, according to the present invention, comprises a matrix of independent switch units.

Source node: A source node receives data from data sources and sends the data to a switch plane for delivery to sink nodes.

Sink node: A sink node receives data from a switch plane and delivers the data to data sinks.

Edge node: An edge node comprises a source node and a sink node which may be integrated to share memory and control. Thus, an edge node has inputs for receiving data from data sources and from switch units of a switch plane, and has outputs for sending data to data sinks and switch units of the switch plane.

Switch element: An edge node may comprise a number of switch elements, where each switch element is a non-blocking, contention-free, switching device.

Ingress port: An input port of a source node is called an ingress port. In an integrated edge node, the term applies to an input port that receives data from data sources.

Egress port: An output port of a sink node is called an egress port. In an integrated edge node, an output port that connects to data sinks is also called an egress port.

Inbound port: An input port of a sink node is called an inbound port. In an integrated edge node, the term applies to an input port that receives data from a switch unit.

Outbound port: An output port of a source node is called an outbound port. In an integrated edge node, the term applies to an output port that connects to a switch unit.

Inward port: An input port, of a switch unit, which receives data from a source node, is identified as an 'inward port'.

Outward Port: An output port, of a switch unit, which transmits data to a sink node, is identified as an 'outward port'.

Outbound/Inward Channel: A communication channel from an outbound port of a source node to an inward port of a switch unit is an "outbound channel" from the source node and an "inward channel" to the switch unit.

Inbound/Outward channel: A communication channel from an outward port of a switch unit to an inbound port of a sink node is an "outward channel" from the switch unit and an "inbound channel" to the sink node.

Simple path: A path from a source node to a sink node (from an edge node to another edge node) which traverses only one switch unit is herein called a "simple path".

Compound path: A path from a first edge node to a second edge node which traverses a first switch unit, an intermediate edge node, and a second switch unit is herein called a "compound path". A compound path comprises two joined simple paths.

Temporal multiplexer: A temporal multiplexer is a device for time interleaving data from multiple inputs onto a common output.

Temporal demultiplexer: A temporal demultiplexer is a device for separating time-interleaved data received from a common input.

Rotator: The term "rotator" refers to a device having multiple inlet ports and multiple outlet ports where each inlet port cyclically connects to each outlet port in a predefined order. A rotator is a simple device that scales easily to a very high dimension, i.e., a large number of inlet ports and a large number of outlet ports.

Ascending rotator: A rotator having a plurality of inlet ports and a plurality of sequentially labeled outlet ports, where each inlet port cyclically accesses the outlet ports in an ascending label order, is called an ascending rotator.

Descending rotator: A rotator having a plurality of inlet ports and a plurality of sequentially labeled outlet ports, where each inlet port cyclically accesses the outlet ports in a descending label order, is called a descending rotator.

Inward control signal: A signal containing control data from an edge controller to a switch-unit controller is herein called an inward control signal Outward control signal: A signal containing control data from a switch-unit controller to an edge controller is herein called an outward control signal Inward control time slot: A time slot, within a slotted time frame, reserved for transferring an inward control signal is herein called an inward control time slot.

Outward control time slot: A time slot, within a slotted time frame, reserved for transferring an outward control signal is herein called an outward control time slot.

Orthogonal sets: Any two sets of nodes are said to be orthogonal if the two sets have a number of common nodes not exceeding a predefined upper bound.

Orthogonality Index: A preset upper bound of a number of common nodes in any two sets of nodes defines an orthogonality index; an orthogonality index preferably equals 1.

LIST OF REFERENCE NUMERALS

100: A prior-art switch comprising source nodes, sink node, and switch units
106: Ingress channel in switch 100
108: Egress channel in switch 100
112: Source node in switch 100
114: Channel from a source node 112 to a switch unit 140 in switch 100
116: Channel from a switch unit 140 to a sink node 118
118: Sink node in switch 100
140: Switch unit in switch 100
200: A switch according to the present invention comprising source nodes, sink nodes, and switch units arranged in a matrix structure
210: Matrix of switch units in switch 200
212: Source node in switch 200
214: Channel from a source node 212 to a switch unit 240 in switch 200
216: Channel from a switch unit 240 to a sink node 218 in switch 200
218: Sink node in switch 200
220: Group of source nodes 212
230: Group of sink nodes 218
240: Switch unit in switch 200
300: A switch according to the present invention similar to switch 200 having a larger number of rows and columns of switch units
306: Ingress channel in switch 300
308: Egress channel in switch 300
310: Matrix of switch units in switch 300
312: Source node in switch 300
314: Outbound channel of source node 312, which is also an inward channel to a switch unit 340
316: An inbound channel to sink node 318, which is also called an outward channel from a switch unit 340 to sink node 318
314(1): First channel from a source node 312 to a switch unit 340 in a simple path (FIG. 6)
316(1): Second channel from a switch unit 340 to a destination sink node 318 in a simple path (FIG. 6)
314(2): First channel in a compound path from a source node 312 to an intermediate switch unit 340 (FIG. 6)
316(2): Second channel in a compound path from an intermediate switch unit 340 to an intermediate edge node 312/318 (FIG. 6)
314(3): Third channel in a compound path from an intermediate edge node 312/318 to a switch unit 340 (FIG. 6)
316(3): Fourth channel in a compound path from a switch unit 340 to a destination sink node 318 (FIG. 6)
318: Sink node in switch 300
320: Group of source nodes 312
330: Group of sink nodes 318
340: Switch unit in switch 300
653: Internal path within an intermediate edge node 312/318
800: Integrated edge-node Edge node
900: Edge node combining a source node 312 and a sink node 318
920: Edge-node switch fabric
925: Configuration controller (a slave controller) for establishing connections within the switch fabric 920
926: An input port, also called an ingress port, of an edge node receiving data from data sources,
928: An output port, also called an egress port, of an edge node transmitting data to data sinks
936: An input port, also called an inbound port, of an edge node receiving data from a switch unit 340
938: An output port, also called an outbound port of an edge node transmitting data to a switch unit 340
950: Edge controller of edge node 900
951: Internal path from an ingress port 926 to an egress port 928 within switch fabric 920
952: Internal path within switch fabric 920 from an ingress port 926 to an outbound port 938 connecting edge node 900 to a switch unit 340
953: Internal path within switch fabric 920 from an inbound port 936 of edge node 900 to an egress port 928 of edge node 900
954: Internal path within switch fabric 920 from an inbound port 936 to an outbound port 938 of edge node 900
955: Control channel from an input port 926 or 936 to a temporal multiplexer 957
957: Temporal multiplexer combining control signals from input ports 926 and 936 for delivery to edge controller 950
958: Temporal demultiplexer separating time-interleaved control signals received from edge controller 950 for delivery to individual input ports 926 and 936
962: Channel connecting temporal multiplexer 957 to edge controller 950
964: Channel connecting edge controller 950 to temporal demultiplexer 958
965: Control channel from temporal demultiplexer 958 to an input port 926 or 936
982: Channel connecting edge controller 950 to temporal demultiplexer 987
985: Control channel from temporal demultiplexer 987 to an output port 928 or 938
987: Temporal demultiplexer separating time-interleaved control signals received from edge controller 950 for delivery to individual output ports 928 and 938
1020: Data block comprising a number of data segments 1022
1021: Data block comprising a number of packets 1023 of arbitrary sizes
1022: Data segment
1023: Data packet of arbitrary size
1124: Input memory placed at an input port of edge node 900
1125: Logical queue in input memory 1124 associated with an outbound port 938 of edge node 900
1126: Logical queue in input memory 1124 associated with egress ports 928
1127: Logical queue in input memory 1124 associated with edge controller 950
1134: Output memory placed at an outbound port of edge node 900

1138: Logical queue in output memory 1134 associated with an outward port of a switch unit 340 (or equivalently to a corresponding destination sink node 318)
1139: Logical queue in output memory 1134 associated with a controller of a switch unit 340 to which the outbound port connects
1200: A shared-memory edge node handling data segments and/or data blocks
1211: Ingress channel to edge node 1200
1212: Inbound channel to edge node 1200
1220: Input ports of edge node 1200 comprising both ingress ports 926 and inbound ports 936
1223: Internal channel connecting an input port 1220 to a temporal multiplexer 1224
1224: A temporal multiplexer for providing cyclical access of input ports 1220 to shared memory 1230 through bus 1225
1225: Bus connecting temporal multiplexer 1224 to shared memory 1230
1230: Shared memory for holding data segments 1233 and/or entire data blocks 1234
1231: A logical section of shared memory 1230 used for competitive data-segment switching
1232: A logical section of shared memory 1230 used for contention-free data-block switching
1233: A data segment held in logical-section 1231 of shared memory 1230
1234: A data block held in logical-section 1232 of shared memory 1230.
1240: Output ports of edge node 1200 comprising both egress ports 928 and outbound ports 938
1243: Internal channel connecting a temporal demultiplexer unit 1244 to an output port 1240
1244: A temporal demultiplexer for providing cyclical access of output ports 1240 to shared memory 1230 through bus 1245
1245: Bus connecting shared memory 1230 to temporal demultiplexer 1244
1251: Egress channel from edge node 1200
1252: Outbound channel from edge node 1200
1304: Ascending rotator (clockwise rotator)
1306: Descending rotator (counterclockwise rotator)
1320: Switch element
1325: Integrated edge node comprising switch elements 1320, ascending rotator 1304, and descending rotator 1306
1326: Access input port of switch element 1320 (ingress port 926 or inbound port 936)
1327: First internal input port of switch element 1320
1328: Second internal input port of switch element 1320
1336: Access output port of switch element 1320 (egress port 928 or outbound port 938)
1337: First internal output port of switch element 1320
1338: Second internal output port of switch element 1320
1346: Input channel to switch-element 1320
1347: Internal channel from ascending rotator 1304 to input port 1327
1348: Internal channel from descending rotator 1306 to input port 1328
1356: Output channel from switch-element 1320
1357: Internal channel from output port 1337 to ascending rotator 1304
1358: Internal channel from output port 1338 to descending rotator 1306
1420: Memory device
1421: Temporal multiplexer
1422: Temporal demultiplexer
1441: Unprocessed data segment from source at input of a source switch element 1320
1442: Data segment, at input of an intermediate switch element 1320, sent from a source switch element 1320
1443: Data segment, at input of a sink switch element 1320, sent from an intermediate switch unit
1452: Output data segment at a source switch element 1320
1453: Output data segment at an intermediate switch element 1320
1461: Delivered data segment originating and terminating within same switch element 1320
1462: Delivered data segment traversing one rotator
1463: Delivered data segment traversing two rotators
1602: Set of fresh data segments received from data sources
1604: Set of data segments ready for transfer from memory devices 1420 to data sinks
1606: Set of data segments to be transferred independently from a memory device 1420 to another memory device 1420
1608: Set of data segments forming data blocks where the data segments of each data block are to be transferred consecutively to another memory device 1420
1622: A data segment in set 1602
1624: A data segment in set 1604
1626: A data segment in set 1606
1628: A data segment in set 1608
1629: A null data segment for completing a data block
1630: Array representing organization of a memory device 1420
1632: A data block comprising data segments 1628 and possibly complemented with a number of null data segments 1629
1714: Inward channel to a switch unit
1715: Internal path in a switch fabric
1716: Outward channel from a switch unit
1740: Instantaneous space switch
1742: Switch fabric of a latent space switch 1750
1745: Systematic delay component in a latent space switch 1750
1750: Latent space switch
1800: Latent space switch unit comprising a primary rotator, a bank of transit memory devices, a secondary rotator, and a controller
1812: Inward channel to a latent space switch 1800
1814: Inward port of latent space switch 1800
1816: Outward port of latent space switch 1800
1818: Outward channel from latent space switch 1800
1824: Input port connecting to controller 1845
1826: Output port connecting to controller 1845
1837: Primary (input) rotator of latent space switch 1800
1838: Transit memory device in latent space switch 1800
1839: Secondary (output) rotator in latent space switch 1800
1845: Controller of latent space switch 1800
1850: Rotating-access latent space switch
2200: Arrangement of latent space switches of opposite rotation phases
2300: Exemplary switching node having switch units 2340 arranged in a matrix of five rows and five columns
2306: Ingress channel in switch 2300
2308: Egress channel in switch 2300
2310: Matrix of switch units in switch 2300
2312: Source node in switch 2300
2314: Channel from source node 2312 to a switch unit 2340
2316: Channel from a switch unit 3240 to a sink node 2318 in switch 2300
2318: Sink node in switch 2300
2340: Switch unit in switch 2300

2420: Group of source nodes 2312 connecting to a switch unit 2340

2430: Group of sink nodes 2318 connecting to a switch unit 2340 in switch 2300

2520: Orthogonal groups of source nodes 2312 connecting to switch units 2340

2600: Matrix identifying source nodes connecting to switch units in a switch 2300

2610: Sub-matrix of matrix 2600

2620: Index of a source edge node 2312

2621: An indicator of a channel connecting a source node 2312 to a switch unit 2340

2700: A switch comprising source nodes 2712, sink nodes 2718, and multiple switch planes 2750 each switch plane comprising switch units 2740

2706: Ingress channel in switch 2700

2708: Egress channel in switch 2700

2712: Source node in switch 2700

2714: Channel from a source node 2712 to a switch unit 2740 in switch 2700

2716: Channel from a switch unit 2740 to a sink node 2718 in switch 2700

2718: Sink node in switch 2700

2740: Switch unit in multi-plane switch 2700

2750: Switch planes individually identified as 2750($p$), 0≤p<Π

2920: Group of source nodes 2712 in switch plane 2750(1)

3020: Group of source nodes 2712 in switch plane 2750(2)

3120: Group of source nodes 2712 in switch plane 2750(3)

3220: Group of source nodes 2712 in switch plane 2750(4)

3400: Switching node, similar to exemplary switching node 2300, having 20 edge nodes 2312/2318 interconnected by 25 switch units 2740 each of dimension 4×4, used for illustrating setup of a simple connection

3450: Channel from a source node 2312(18) to switch unit 2340(1,4)

3451: Channel from switch unit 2340(1,4) to sink node 2318 (7)

3452: Channel from a source node 2312(7) to switch unit 2340(4,1)

3453: Channel from switch unit 2340(4,1) to sink node 2318 (18)

3550: Channel from a source node 2312(18) to switch unit 2340(2,4)

3551: Channel from switch unit 2340(2,4) to sink node 2318 (8)

3552: Channel from a source node 2312(8) to switch unit 2340(1,2)

3553: Channel from switch unit 2340(1,2) to sink node 2318 (7)

3554: Channel from a source node 2312(7) to switch unit 2340(4,1)

3555: Channel from switch unit 2340(4,1) to sink node 2318 (18)

3556: Channel from a source node 2312(7) to switch unit 2340(2,1)

3557: Channel from switch unit 2340(2,1) to sink node 2318 (8)

3602: Array indexed by destination sink-node numbers used by an edge controller for determining a column number corresponding to a destination sink-node in a switch 300 (2300, 2750) having 5100 edge nodes (integrated source/sink nodes)

3604: An array used by an edge controller and indexed by column numbers of a matrix of switch units 340 for identifying an outbound port number corresponding to a column number in a switch 300 having switch units arranged in 20 columns

3616: Column number

3880: Control time slot associated with an input port of a switch unit 2340 using an instantaneous space switch

3890: Control time slot associated with an output port of a switch unit 2340 using an instantaneous space switch

3980: Control time slot associated with an input port of a switch unit 2340 using a latent space switch

3990: Control time slot associated with an output port of a switch unit 2340 using a latent space switch

4020: A first message sent by a source node to establish a direct connection to a sink node

4022: A field in message 4020 identifying a source node of a connection

4024: A field in message 4020 identifying a sink node of a connection

4026: A field in message 4020 indicating a specified number σ of time slots per time frame for a connection

4028: A field in message 4020 used by a switch unit 2340 to indicate the availability or otherwise of a simple path.

4030: A list in message 4020 of identifiers of allocated time slots for a simple path

4040: A second message sent by a source node to establish a compound connection to a sink node

4042: A field in message 4040 identifying a source node of a connection

4044: A field in message 4040 identifying a sink node of a connection

4046: A field in message 4040 indicating a specified number σ of time slots per time frame for a connection

4048: A field in message 4040 to be used by a first switch unit 2340 to indicate the availability or otherwise of a path to an intermediate edge node.

4050: A list in message 4040 of identifiers of allocable time slots for an initial first segment of a compound path

4052: A field in message 4040 identifying an intermediate edge node

4054: A field used by a second switch unit 2340 to indicate availability or otherwise of a complementing second part of a compound connection

4060: A list in message 4040 of identifiers of allocated time slots for a complementing second part of a compound path

4110: Input occupancy matrix used by a controller of a switch unit in a switch of the type of switch 300 (2300, 2700)

4120: Output occupancy matrix used in conjunction with input-occupancy matrix 4110

4252, 4255, 4352, 4353, 4354, 4355: Paths from switch units to sink nodes

4400: Table of compound paths from a source node to a sink node in an exemplary switching node

4412: Column in table 4400 identifying candidate switch units for setting up a first part of a compound connection

4414: Column in table 4400 identifying candidate intermediate edge nodes in a compound path

4416: Column in table 4400 identifying candidate switch units for setting up a second part of a compound connection

4418: Column in table 4400 identifying switch units which may be used for communicating a result of setting up a compound connection The following reference numerals refer to steps of path setup processes as described in FIGS. 45, 46, 47, and 48:

4520, 4522, 4524, 4526, 4528, 4530, 4532, 4534, 4536, 4537, 4538, 4540, 4542

4620, 4622, 4624, 4626, 4628, 4630,

4720, 4730, 4740,

4820, 4822, 4824, 4826, 4828, 4830, 4832, 4834, 4840.

5014: A channel from a source node 2312 to a switch unit 2340 in an arrangement where orthogonal sets of source nodes 2312 connect to switch units 340 of a matrix 310

5016: A channel from a switch unit 2340 to a sink node where a set of sink nodes connects to all switch units 340 of one column of matrix 310

5184: Internal traffic from ingress ports to outbound ports in a symmetrical edge node 5186: Internal traffic from inbound ports to egress ports in a symmetrical edge node 5188: Transit traffic from inbound ports to outbound ports in a symmetrical edge node 5194: Internal traffic from ingress ports to outbound ports in an asymmetrical edge node 5196: Internal traffic from inbound ports to egress ports in an asymmetrical edge node 5198: Transit traffic from inbound ports to outbound ports in an asymmetrical edge node Switch Architecture FIG. 1 illustrates a known switch 100 comprising a plurality of switch units 140, individually identified as 140(0) to 140($\mu$−1), a plurality of source nodes 112, individually identified as 112(0) to 112(*m*−1), and a plurality of sink nodes 118 individually identified as 118(0) to 118(*n*−1), where $\mu$>1, m>1, and n>1. Each switch unit 140 is of dimension m×n, having m input ports and n output ports. Each source node 112 has a channel 106 from data sources and a channel 114 to each switch unit 140. Each sink node 118 has a channel 116 from each switch unit 140 and a channel 108 to data sinks. Thus, the number of source nodes 112 is limited by the number m of input ports of a switch unit 140 and the number of sink nodes is limited by the number n of output ports of a switch unit 140. If m=64, for example, the number of source nodes 112 would be limited to 64.

Figure 2:
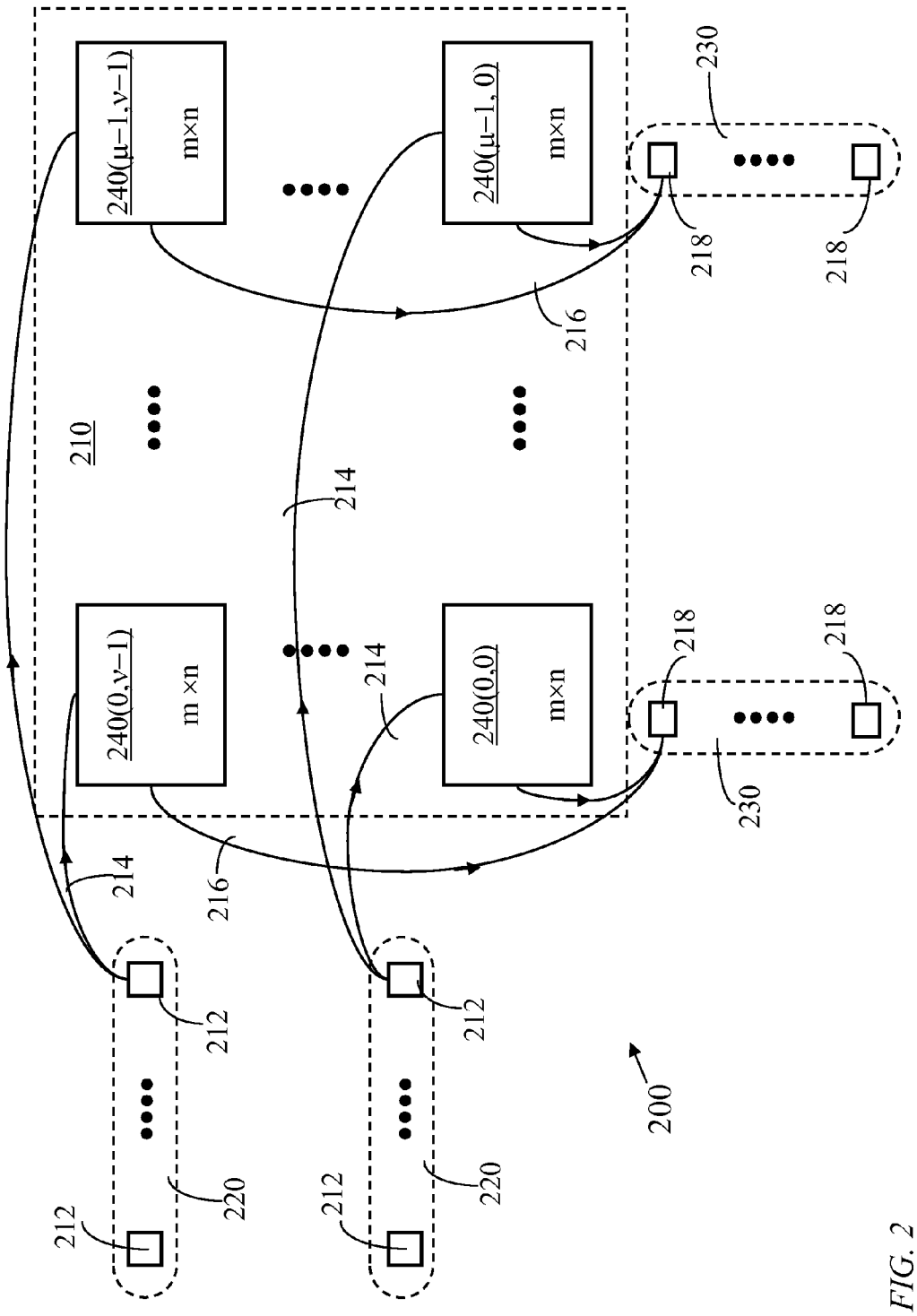
FIG. 2 illustrates a switching node comprising source nodes connecting to sink nodes through independent switch units where each source node connects to a respective primary set of switch units and each sink node connects to a respective secondary set of switch units in accordance with an embodiment of the present invention.

FIG. 2 illustrates a switch 200 in accordance with the present invention comprising a plurality of switch units 240 each of dimension m×n (having m input ports and n output ports) arranged in a matrix 210 having $\mu$>1 columns and v>1 rows, a plurality of source nodes 212 each source node 212 having a channel 214 to an input port of each switch unit 240 in one of the $\mu$ columns, and a plurality of sink nodes 218 each sink node 218 associated exclusively with a column of the $\mu$ columns and having a channel 216 from an output port of each switch unit 240 in the column. The maximum number of source nodes in a group 220 of source nodes connecting to a row in matrix 210 is m and the maximum number of sink nodes in a group 230 of sink nodes connecting to a column in matrix 210 is n. With $\mu$ columns and v rows, the maximum total number of source nodes in switch 200 is m×v and the maximum total number of sink nodes is n×$\mu$. As will be described below, each source node 212 is preferably paired with a sink node 218 to form an integrated edge node. Thus, the values of m, n, $\mu$ and v are preferably selected so that m×v=n×$\mu$.

With separate source nodes 212 and sink nodes 218, switch 200 would be a rigid switch which would function properly only under spatial traffic balance where the traffic from each source node is directed equitably to sink-node groups connecting to the $\mu$ columns. A basic requirement of any telecommunications switch is that it provides internal paths from input to output regardless of the spatial distribution of traffic, i.e., the switch must be agile.

To render switch 200 agile, each source node 212 may be integrated with a sink node 218 to form an edge node 212/218 which may then provide a transit function where needed. Additionally, each edge node may provide appropriate internal expansion to compensate for the capacity consumed in providing the transit function. With integrated source nodes and sink nodes, m×v=n×$\mu$. With m=n=256, for example, and $\mu$=v=32, the number of integrated edge nodes would be limited to 8192.

Figure 3:
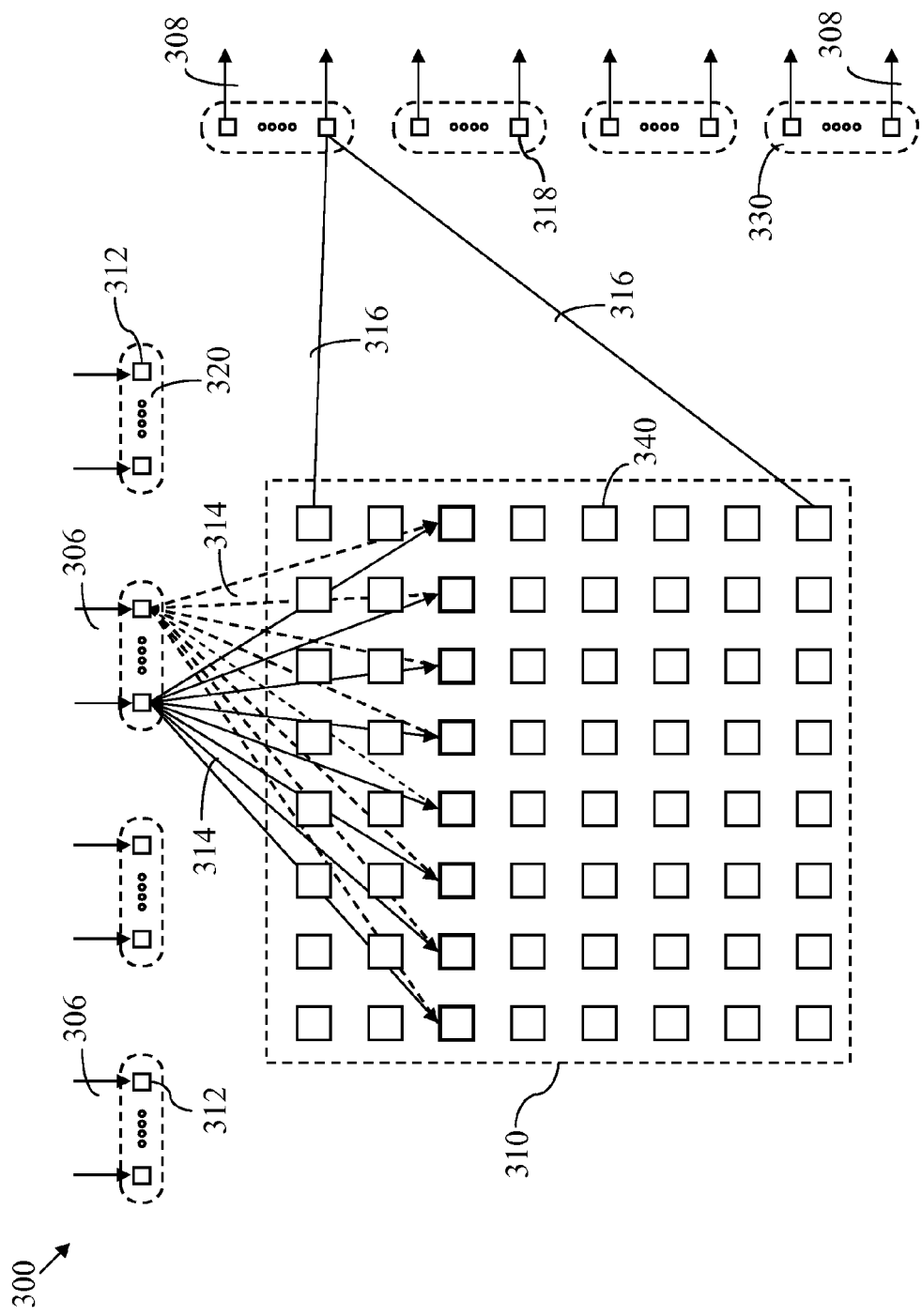
FIG. 3 illustrates grouping of edge nodes in a switching node and connectivity of an edge-node group to a row in a matrix of switch units in accordance with an embodiment of the present invention.
Figure 4:
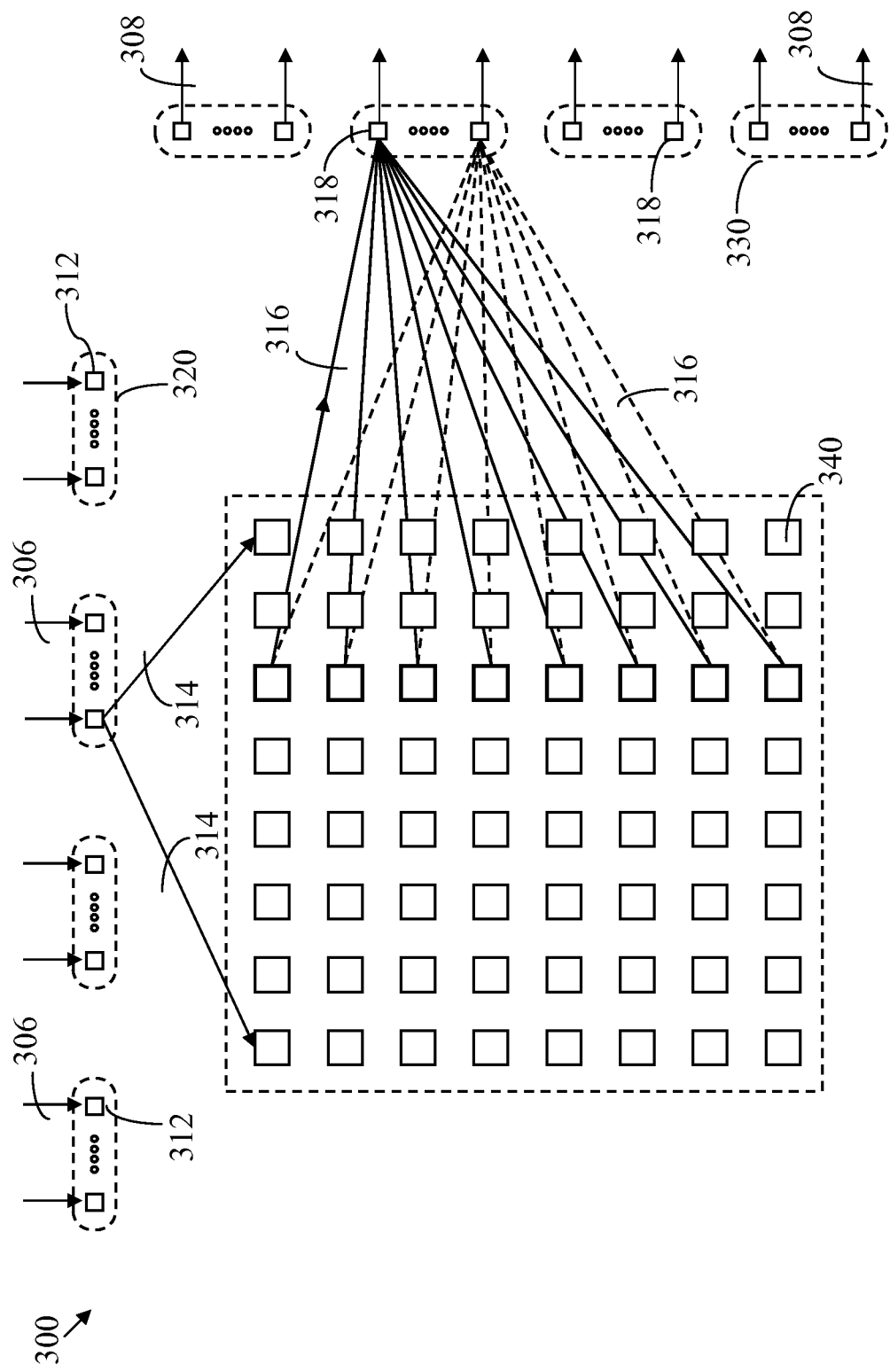
FIG. 4 illustrates an edge-node group receiving data through switch units of a column in the matrix of switch units in the switching node of FIG. 3 in accordance with an embodiment of the present invention.

FIG. 3 illustrates a switching node 300 comprising a plurality of source nodes 312 arranged in groups 320 of source nodes, a plurality of independent switch units 340 logically arranged into a matrix 310 having v rows and $\mu$ columns, and a plurality of sink nodes 318 arranged in groups 330. None of the switch units 340 is directly connected to any other switch unit 340. Each source node 312 directly connects to one switch unit in each column of switch units 340. A source node 312 has an outbound channel 314 to each switch unit in a selected row of switch units 340 in matrix 310 as indicated in FIG. 3. A sink node 318 has an inbound channel 316 from each switch unit in a selected column of switch units 340 in matrix 310 as indicated in FIG. 4.

Figure 5:
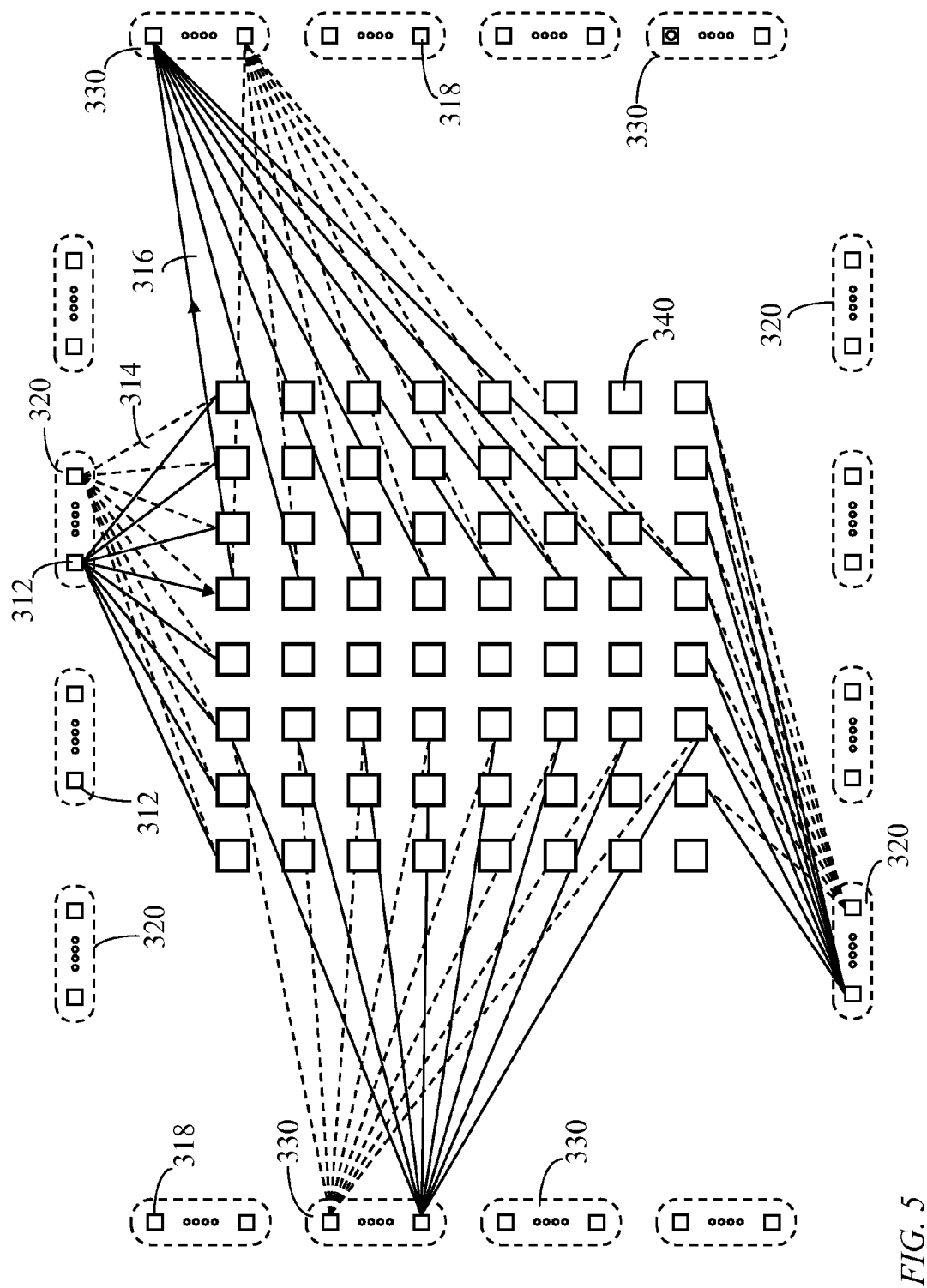
FIG. 5 illustrates a connectivity pattern of edge nodes to the switch-unit matrix of the switching node of FIG. 3.

FIG. 5 illustrates connections from source nodes 312 of selected source-node groups 320 to switch units 340 in respective rows and connections to sink nodes 318 of selected sink-node groups 330 from switch units in respective columns. A simple path from a source node 312 to a sink node 318 traverses one switch unit 340. A compound path from a source node 312 to a sink node 318 traverses two switch units 340 and an intermediate integrated edge node 312/318. With a typical spatial traffic-distribution imbalance, a proportion of traffic may be internally routed through compound paths each traversing two switch units 340. There are ($\Omega$−1) non-intersecting compound path from any source node to any sink node (from any edge node to any other edge node), where $\Omega$ is the lesser of $\mu$ and v: $\Omega$=min($\mu$,v). Preferably $\mu$=v, hence $\Omega$=$\mu$.

Figure 6:
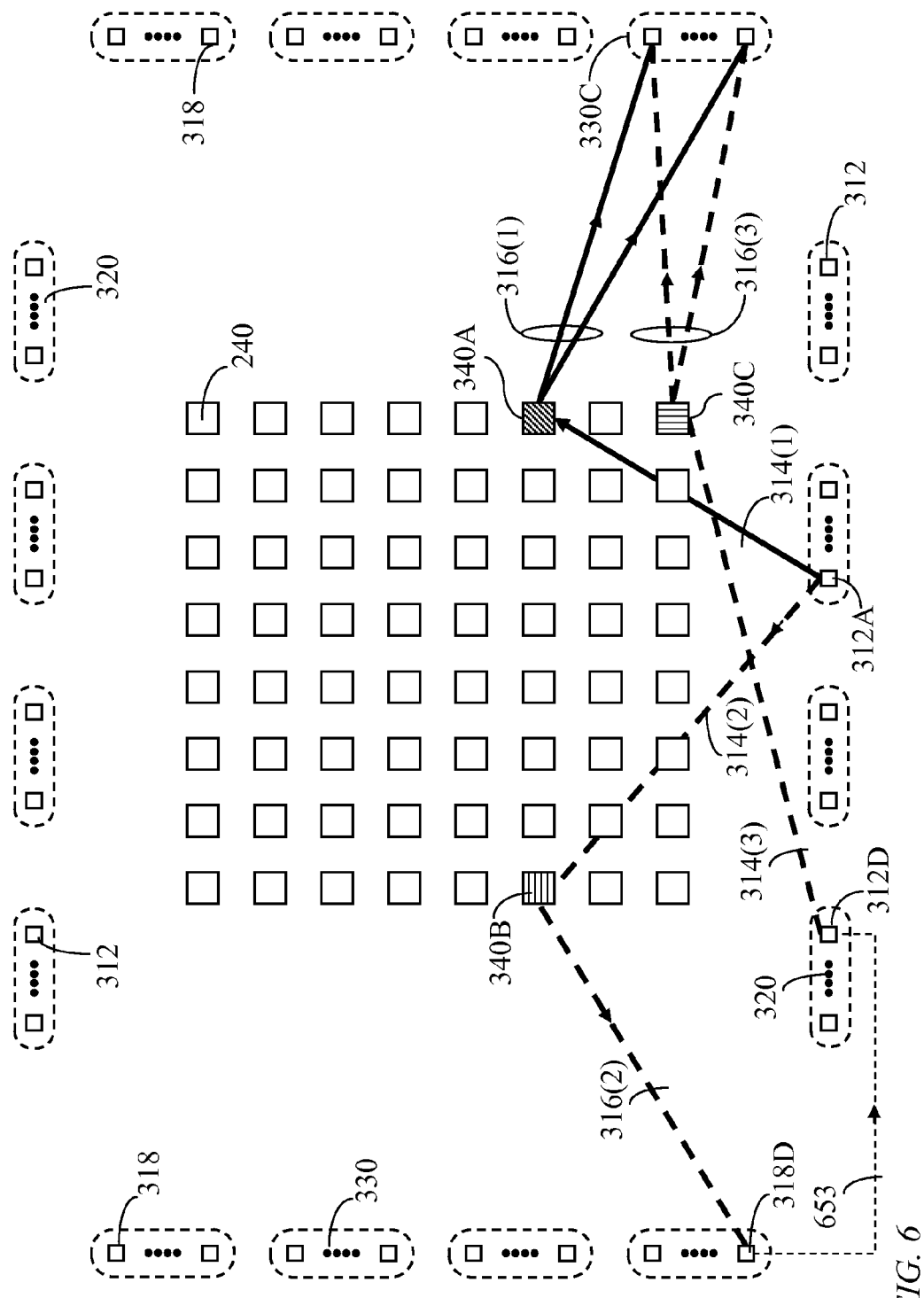
FIG. 6 illustrates a simple path and a compound path in the switching node of FIG. 3 in accordance with an embodiment of the present invention.

FIG. 6 illustrates a simple path from source-node 312A to any sink node 318 in sink-node group 330C traversing one switch unit 340A. The path traverses a channel 314(1) from source-node 312A to switch unit 340A and one of channels 316(1) from switch unit 340A to a sink node 318 in sink-node group 330C. A compound path from source node 312A to any sink node in sink-node group 330C traversing two switch units 340B and 340C is illustrated. The compound path includes a channel 314(2) from source-node 312A to switch unit 340B, a channel 316(2) from switch unit 340B to edge node 312D/318D, a channel 314(3) from edge node 312D/318D to switch unit 340C, and a channel 316(3) to a destination sink node 318 in sink-node group 330C. Although source node 312D and sink node 318D are illustrated as separate entities, it is understood that they form an integrated edge node 312D/318D which provides an internal path 653 from channel 316(2) to channel 314(3). To enable the use of a compound path comprising two direct paths, each source node may be integrated with a sink node to form an edge node which provides a transit function. To compensate for the capacity consumed in providing the transit function each edge node may provide appropriate internal expansion.

Figure 7:
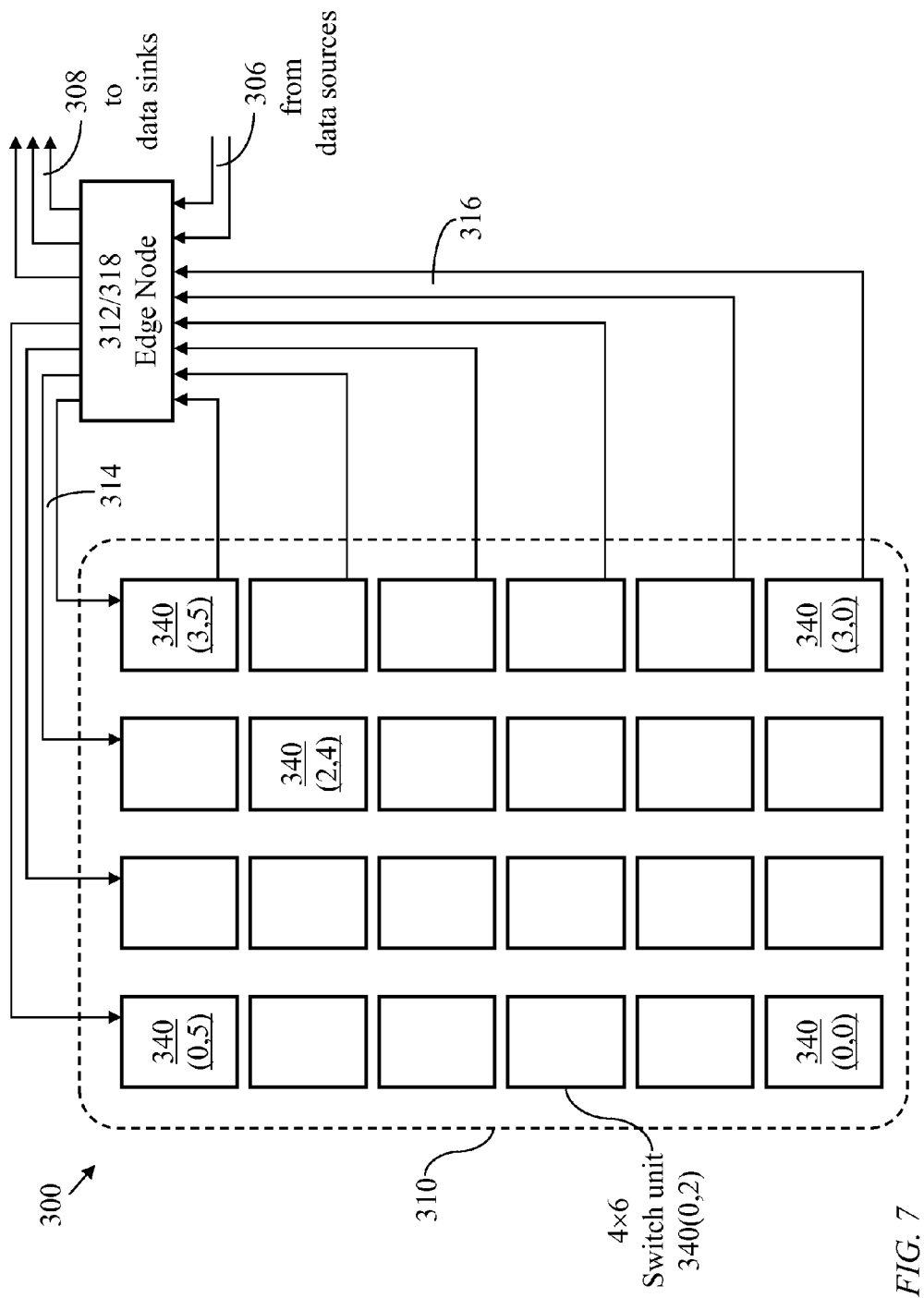
FIG. 7 illustrates a switching node having asymmetrical edge nodes in accordance with an embodiment of the present invention.

FIG. 7 illustrates a switching node 300 having asymmetrical edge nodes 312/318 (of which only one is illustrated) and switch units 340 arranged in a core matrix 310 of four columns and six rows ($\mu$=4, v=6). Each switch unit 340 has 4 input ports and six output ports (m=4, n=6). Each edge node 312/318 supports four outbound channels 314, one to each switch unit 340 in a row of switch units, six inbound channels 316, one from each switch unit in a column of switch units 340, a number of ingress channels 306 from data sources, and a number of egress channels 308 to data sinks. A total of 24 edge nodes may be interconnected through the core matrix 310.

Figure 8:
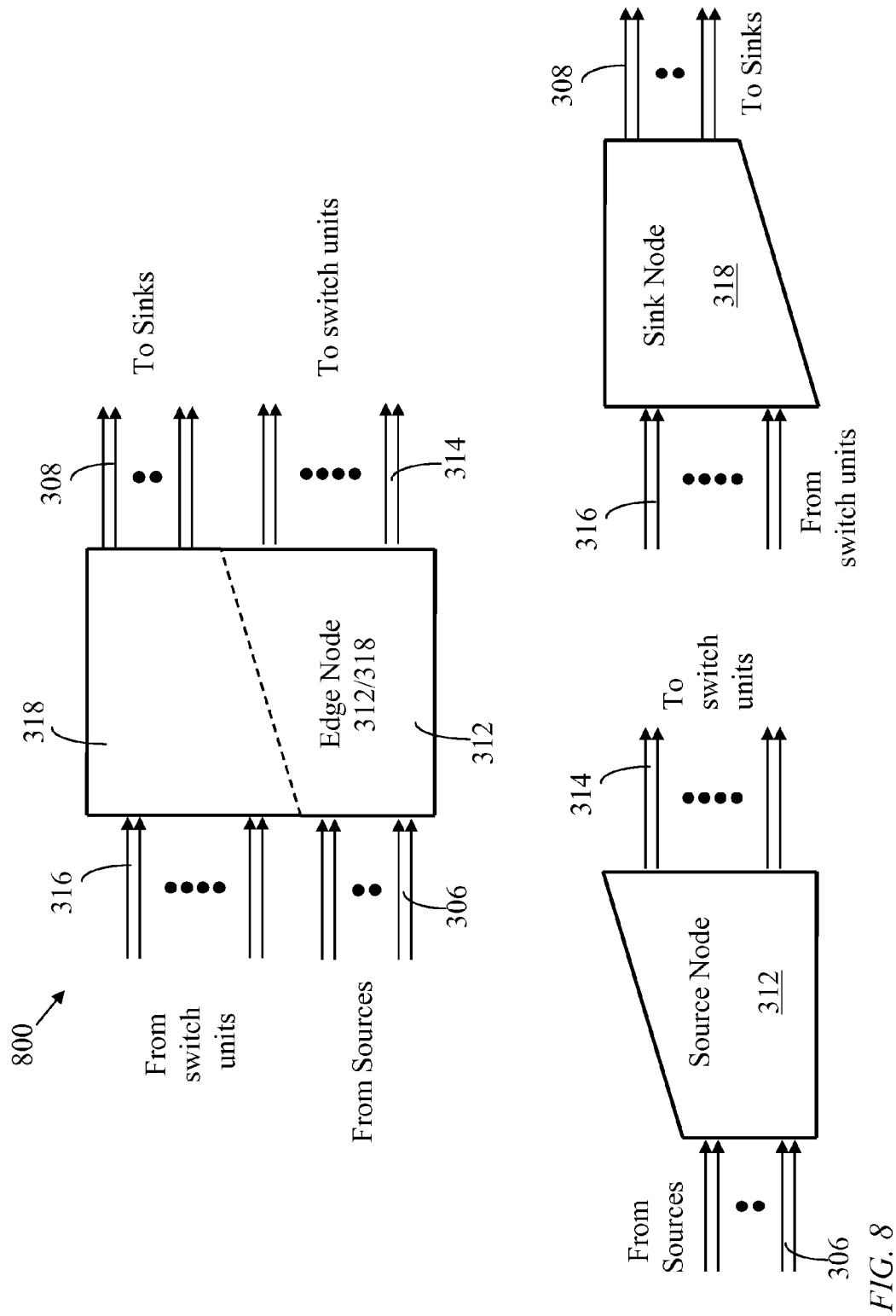
FIG. 8 illustrates an integrated source-node and sink-node with additional internal expansion to compensate for the potential use of compound paths in the switching node of FIG. 3 in accordance with an embodiment of the present invention.

FIG. 8 illustrates an integrated edge node 800 combining a source node 312 and a sink node 318, where individual channels 306, 308, 314, and 316 are of equal capacity; each operating at 10 Gigabits-per-second (Gb/s) for example. Source-node component 312 has more outbound channels 314 than ingress channels 306 and sink-node component 318 has more inbound channels 316 than egress channels 308. An internal-expansion ratio is defined herein as the ratio of inner capacity to outer capacity of the edge node. With channels 306, 308, 316, and 318 of equal capacity, the internal expansion ratio is the ratio of the total number of inner channels (314 and 316) to the total number of outer channels (306 and 308). With well-balanced spatial distribution, an additional internal expansion (i.e., an expansion ratio exceeding 1.0) would not be needed. In an extreme case, where the entire traffic from each source node 312 in a given column is directed to only one corresponding target sink node 318 in a different column, most of the traffic would be routed through compound paths and the needed expansion in each edge node would be almost 2:1.

Preferably, the edge nodes are non-blocking in order to simplify the connection-setup process through the switching node 300. Furthermore, it is preferable that each non-blocking edge node be also contention-free. An edge node fabric satisfying this requirement may be based on a conventional shared-memory device where a number of input ports take turns in cyclically accessing the shared memory to write data blocks and a number of output ports cyclically access the shared memory to read data blocks. A data block written in the shared memory device by an input port may comprise data segments destined to different edge nodes. Thus, data blocks at each output of an edge node may be disassembled for switching to different outward ports of the switch unit 340 leading to different destination edge nodes.

Figure 9:
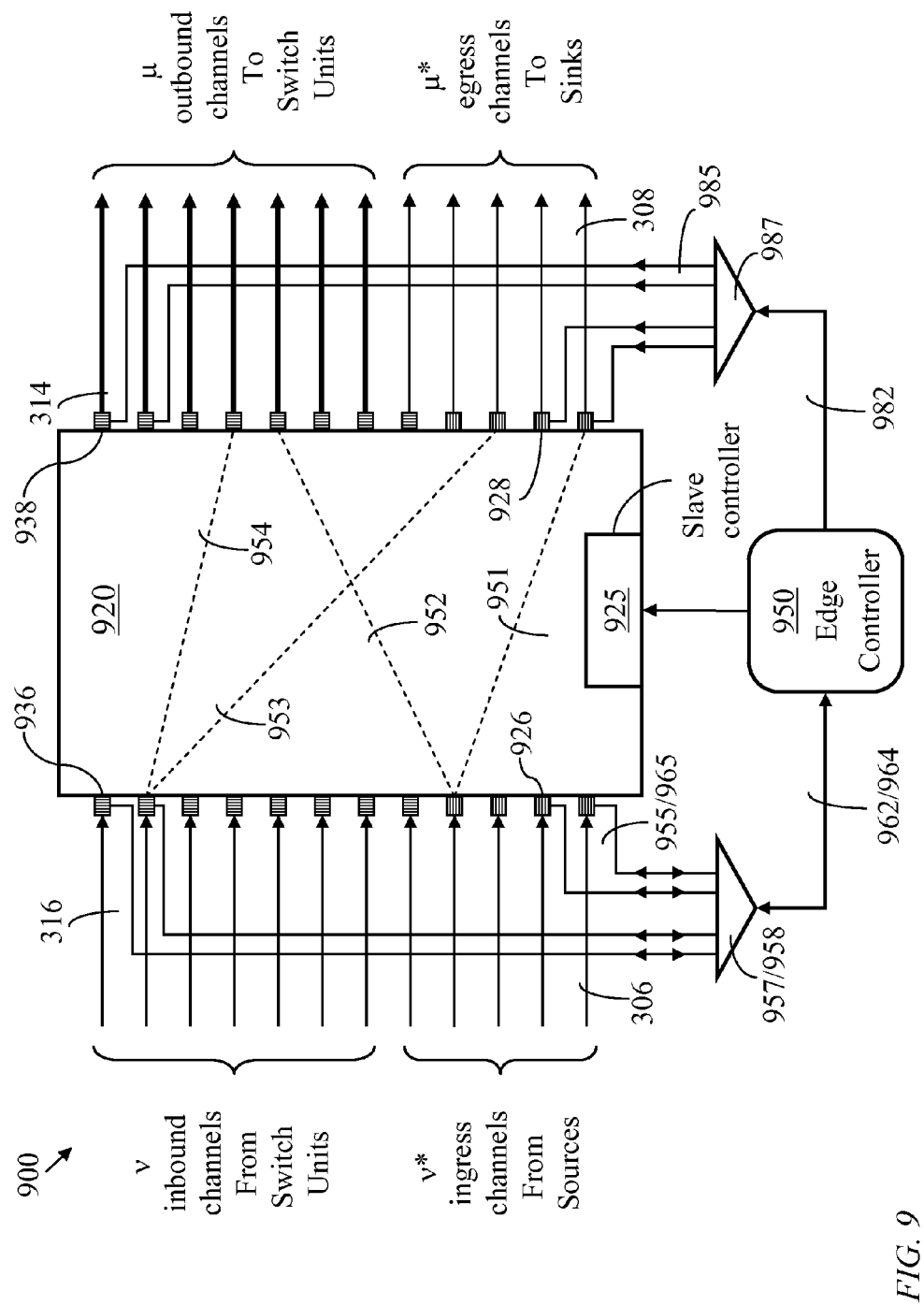
FIG. 9 illustrates internal connectivity of an integrated edge node having an edge controller.

FIG. 9 illustrates an edge node 900 having a switch fabric 920 and an edge controller 950. Edge node 900 has (ν*+ν) input ports and (μ*+μ) output ports. The input ports include ν* ingress ports 926 for receiving data from data sources through ingress channels 306 and ν inbound ports 936 for receiving data from switch units through input channels 316. The output ports include μ* egress ports 928 for transmitting data to data sinks through egress channels 308 and μ outbound ports 938 for transmitting data to switch units through output channels 314.

Preferably, individual data segments may be switched from ingress ports 926 and inbound ports 936 to egress ports 928 (internal paths 951 and 953) while data blocks, each comprising a number of data segments may be switched from ingress ports 926 and inbound ports 936 to outbound ports 938 (internal paths 952 and 954).

Control signals from input ports 926 and 936 sent on control channels 955 are time multiplexed in temporal multiplexer 957 onto a channel 962 connecting to edge controller 950. Control signals from edge controller 950 to egress ports 928 and outbound ports 938 are transferred through a channel 982, a temporal demultiplexer 987 and channels 985. An outbound port 938 may insert control data received from edge controller 950 in data blocks transferred to an inward port of a switch unit 340. The positions of control signals within data blocks transmitted by outbound ports 938 are selected to ensure contention-free transfer of control signals through corresponding switch units 340 as will be described with reference to FIGS. 37-39.

Control signals from edge controller 950 to an ingress port 926 or an inbound port 936 may be carried on a reverse path traversing a channel 964, temporal demultiplexer 958, and a channel 965. If each egress port 928 is paired with an ingress port 926, and each outbound port 938 is paired with an inbound port 936, control signals from the edge controller 950 to the ingress ports 926 and inbound ports 936 may be transferred through corresponding paired output ports (egress ports and outbound ports) and the reverse paths traversing channel 964, demultiplexer 958, and channels 965 would not be needed.

Other arrangements for exchanging control signals between the edge controller 950 and the input or output ports may be devised; for example the control signals may be transferred through the switch fabric instead of channels 955, 956, and 985.

Edge controller 950 schedules connections from input ports (ingress and inbound ports) to output ports (egress and outbound ports) and instructs a configuration controller (slave controller) 925 associated with the switch fabric 920 to establish scheduled connections. Configuration controllers associated with switch fabrics are well known in the art.

Control Time Slots

The time domain is organized into time frames each divided into a number T, T>m, T>n, of time slots of equal duration. Each connection is allocated a respective number σ of time slots per time frame, 0<σ<T. A connection is preferably confined to a single outbound channel from a source node 312, which is also an inward channel to a switch unit 340. Control time slots from an edge controller to a switch-unit controller and vice versa may be transferred through dedicated control channels. Alternatively, a number $\Lambda_1$ of inward control time slots per time frame may be reserved in each outbound channel from a source node 312 (inward channel to a switch unit 340) and a number $\Lambda_2$ of outward control time slots per time frame may be reserved in each outward channel from a switch unit 340 (inbound channel to a sink node 318). Although the flow rate of control signals generated by an edge controller may differ from the flow rate of control signals generated by a switch-unit controller, it is preferable that $\Lambda_1=\Lambda_2$. The number $\Lambda=\Lambda_1=\Lambda_2$ of inward (or outward) control time slots per time frame is determined as: $0<\Lambda \le \lfloor T/m \rfloor$, where $\lfloor a \rfloor$, denotes the integer part of real number "a". For example, with m=491 and T=1024, the number Λ of inward control time slots per outbound channel (inward channel) from an edge node to a switch unit 340 does not exceed $\lfloor 1024/491 \rfloor =2$. A switch unit controller receives inward control signals during 491 time slots per time frame if Λ=1, or during 982 time slots per time frame if Λ=2. A switch unit controller transmits outward control signals during 491 time slots per time frame if Λ=1, or during 982 time slots per time frame if Λ=2.

Edge-Node Structure

In order to simplify the connection setup process, edge node 900 is preferably constructed as a contention-free shared memory switching device. In a shared memory switching device, however implemented, having a multiplicity of input ports and a multiplicity of output ports, the input ports cyclically gain WRITE-access to the shared memory and the output ports cyclically gain READ-access to the shared memory during successive time slots. During a WRITE-access time interval, an input port writes a data block containing data directed to one of the output ports of the edge node and during a READ-access time interval, an output port reads a data block containing data written by one of the input ports of the edge node. During a memory-access period each input port and each output port gains access to the shared memory.

To realize high efficiency, each input port may include an input memory organized into a number of logical queues where each logical queue is associated with one of the output ports of the edge node. During each time slot allocated to an input port, a data block may be transferred to the shared memory from a logical queue having sufficient data to fill a data block. With high variation of spatial traffic distribution, a logical queue, corresponding to a data stream of low flow rate, may take an excessive period of time to form a data block. It is therefore preferable that a logical queue be eligible for memory access if it meets one of two conditions (1) having sufficient waiting data to form a data block or (2) having a data segment that has been queued for a period of time that exceeds a predefined permissible waiting time.

Dual Granularity

Figure 10:
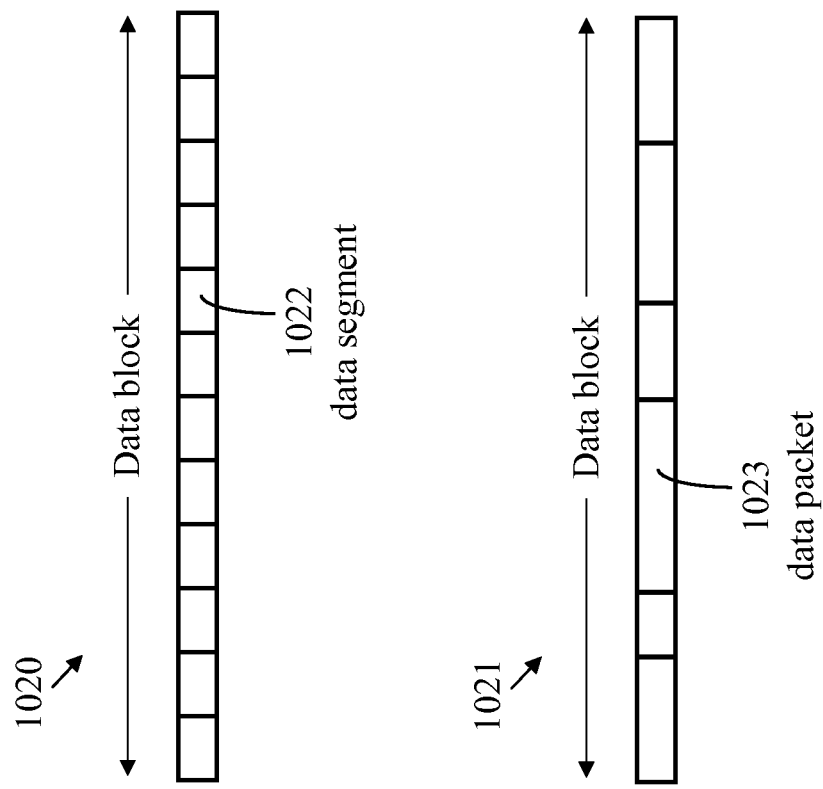
FIG. 10 illustrates a first data block comprising data segments of equal size, and a second data block comprising data packets of arbitrary sizes for use in an embodiment of the present invention.

FIG. 10 illustrates two forms, 1020 and 1021, of a data block. Each data block has a predefined size and may comprise data segments 1022 of equal size (data block 1020) or data packets 1023 of arbitrary sizes (data block 1021). Data block 1020 may include a NULL data segment and data block 1021 may include a NULL packet. It is preferable that each edge node be devised to permit switching both data blocks 1020 and finer data segments 1022 so that: data blocks 1020, each of which comprising a number of data segments 1022, may be switched from any input port 926, 936 to outbound ports 938 (paths 952 and 954 of FIG. 9) connecting to switch units; and individual data segments may be transferred from any input port 926, 936 to egress ports 928 connecting to data sinks (paths 951 and 953 of FIG. 9). The edge node may also be adapted to form data blocks 1021 comprising data packets 1023 of arbitrary sizes.

Contention-free switching in an edge node is facilitated by switching entire data blocks 1020. Contention-free switching is highly desirable in establishing connections between edge nodes. Contention-free data-block switching is used for connections directed to an outbound port 938. However, data received at an ingress port 926 (from data sources) or at an inbound port 936 (from a switch unit 340) and directed to an egress port 928 may be switched as individual data segments. Therefore, switch 300 preferably use edge nodes providing both contention-free data-block switching and contention-based data-segment switching.

In accordance with an embodiment, an ingress port 926 receives data packets from data sources and organizes the packets in data segments 1022 of equal size. The ingress port 926 assembles data segments destined to sink nodes of a selected column in matrix 310 into data blocks 1020. An inbound port 936 receives data blocks 1020 from a switch unit 340 where a received data block 1020 may comprise data segments 1022 destined to different edge nodes. Data received at any input port 926, 936 of an edge node 900 may be directed to egress ports 928 of the edge node or to outbound ports 938 connecting to switch units 340 for delivery to other edge nodes 900 (312/318).

Figure 11:
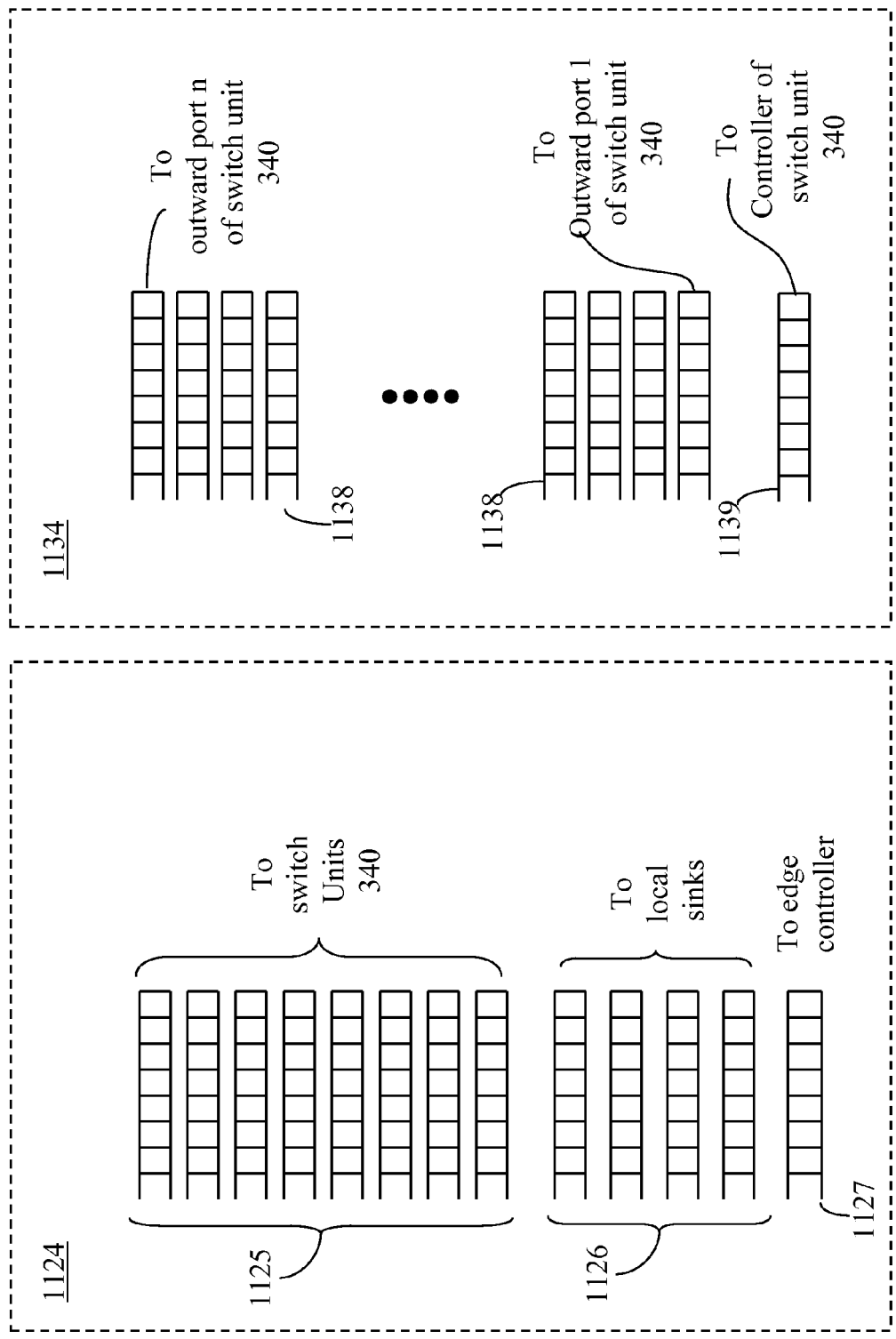
FIG. 11 illustrates logical input queues in an input memory at an input port of the edge node of FIG. 9—each logical input queue corresponding to an output port of the edge node—and logical output queues in an output memory at an outbound port of the edge node of FIG. 9, each logical output queue corresponding to an outward port of a switch unit to which the outbound port of the edge node connects, in accordance with an embodiment of the present invention.

FIG. 11 illustrates organization of a memory 1124 at each input port 926 or 936 of an edge node 900 into a plurality of logical queues with each logical queue corresponding to an output port of the edge node 900. Logical queues 1125 correspond to outbound ports 938 connecting to switch units 340. Logical queues 1126 correspond to egress ports 928 connecting to data sinks. A logical queue 1127 corresponds to edge-node controller 950.

An ingress port 926 receives data packets from data sources and forms data segments of equal size to facilitate switching through edge node 900. Each data segment received at an ingress port 926 is placed in a logical queue 1125/1126/1127 according to a destination of the data segment. Data segments destined to controller 950 are placed in logical queue 1127. Data segments destined to an egress port 928 are placed in a logical queue 1126 corresponding to the egress port and may be switched individually. Data segments destined to an outbound port 938 are placed in a logical queue 1125 corresponding to the outbound port and may be aggregated into data blocks 1020 each comprising a number of data segments 1022 not exceeding a predefined limit. The predefined limit is preferably equal to the number of output ports of the edge node.

An inbound port 936 of a specific edge node 900 receives data blocks 1020 from outbound ports 938 of other edge nodes 900 through switch units 340. A data block 1020 received at an inbound port 936 and destined to another edge node 900 may be placed in a logical queue 1125 corresponding to the destination edge node. Data segments 1022 of a data block 1020 received at an inbound port 936 and destined to more than one edge node 900 may be placed in logical queues 1125 corresponding to the destination edge nodes. If the data block also contains data segments destined to local egress ports 928 of the specific edge node 900, the data segments are placed in corresponding logical queues 1126. Data segments of a data block received at an inbound port 936 and destined exclusively to egress ports 928 of the specific edge node 900 may be placed in logical queues 1126 corresponding to egress ports 928 of the specific edge node 900.

The edge-node fabric 920 may be a conventional shared-memory fabric or, preferably, a versatile rotating-access fabric as will be described with reference to FIG. 13. With a conventional shared-memory fabric, the data segments 1022 of a data block 1020 may be switched simultaneously, without contention, to an outbound port 938. With a rotating-access fabric, the data segments 1022 of a data block 1020 may be switched consecutively, and without contention, to an outbound port 938.

Data segments received at any input port 926, 936 of an edge node and destined to egress ports 928 (hence to data sinks) of the edge node are preferably switched competitively, hence requiring a scheduling process for potential contention resolution.

A specific outbound port 938 of a specific edge node 900 has a channel 314 to a specific switch unit 340. The specific switch unit 340 has outward channels to a number of sink nodes 318 in a specific sink-node group 330. An output memory 1134 provided at the specific outbound port 938 is organized into a number of logical queues 1138, each corresponding to an outward port of the specific switch unit 340, and a logical queue 1139 corresponding to a controller of the specific switch unit 340. Data segments 1022 of a data block 1020 transmitted from the specific outbound port 938 to the specific switch unit 340 are switched through the specific switch unit 340 to the sink nodes 318 of the specific sink-node group 330 according to a temporal matching process and data segments may be delayed at the output memory 1134 due to contention.

As described earlier, a source node 312 and a sink node 318 are preferably integrated into an edge node 900. A data segment received at a specific sink node 318, associated with a specific edge node 900, may be directed to an egress port 928 of the specific edge node 900 or to an outbound port 938 of the specific edge node 900 to be directed to a switch unit 340.

Figure 12:
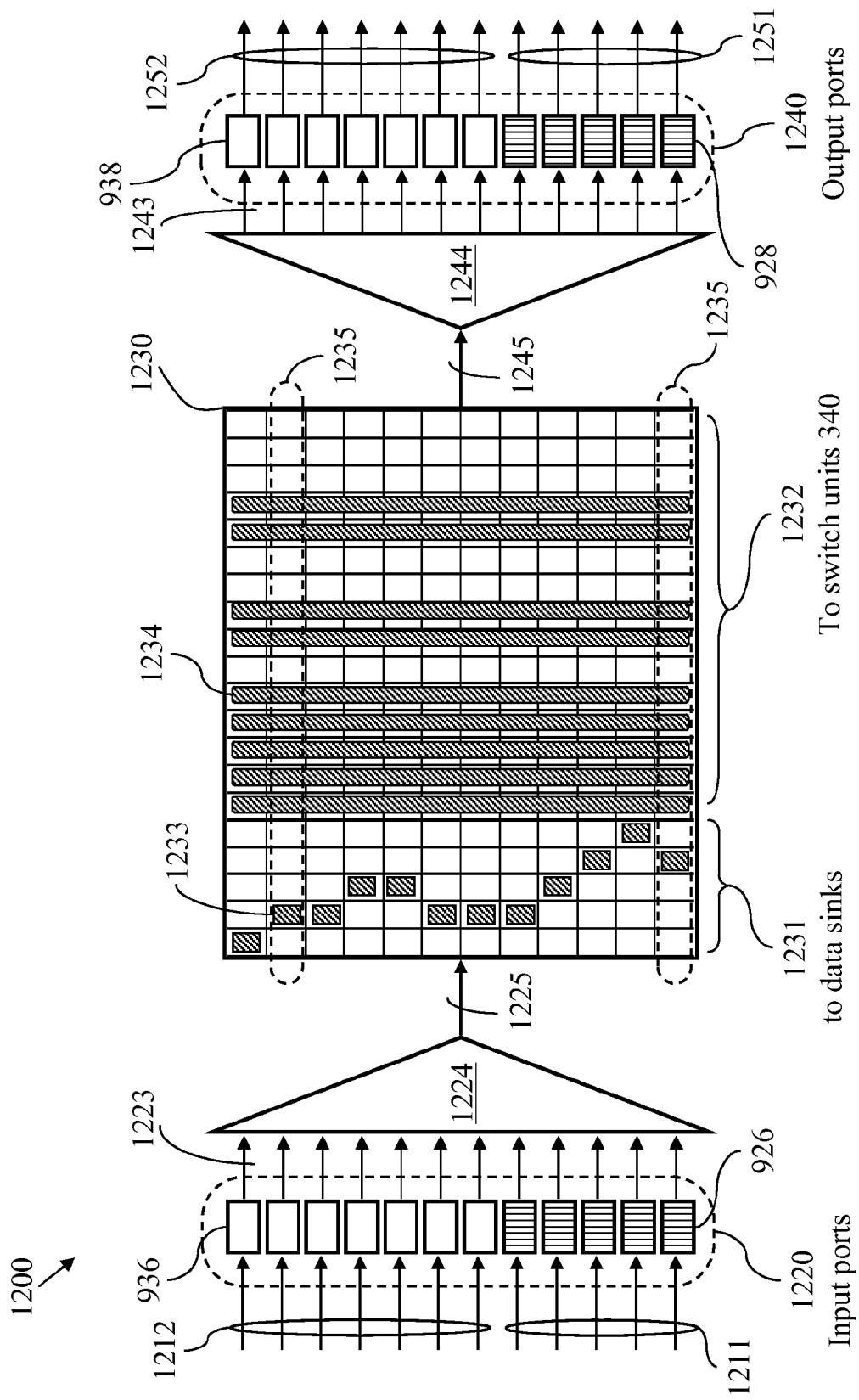
FIG. 12 illustrates a structure of an edge node providing both contention-free switching of data-blocks and contention-based switching of finer data segments in accordance with an embodiment of the present invention.

FIG. 12 illustrates an edge node 1200 comprising a plurality of input ports 1220, a temporal multiplexer 1224, a shared memory 1230, a temporal demultiplexer 1244, and a plurality of output ports 1240. The input ports 1220 may be functionally divided into ingress ports 926 receiving data from data sources through ingress channels 1211 and inbound ports 936 receiving data, directly or indirectly, from other edge nodes through inbound channels 1212. The output ports 1240 may be functionally divided into egress ports 928 transmitting data to data sinks through egress channels 1251 and outbound ports 938 transmitting data, directly or indirectly, to other edge nodes through outbound channels 1252. There are five ingress ports 926, seven inbound ports 936, five egress ports 928, and seven outbound ports 938 in the exemplary structure of FIG. 12.

Shared memory 1230 is organized into two sections 1231 and 1232. Shared memory 1230 is a wide memory comprising a plurality of memory devices 1235. Each memory device 1235 is organized into a number of memory cells, associated with section 1231, equal to the number of egress ports 928 and a number of memory cells, associated with section 1232, determined by the capacity (depth) of the memory device 1235. With identically organized memory devices 1235, a column of cells, having one cell from each memory device 1235, holds data segments destined to a common output port 1240. However, there are two major differences between a column in section 1231 and a column in section 1232. The first difference is that a column in section 1231 may hold data segments written by different input ports 1220 while a column in section 1232 holds data segments written by a single input port 1220 and forming a data block. The second difference is that data segments in a specific column in section 1231 are directed to a specific output port corresponding to the specific column, i.e., there is one-to-one correspondence between a column in section 1231 and an output port, while data segments in a given column in section 1232 may be directed to any output port 1240; the destination of a data block in a column in section 1232 is unrelated to the position of the column in memory device 1230. Consequently, there may be several columns in section 1232 holding data directed to a specific output port 1240, but only one column in section 1231 holding data directed to the specific output port 1240. There are 12 output ports 1240 and, therefore, section 1231 may include 12 columns. It is preferable however to limit data-segment switching through section 1231 to data directed to egress ports 928 only, in which case only five columns in section 1231 need be dedicated to the egress ports 928 on a one-to-one basis.

In the exemplary arrangement of FIG. 12, the number of columns in section 1231 is selected to be five. Each column in section 1231 may hold 12 data segments. FIG. 12 illustrates 12 data segments 1233 which may be written by a single input port 1220 and directed to the five egress ports, with one data segment directed to a first egress port, five data segments directed to a second egress port, three data segments directed to a third egress port, two data segment directed to a fourth egress port, and one data segment directed to a fifth egress port.

Temporal multiplexer 1224 cyclically connects each channel 1223 from an input port 1220 (926/936) to shared memory 1230, through bus 1225, to write data segments 1233 in different rows, but arbitrary columns, in section 1231 or a data block 1234 in one column in section 1232. Temporal demultiplexer 1244 cyclically connects each output port 1240 (928/938) to shared memory 1230, through bus 1245 and a channel 1243, to read data segments in a column in section 1231 corresponding to the output port, or a data block 1234, in section 1232, directed to the output port.

It is noted that, because each column in section 1231 is dedicated to a corresponding output port (egress port in the illustrated example), output contention may take place and, hence, data segments may experience variable queueing delay in input ports 1220. A data block 1234, may be written by any input port in any available (unoccupied) column position in section 1232 of memory device 1230. Thus, Shared-memory edge node 1200 provides contention-free switching for data blocks 1234 and contention-based switching for finer data segments 1233.

Figure 13:
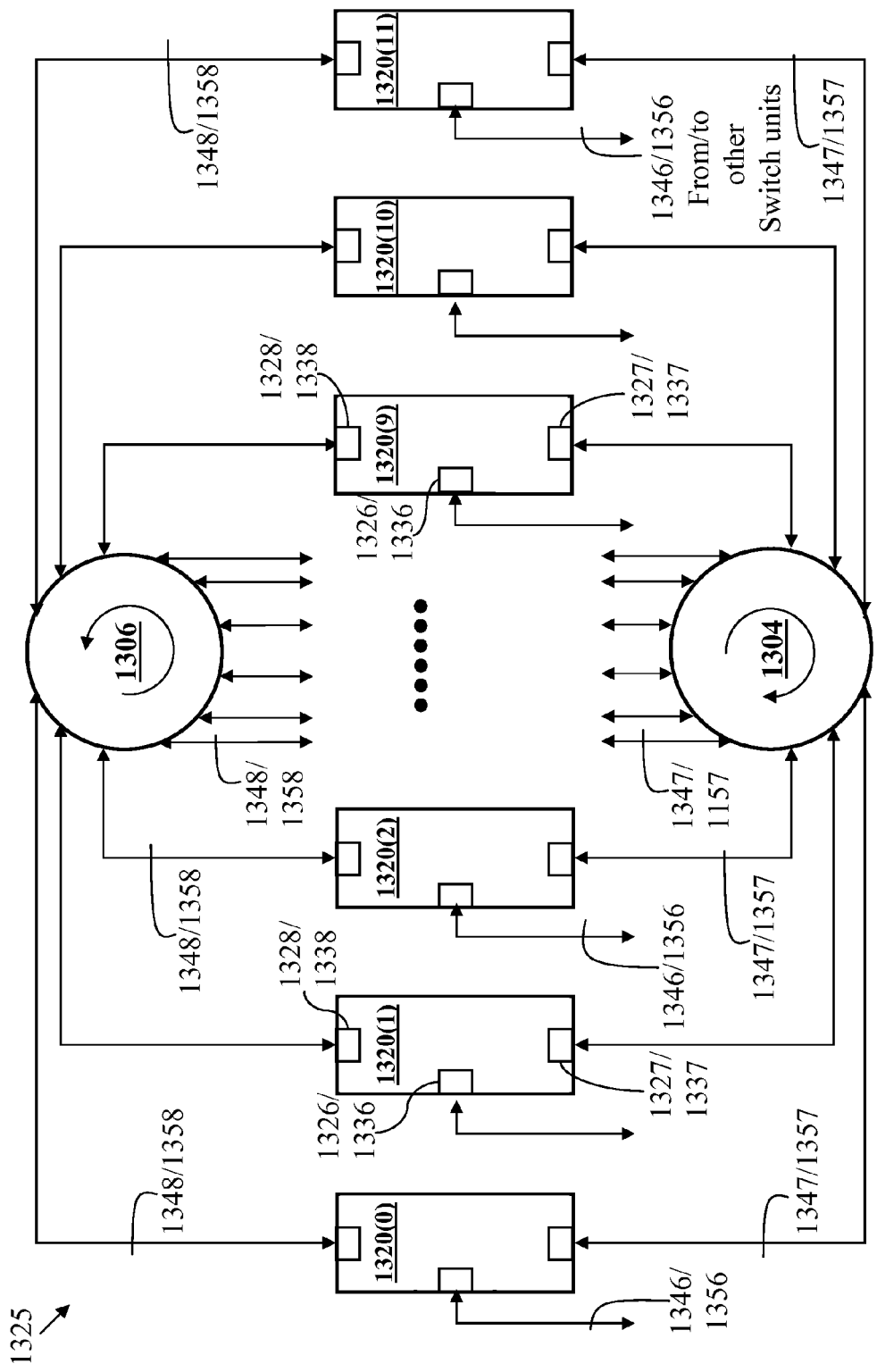
FIG. 13 illustrates an exemplary edge node comprising an array of switch elements connecting to a rotator pair and providing both contention-free and contention-based switching in accordance with an embodiment of the present invention.

FIG. 13 illustrates an exemplary edge node 1325 for use as an integrated edge node 312/318 in switch 300. Edge-node 1325 comprises a bank of switch elements 1320, a clockwise rotator (ascending rotator) 1304 and a counterclockwise rotator (descending rotator) 1306. The number of switch elements 1320 may be limited due to certain design consideration to 64 or so. The exemplary edge node 1325 has 12 switch elements 1320 individually identified as 1320(0), 1320(1), . . . , 1320(11). Each of the two rotators 1304 or 1306 has a number of rotator input ports at least equal to the number of switch elements 1320 and a number of rotator output ports at least equal to the number of switch elements 1320. Each switch element 1320 has three input ports 1326, 1327, and 1328) and three output ports 1336, 1337, and 1338). FIG. 13 illustrates combined input-output ports 1326/1336, 1327/1337, and 1328/1338 with corresponding dual channels 1346/1356, 1347/1357, and 1348/1358 respectively; the ports and channels are illustrated individually in FIG. 14. Input port 1326 is an access port connecting to a channel 1346 from data sources or other edge nodes. Input port 1327 is an internal port connecting to a channel 1347 from ascending (clockwise) rotator 1304 and input port 1328 is an internal port connecting to a channel 1348 from descending (counterclockwise) rotator 1306. An access output port 1336 connects to a channel 1356 to data sinks or other edge nodes, an internal output port 1337 connects to channel 1357 to ascending rotator 1304, and an internal output port 1338 connects to a channel 1358 to descending rotator 1306. Input ports 1326 may be divided into ingress ports 926 and inbound ports 936 (FIG. 9). Output ports 1336 may be divided into egress ports 928 and outbound ports 938. Edge node 1325 may provide contention-free switching, contention-based switching, or a combined contention-free and contention-based switching. An edge node 1325 operated as a contention-based switching device is disclosed in U.S. patent application Ser. No. 10/780,557 titled "Circulating Switch", publication US2004/0165887.

Figure 14:
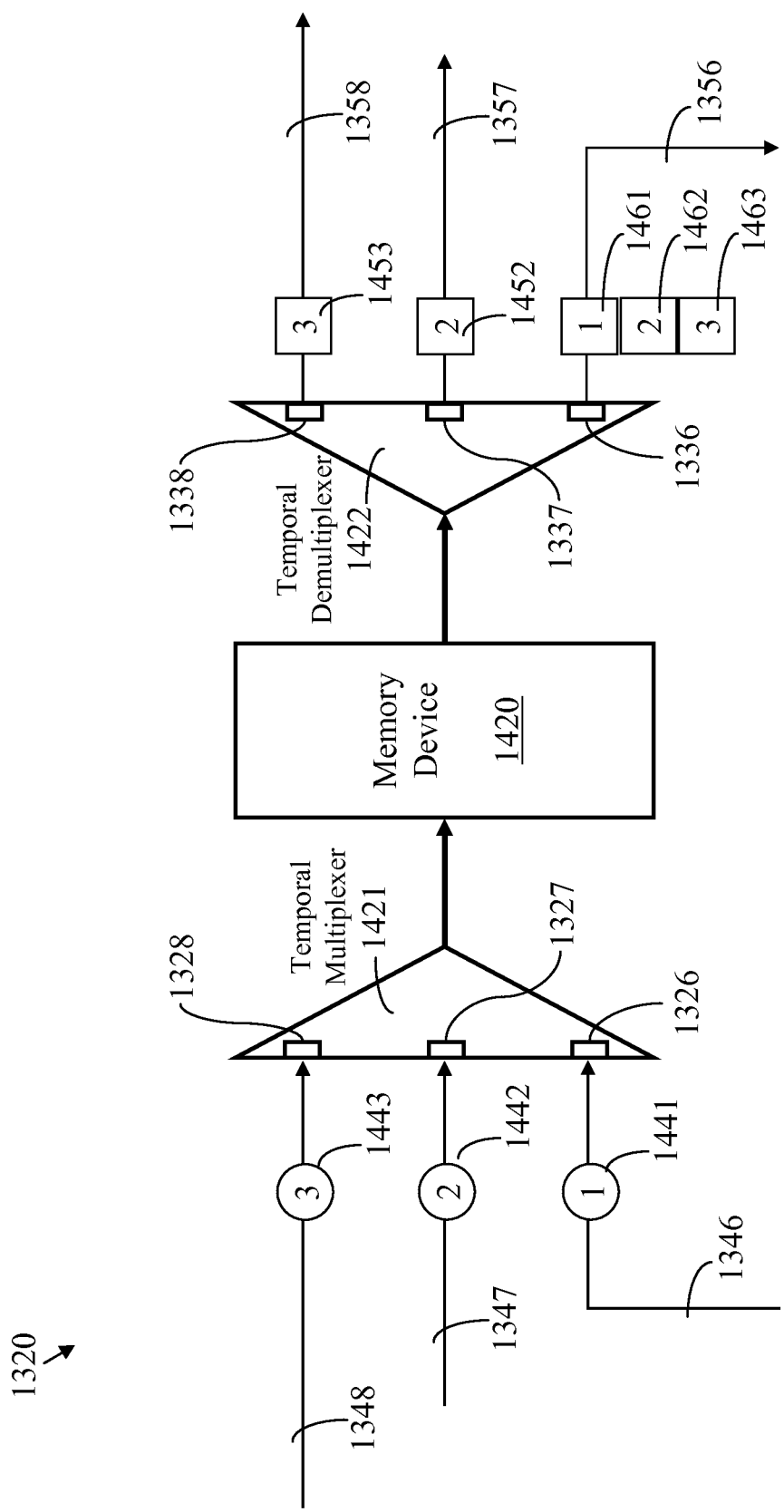
FIG. 14 illustrates a switch element in the edge node of FIG. 13, the switch element having a temporal multiplexer, a memory device, and a temporal demultiplexer.

FIG. 14 further illustrates a switch element 1320 comprising a memory device 1420 connecting to a temporal multiplexer 1421 and a temporal demultiplexer 1422. Temporal multiplexer 1421 connects to input ports 1326, 1327, and 1328. An input channel 1346 from data sources connects to input port 1326, an internal input channel 1347 from the ascending rotator 1304 connects to input port 1327, and an internal input channel 1348 from the descending rotator 1306 connects to input port 1328. Data segments from channels 1346, 1347, and 1348 are cyclically transferred through multiplexer 1421 to the memory device 1420. Temporal demultiplexer 1422 connects to output ports 1336, 1337, and 1338. An output channel 1356 connects to output port 1336, an internal output channel 1357 connects output port 1337 to the ascending rotator 1304, and an internal output channel 1358 connects output port 1338 to descending rotator 1306. Demultiplexer 1422 cyclically transfers data from the memory device 1420 to channels 1356, 1357, and 1358.

A fresh data segment 1441 received from a data source at a specific switch element is marked as being in state "1", a data segment 1442 received from a data source connecting to a different switch element through one of the two rotators, 1304 and 1306, is marked as being in state "2", and a data segment 1443 received from a data source connecting to another switch element through an intermediate switch element is marked as being in state "3". The data segment state ("1", "2", or "3") is indicated in a circle at input and in a square at output of switch element 1320 of FIG. 14. An input data segment 1441 directed to a data sink connecting to the specific switch element may be directly transferred to output channel 1356 and is referenced as output data segment 1461 in FIG. 14. An input data segment 1441 directed to a data sink connected to a destination switch element 1320 is transferred through internal output channel 1357 leading to the ascending rotator 1304 or internal output channel 1358 leading to the descending rotator 1306, and is referenced as output data segment 1452. Either of the two rotators 1304 or 1306 may transfer the data segment directly to the destination switch element or deliver the data segment to an intermediate switch element.

An input data segment 1442 may be directed to a local data sink connected to the specific switch element (indicated as output data segment 1462) or directed to one of the two rotators (referenced as output data segment 1453) for delivery to the switch element connecting to the destination data sink. An input data segment 1443 may only be directed to a local data sink connected to the specific switch element (referenced as output data segment 1463) and is transferred through output channel 1356.

Figure 15:
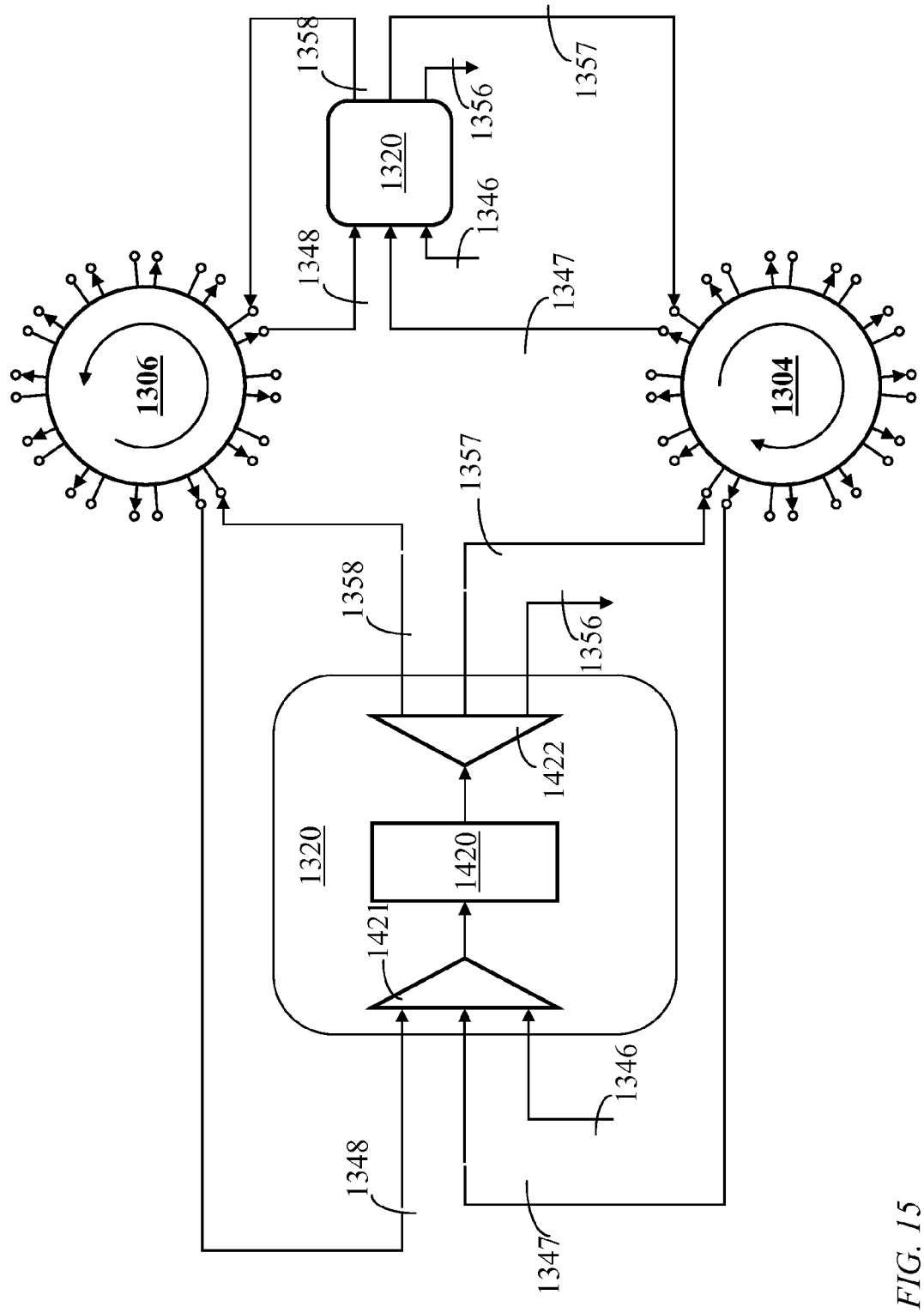
FIG. 15 further details the exemplary edge node of FIG. 13 using the switch element of FIG. 14.

FIG. 15 further details the interconnection of switch elements 1320 through the two rotators 1304 and 1306 using the exemplary switch element of FIG. 14. Each switch element 1320 includes a memory device 1420 which stores fresh data segments received from data sources, transit data segments, and data segments to be transmitted to data sinks.

Figure 16:
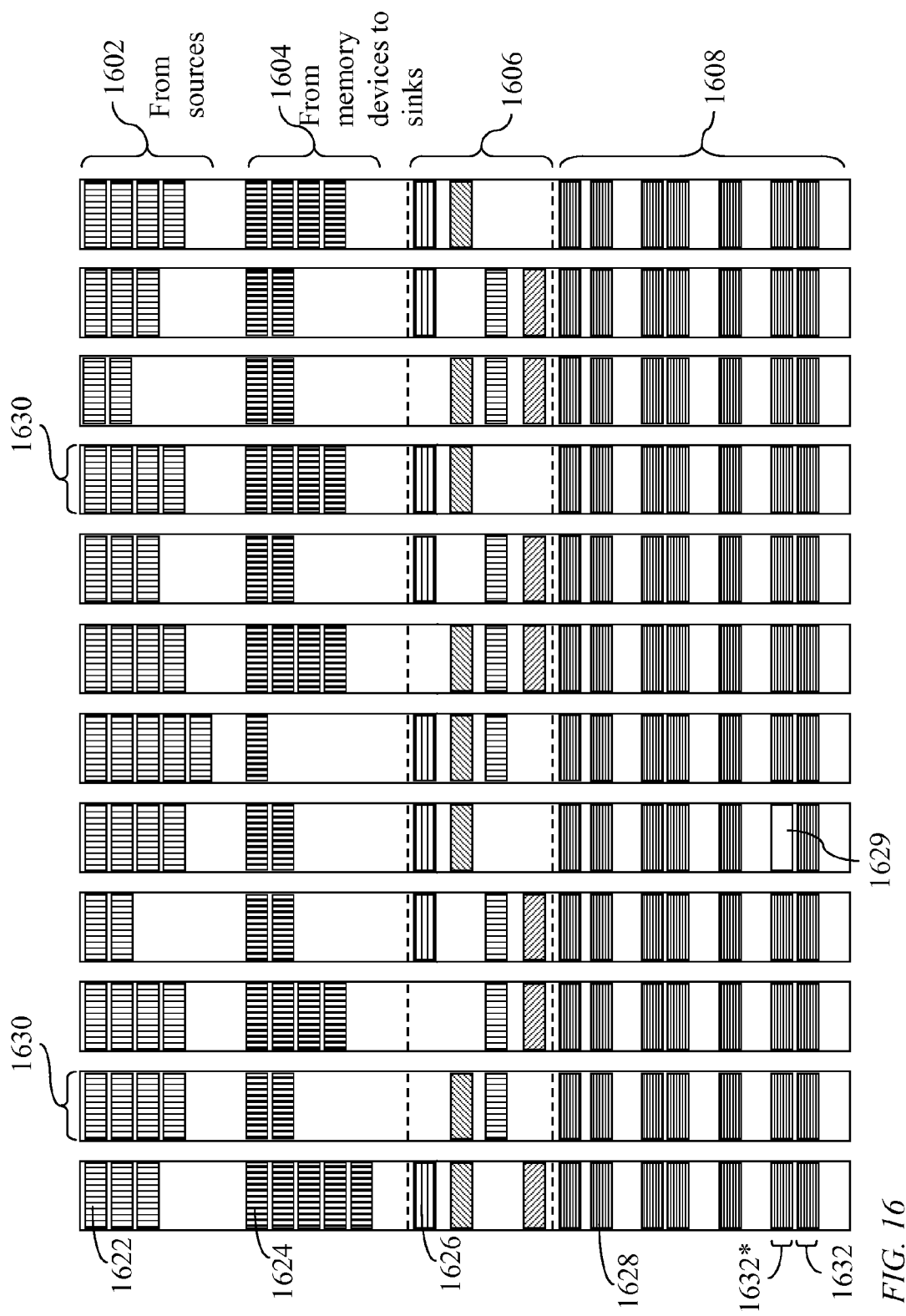
FIG. 16 illustrates data organization in the memory device of the switch element of FIG. 14.

FIG. 16 illustrates memory organization in exemplary edge node 1325 in which four of the twelve switch elements 1320 interface with data sources and sinks, and are herein called "outer switch elements". The remaining eight switch elements 1320 are "inner switch elements". Fresh data received from data sources are arranged into data segments of a moderate size; 512 to 1024 bits each, for example.

Each column 1630 represents a memory device 1420 of a switch element 1320. The memory device 1420 of a switch element 1320 is logically divided into four sections. A first section 1602 contains data segments 1622 received from data sources connecting to the switch element 1320. A second section 1604 contains data segments 1624 for delivery to respective data sinks connecting to the switch element 1320. A third section 1606 contains data segments 1626 waiting for transfer through one of the rotators 1304 and 1306 to any of the outer switch elements 1320. A fourth section 1608 contains data segments 1628 waiting for transfer through one of the rotators 1304 and 1306 to an inner switch element 1320. A data segment 1628 belongs to a data block 1632 and the data segments of the data block occupy corresponding cells in the twelve columns 1630. A data block may include a null segment 1629. For example data block 1632* has 11 data segments 1628 and one null segment 1629.

Switch-Unit Structure

Figure 17:
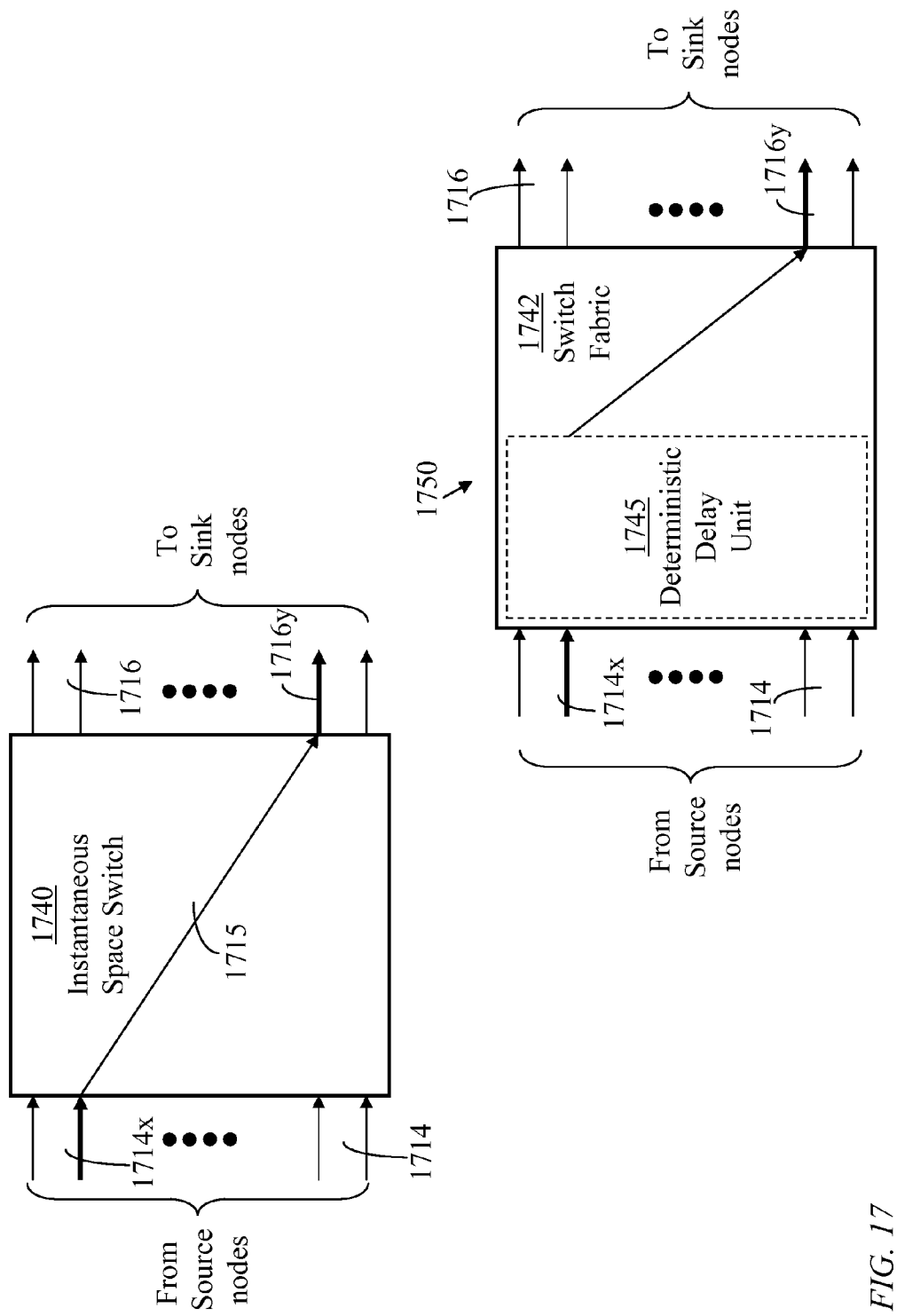
FIG. 17 illustrates an instantaneous space switch and a latent space switch for use in a switch unit in the switching node of FIG. 3.

FIG. 17 illustrates two implementations of a switch unit 340 having a time-multiplexed switching fabric. The first is based on an instantaneous space switch 1740 and the second is based on a latent space switch 1750. A single-stage instantaneous space switch 1740 has a bufferless switch fabric. A data segment received at an inward port from an inward channel 1714 during a time interval may be "instantaneously" switched to any outward port of the space switch to be transmitted over an outward channel 1716. An internal path 1715 held for a duration of a time slot from an inward channel 1714$x$ to an outward channel 1716$y$ is illustrated. A single-stage latent space switch 1750 holds a data segment received at an inward port in a deterministic-delay unit 1745 for a deterministic period of time and switches the data segment through a switch fabric 1742 to a destined outward port after a delay determined by the relative positions of the inward port and outward port. The purpose of introducing deterministic delay is to avoid contention of multiple inward ports attempting to send data simultaneously to an outward port. With the time domain organized into time frames each having a number of time slots, the deterministic delay encountered by a data segment within the deterministic-delay unit 1745 is an integer multiple of time slots determined by the positions of the respective inward port and outward port.

In order to simplify the operation of the switching node 300, the switch units 340 are preferably devised as single-stage space switches. An instantaneous single-stage space switch 1740 is difficult to scale to large dimensions while a single-stage latent-space switch scales to high dimensions. A switch unit 340 is preferably implemented as a latent space switch.

Figure 18:
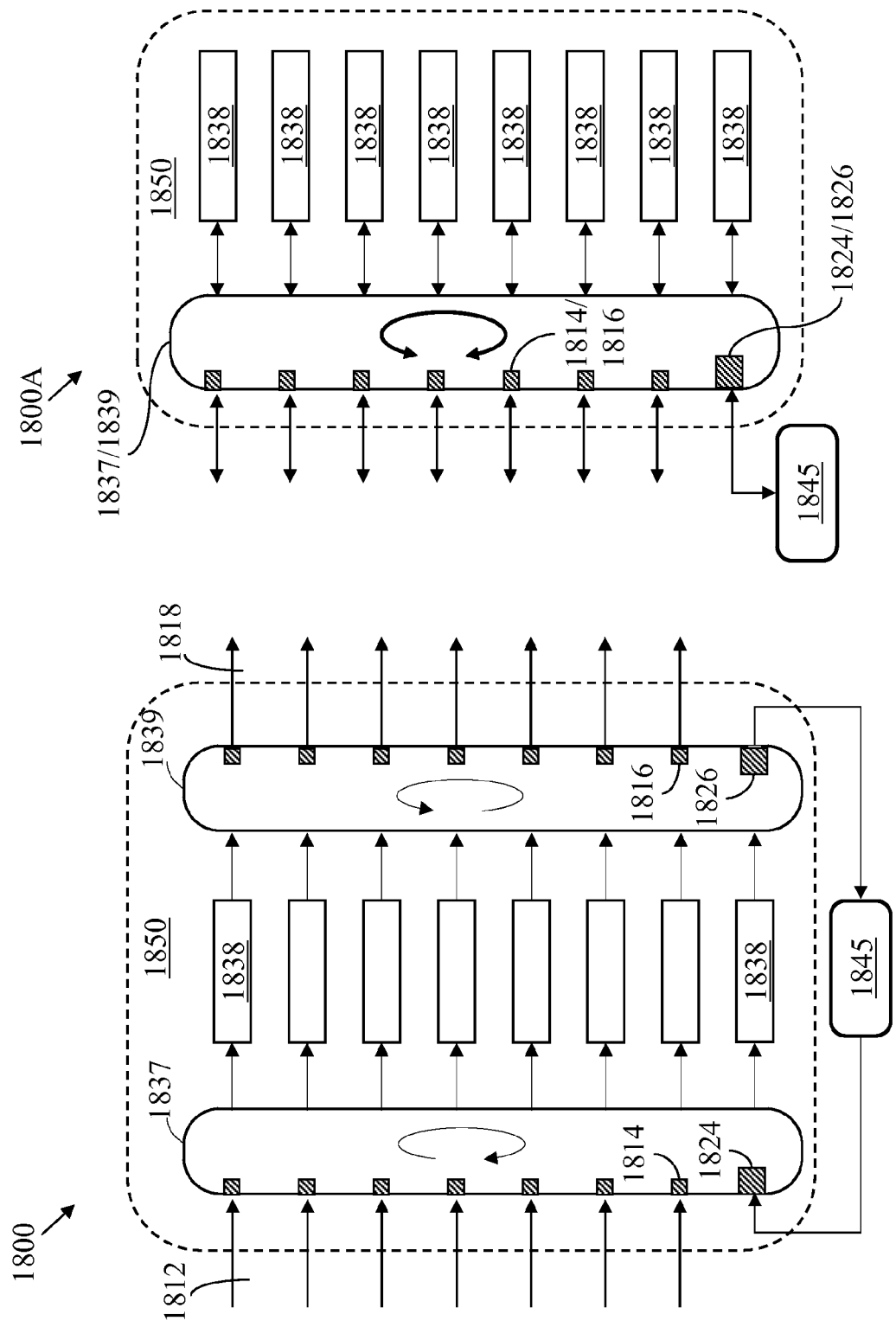
FIG. 18 illustrates a scalable latent space switch for use as a switch unit in the switching node of FIG. 3.

FIG. 18 illustrates a latent single-stage space switch 1800 comprising a switch fabric 1850 and a controller 1845. The switch fabric 1850 is a rotating-access space switch which comprises an input rotator 1837, an array of transit memory devices 1838, and an output rotator 1839. Input ports 1814 of the input rotator 1837, connecting to inward channels 1812, as well as input port 1824 connecting to an internal channel from controller 1845 constitute the input ports of switch 1800. Output ports 1816 of the output rotator 1839, connecting to outward channels 1818, as well as output port 1826 connecting to controller 1845, constitute the output ports of switch 1800. Each input port 1814 or 1824 has cyclic access to each of the transit memory devices 1838 and each transit memory device 1838 has cyclic access to each output port 1816 and 1826. An input port, 1814 or 1824, accesses a transit memory device 1838 during a time-slot of predefined duration. During a rotation cycle, each input port, 1814 or 1824, gains access to each transit memory device 1838 and each output port 1816 or 1826 gains access to each transit memory device 1838. The rotation period, which is the duration of a rotation cycle, equals the number of input ports multiplied by the duration of a time-slot. A data segment is first transferred from an input port to one of the transit memory devices 1838 then transferred, after a deterministic delay, from the transit memory device 1838 to a destined output port 1816 or 1826. The deterministic delay is a function of the relative positions of the input port receiving the data segment and the destined output port. The maximum deterministic delay equals the rotation period minus one time-slot. The dimension of the rotator-based single-stage space switch is limited primary by a deterministic-delay tolerance. With a time-slot duration of 100 nanoseconds, for example, the maximum deterministic latency of a 256×256 switch unit is less than 26 microseconds. A controller 1845 connecting to an output port 1826 of the output rotator 1839 and connecting to an input port 1824 of the input rotator 1837 schedules the transfer times of data segments.

With rotators 1837 and 1839 having L input ports and L output ports each, the duration of a rotation cycle is L×δ, where δ is the access interval of a transit memory device 1838.

In the latent space switch of FIG. 18, with clockwise (ascending) input rotator 1837 and counterclockwise (descending) output rotator 1839, a data segment transferred from an input port 1814(j) to a transit memory device 1838 is transferred from the transit memory 1838 to a target output port 1816(k) after a delay of δ×[j−k]$_{modulo\ T}$, where T is the number of time slots per rotation period. For example, with T=8, j=0, and k=1, the delay is δ×[0−1]$_{modulo\ 8}$=7δ. With j=0 and k=7, the delay is δ×[0−7]$_{modulo\ 8}$=δ. The number T of time slots per rotation period preferably equals L. Latent space switch 1800 may also be represented in the form 1800A where the input rotator 1837 and the output rotator 1839 are combined in a dual rotator 1837/1839 which may be implemented in a single fabric.

Core Matrix Connecting to Asymmetrical Edge Nodes

Figure 19:
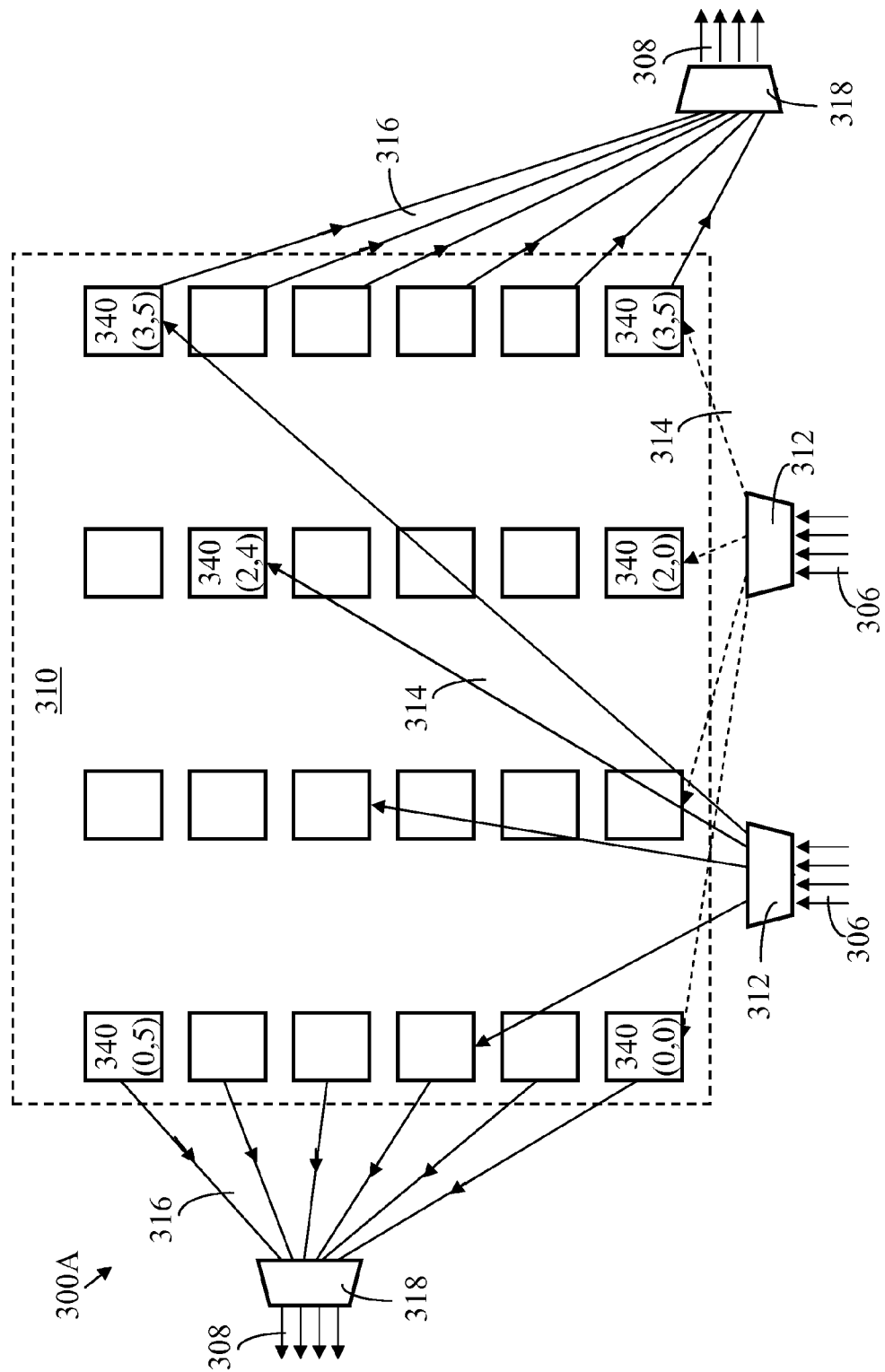
FIG. 19 illustrates an asymmetrical switching node in accordance with an embodiment of the present invention comprising a plurality of source nodes, a plurality of switch units and a plurality of sink nodes where the switch units are logically arranged into rows and columns and none of the switch units is directly connected to any other switch unit—each source node directly connects to one switch unit in each column and each sink node directly connects to each switch unit in a selected column.

FIG. 19 illustrates an asymmetrical switching node 300A, comprising a plurality of source nodes 312, a plurality of independent switch units 340, logically arranged into a rectangular matrix 310 of six rows and four columns and a plurality of sink nodes 318, where none of the switch units 340 is directly connected to any other switch unit. Each source node 312 receives data from data sources through ingress channels 306 and has outbound channels 314 connecting to switch units 340 of different rows. Each sink node 318 has inbound channels 316 from switch units 340 of different rows but belonging to the same column of matrix 310. A sink node 318 transmits data to data sinks through egress channels 308. In the switching node 300 of FIG. 3, a source node connects to switch units 340 in different columns but in the same row. In the switching node 300A of FIG. 19, a source node connects to switch units 340 in different columns and also in different rows.

Figure 20:
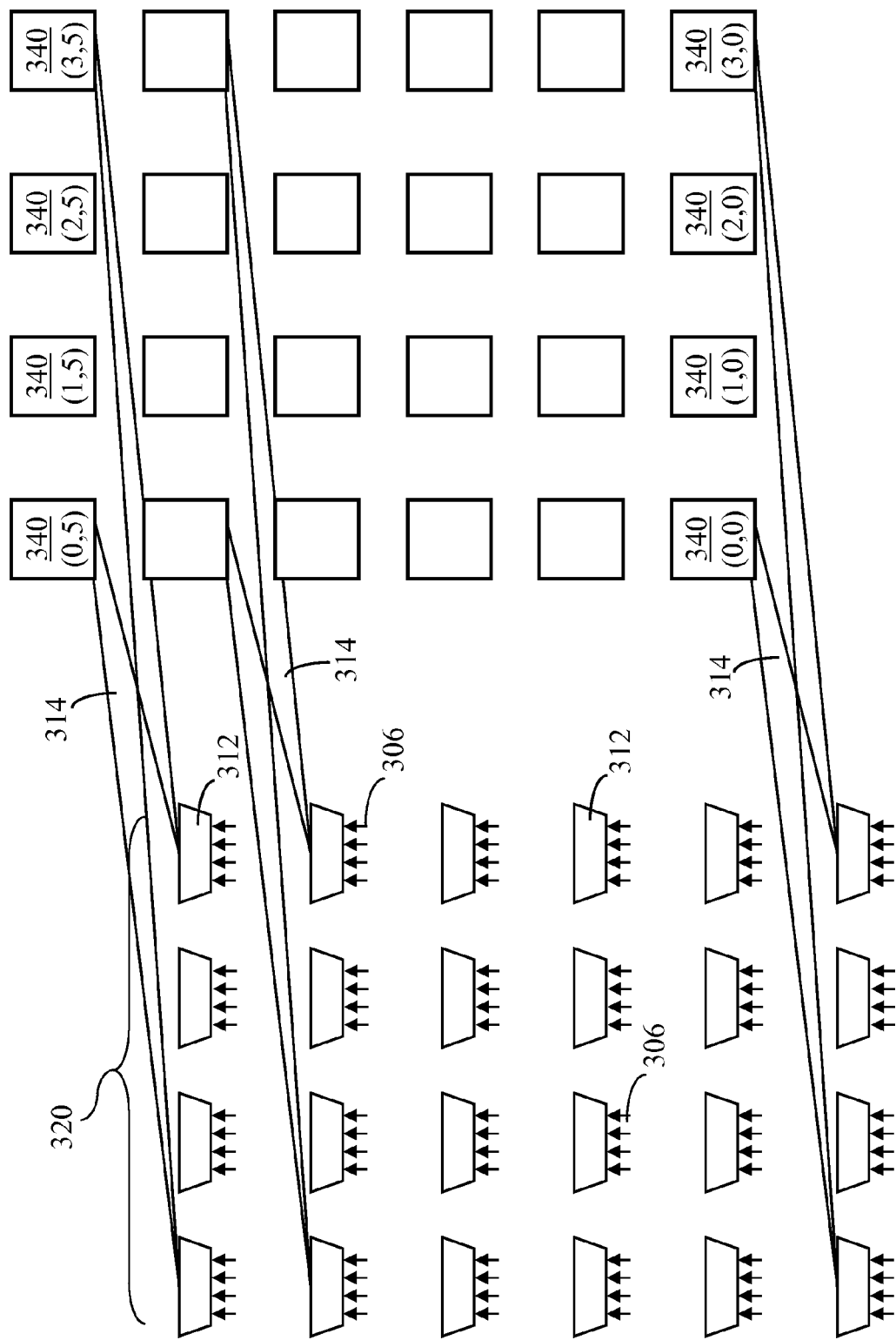
FIG. 20 illustrates source node connectivity in the switching node of FIG. 19.

FIG. 20 illustrates an arrangement of the switching node 300A of FIG. 19 where the source nodes 312 are arranged in groups 320 each group comprising four source nodes 312. Each source-node group 320 is optionally associated with a corresponding row and each source node 312 in a source-node group 320 connects to each switch unit 340 of a corresponding row.

Figure 21:
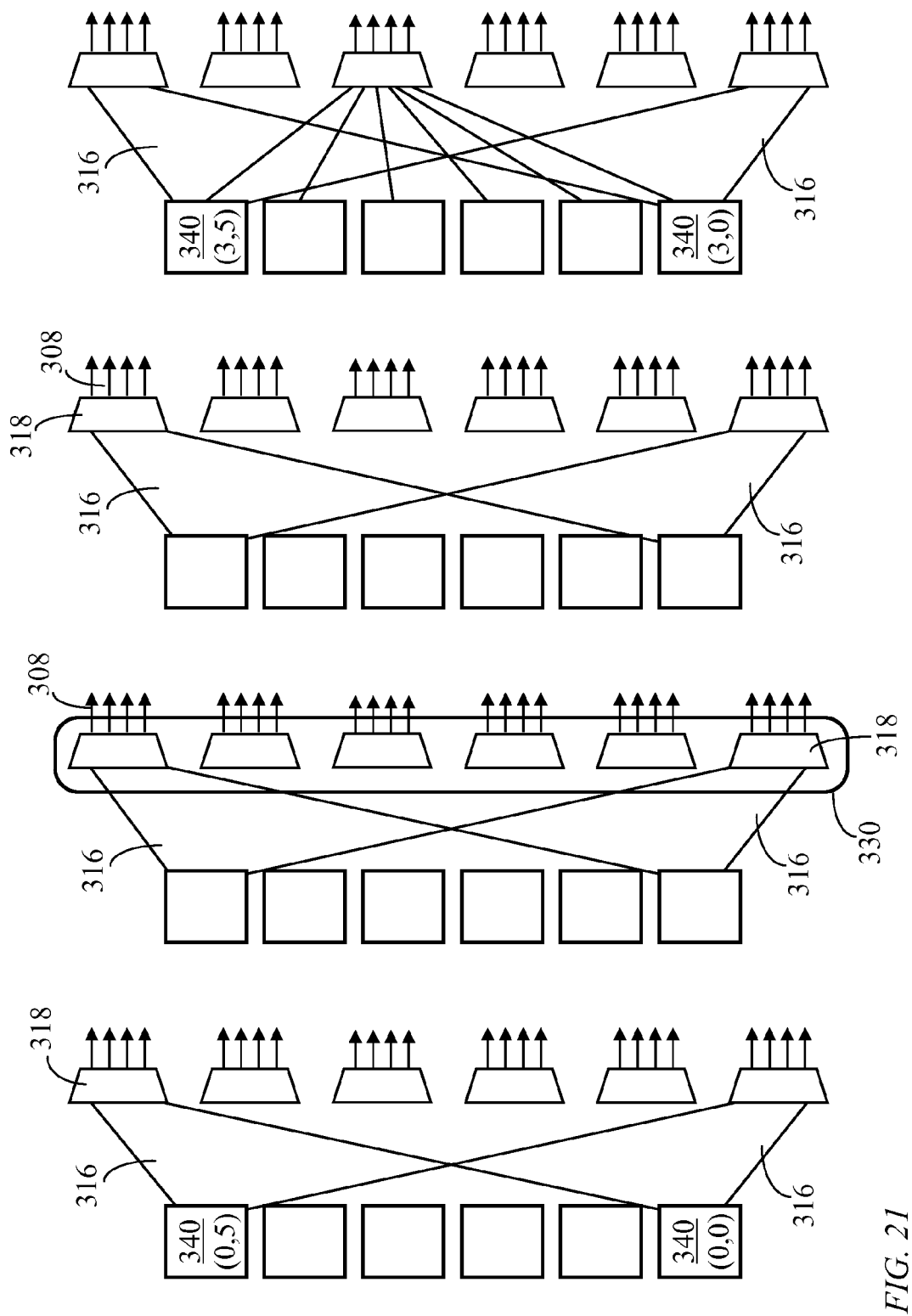
FIG. 21 illustrates sink-node connectivity in the switching node of FIG. 19.

FIG. 21 illustrates an arrangement of the switching node 300A of FIG. 19 where the sink nodes 318 are arranged in groups 330 each comprising six sink nodes 318. Each sink-node group 330 is associated with a corresponding column and each sink node 318 in a sink-node group 330 connects to each switch unit 340 of a corresponding column.

Figure 22:
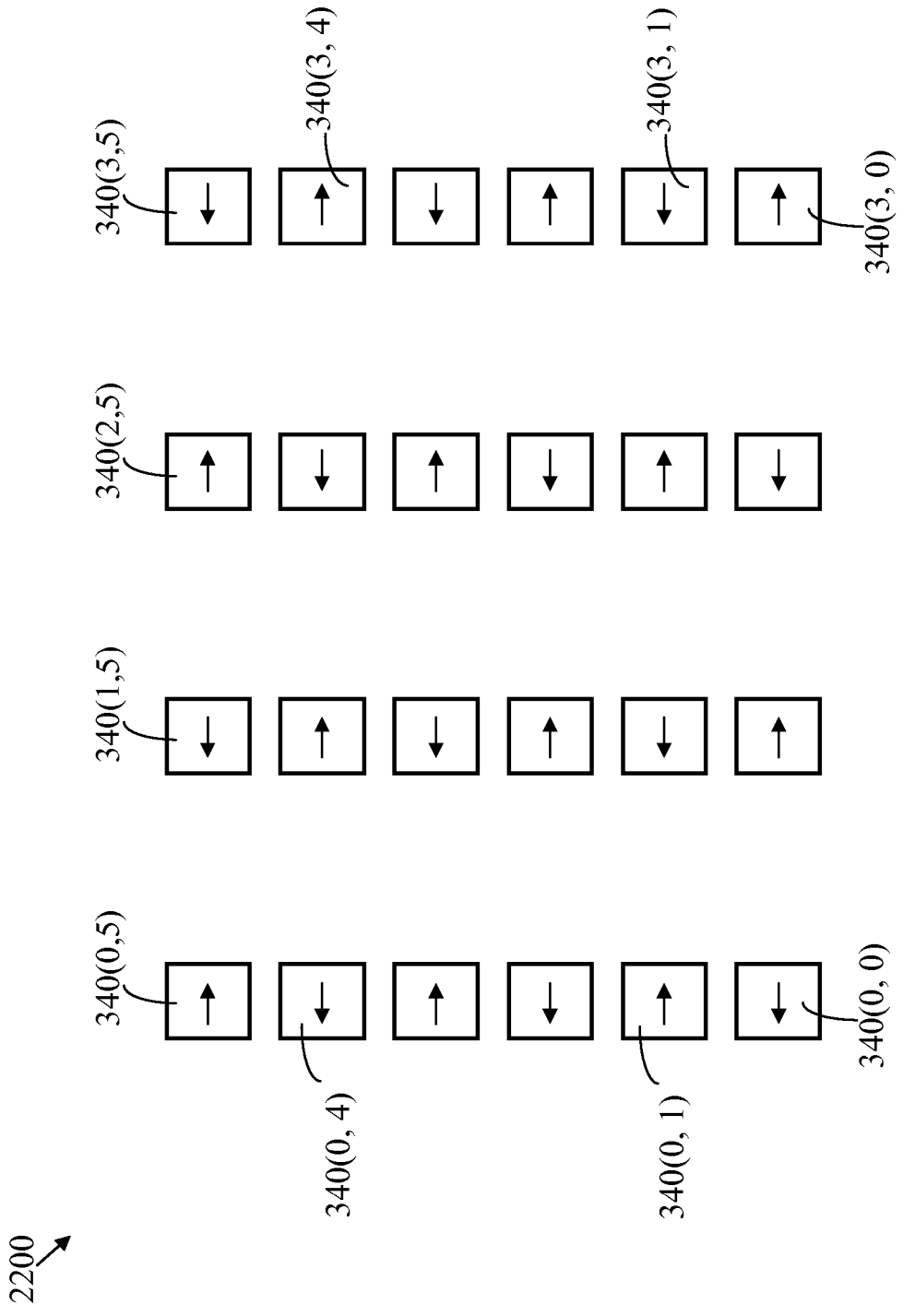
FIG. 22 illustrates the use of latent space switches of opposite phases in accordance with an embodiment of the present invention.

FIG. 22 illustrates an arrangement 2200 of the switch units 340 of switching node 300A where each of the switch units 340 is a rotator-based latent space switch 1800 as described with reference to FIG. 18 but the rotation directions of the rotators 1837 and 1839 may differ. In a switch unit of a first type, such as switch units 340(0, 1) or 340(3, 4), the input rotator 1837 and the output rotator 1839 may rotate in the clockwise and counterclockwise directions, respectively. In a switch unit of a second type, such as switch unit 340(0,0) or 340(3,1), input rotator 1837 and the output rotator 1839 may rotate in the counterclockwise and clockwise directions, respectively. In a rotator-based switch unit 1800 (FIG. 18) of dimension (m+1)×(m+1), there is a systematic switching delay ranging from 0 to m×δ, δ being the access time of a transit memory device 1838. The value of the delay depends on the relative positions of the input and output ports in the switch unit 340. A source node 312 has one direct path and, with μ=ν, (μ−1) non-intersecting compound paths to each sink node 318 (excluding a sink node integrated with the source node). Each compound path traverses two switch units 340 and the (μ−1) compound paths may have unequal systematic delays. This property may be exploited to select a compound path of minimum systematic delay, which is the sum of the systematic delays of the two traversed switch units 340. An edge controller of an edge node may maintain descriptors of non-intersecting compound paths to each other edge node and determine a switching latency of each of the compound paths based on provided information on the connectivity of switching node 300A. The compound paths from a source node 312 to the sink nodes 318 may be sorted in an ascending order according to their systematic delays and the first available compound path having a sufficient vacancy may be selected for a connection. The use of the arrangement of FIG. 22, with switch units of the first type interleaved with switch units of the second type, may increase the opportunity to reduce compound-path systematic delay. The rotator pairs 1837/1839 of the rotator-based latent space switches 1800 used as switch units 340 may be operated at a gradual phase differential to further reduce the minimum compound-path systematic delay.

Square Core Matrix

Figure 23:
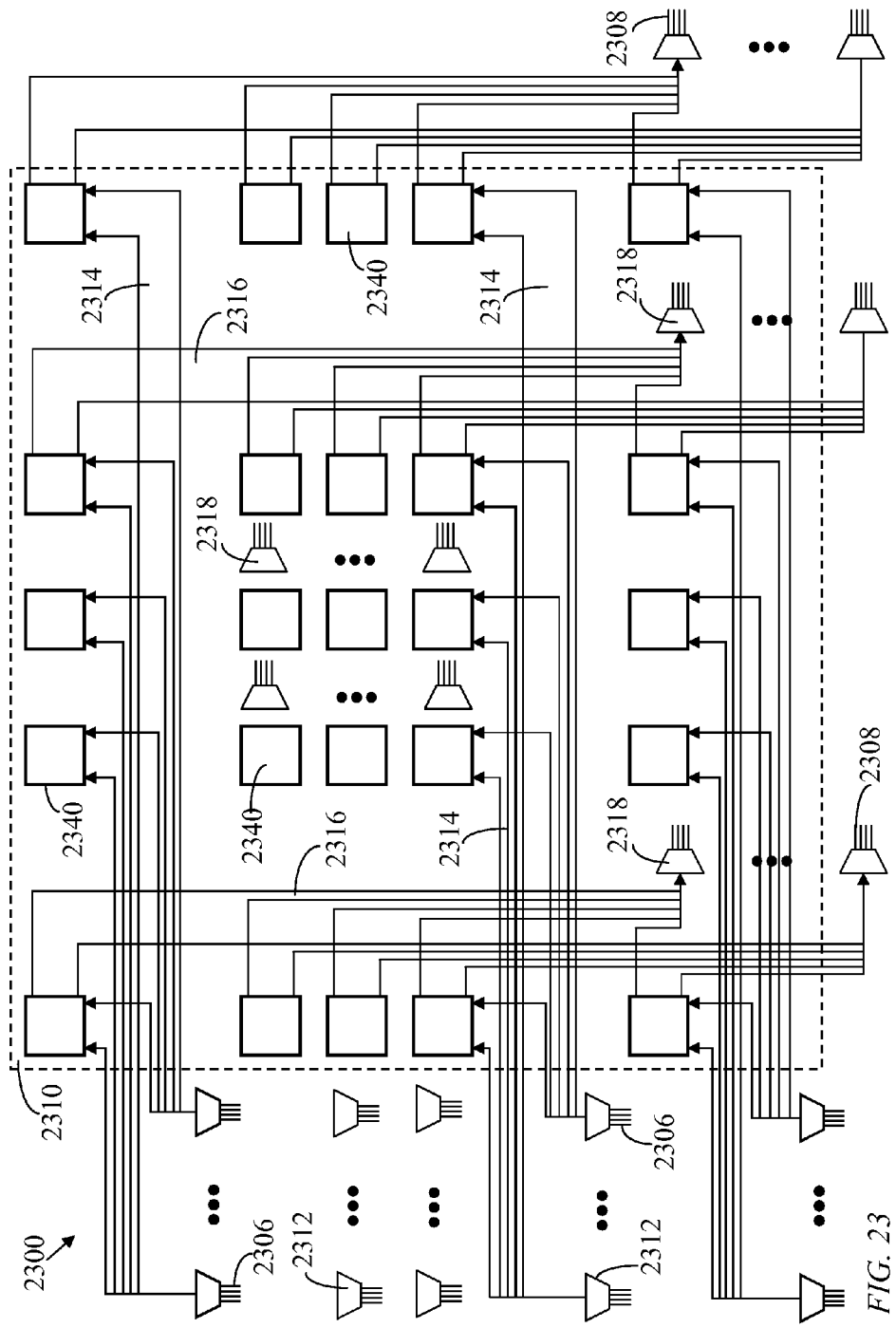
FIG. 23 illustrates an exemplary switching node of the type illustrated in FIG. 3 and FIG. 4 comprising a matrix of switch units with five rows and five columns in accordance with an embodiment of the present invention.

FIG. 23 illustrates a switch 2300 having 25 switch units 2340 (similar to switch units 340) arranged in a matrix 2310 of five rows (ν=5) and five columns (μ=ν=5). Each switch unit 2340 is of dimension 5×5 (m=n=5). The maximum number of source nodes 2312 (corresponding to source nodes 312) is therefore 25 and the maximum number of sink nodes 2318 (corresponding to sink nodes 318) is also 25. Each source node 2312 has five outbound channels 2314 connecting to switch units 2340 in different columns. Each sink node 2318 has five inbound channels 2316 from switch units 2340 in different rows. In this example, the outbound channels 2314 of each source node 2312 connect to switch units 2340 of the same row and each sink node 2318 connects to switch units 2340 of the same column. With each source node 2312 connecting to each switch unit 2340 in a row and each sink node 2318 connecting to each switch unit 2340 in a column, each source node has a simple path, traversing one of the switch units 2340, to each sink node.

Figure 24:
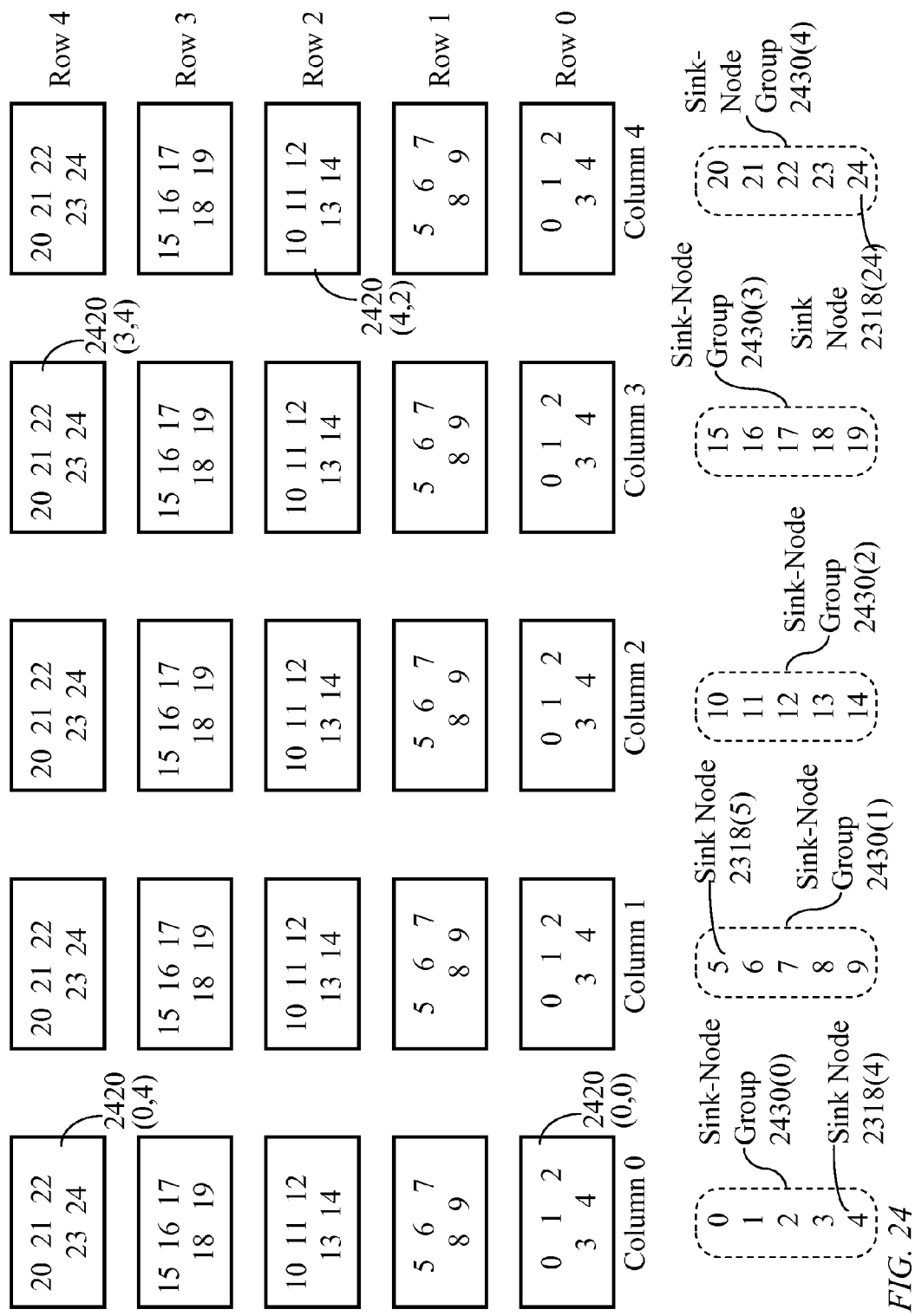
FIG. 24 illustrates a first connectivity pattern of the matrix of switch units of FIG. 23 in accordance with an embodiment of the present invention.

FIG. 24 illustrates a connection pattern of source nodes 2312 and sink nodes 2318 to the switch units 2340 in the switch of FIG. 23 where each switch unit 2340 is of dimension 5×5 (m=n=5) and the maximum number of source nodes or sink nodes is μ×m=25. The 25 source nodes 2312 are individually identified as 2312(0), 2312(1), ..., 2312(24) and the 25 sink nodes 2318 are individually identified as 2318(0), 2318(1), ..., 2318(24). For clarity of FIG. 24 (and FIGS. 25, 29, 30, 31, 32, and 33), only the indices 0, 1, ..., 24 are used for individually identifying a source node 2312 or a sink node 2318. The source nodes 2312 are arranged into groups 2420, individually identified as 2420(c,r), 0≤c<μ, 0≤r<ν. The sink nodes 2318 are arranged in μgroups 2430, individually identified as 2430(c), 0≤c<μ, i.e., 2430(0), 2430(1), ..., 2430(4). Each source node 2312 in a source-node group 2420(c,r) connects to each switch unit 2340 in a row r, 0≤r<ν. Each sink node 2318 in a group 2430(c) of five sink nodes 2318 connects to each switch unit 2340 in a column c, 0≤c<5. For example, each switch unit 2340 in the row 0 connects to source nodes 2312(0), 2312(1), 2312(2), 2312(3), and 2312(4) as indicated in group 2420(0) and each switch unit 2340 in the column 2 connects to sink nodes 2318(10), 2318(11), 2318(12), 2430(13), and 2318(14) as indicated in group 2430 (2). The source nodes 2312 and sink nodes 2318 are paired so that each source node is integrated with a sink node with which it shares memory and control.

Figure 25:
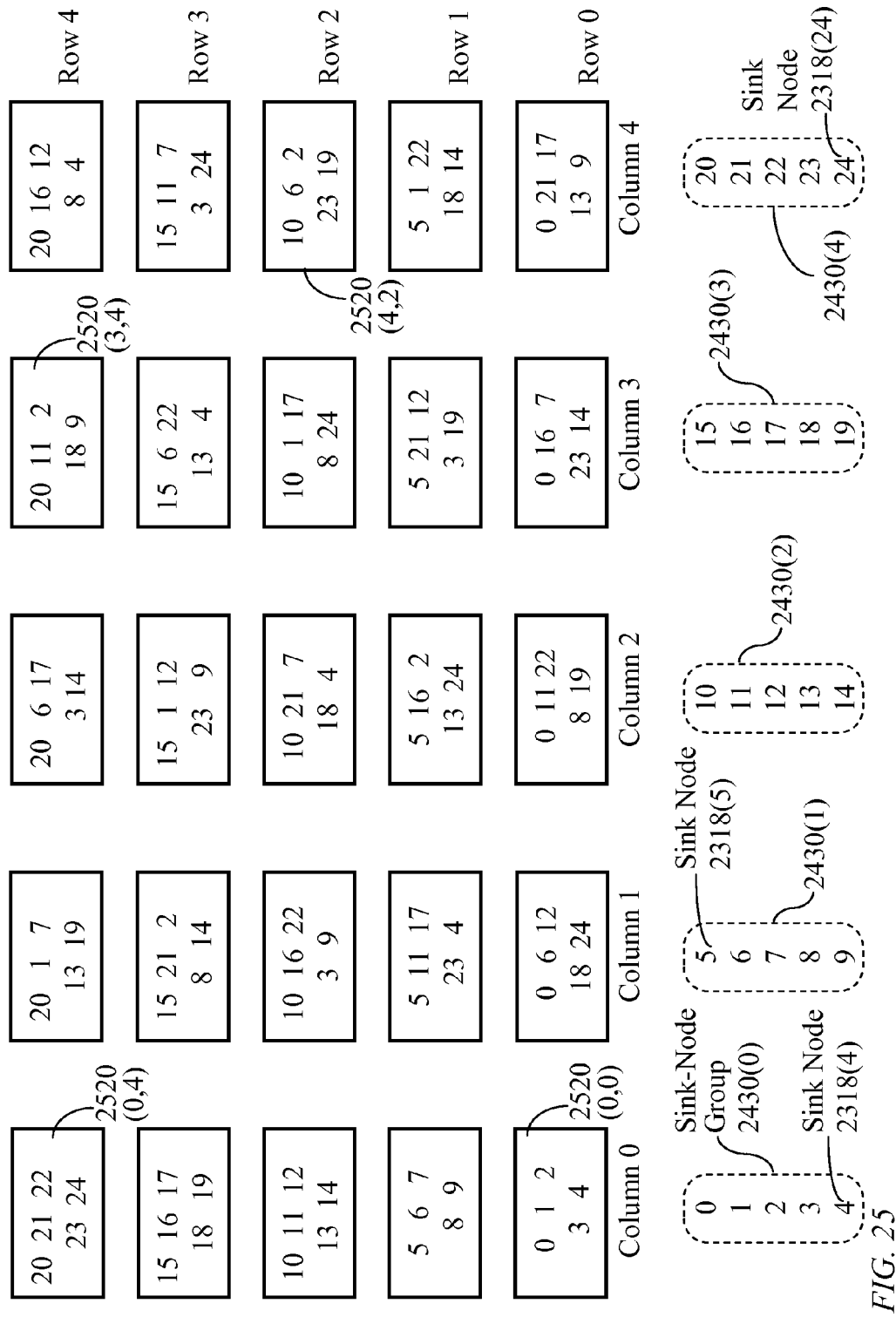
FIG. 25 illustrates a second connectivity pattern of the matrix of switch units of FIG. 23 in accordance with an embodiment of the present invention.

With widely varying spatial distribution of traffic, it is beneficial to let each source node 2312 connect to switch units 2340 in different columns and different rows. FIG. 25 illustrates an alternative connection pattern of source nodes 2312 and sink nodes 2318 to the switch units 2340 in the switch of FIG. 23. Each sink node 2318 is connected to a switch unit 2340 in a same column as in the connection pattern of FIG. 24. A source node 2312, however, connects to switch units in different columns but not necessarily of the same row. For example, the first switch unit 2340(0,0) in row 0 connects to source nodes 2312(0), 2312(1), 2312(2), 2312(3), and 2312(4), while the second switch unit 2340(1,0) in the row 0 connects to source nodes 2312(0), 2312(6), 2312(12), 2312(18), and 2312(24). The source nodes 2312 are arranged into groups 2520, individually identified by the rows and columns of switch units, so that a group of source nodes connecting to a switch unit 2340(c, r) in column c and row r is identified as 2520(c,r), 0≤c<5, and 0≤r<5.

With the switch units 2340 arranged in μ>1 columns and ν=μ rows, and with each switch unit 2340 having m inward ports and n=m outward ports, m>1, n>1, the maximum number S of source nodes 2312 is S=μ×m. The μ columns may be indexed sequentially from 0 to (μ−1) and the ν rows may be indexed sequentially from 0 to (ν−1). The source nodes 2312 may be indexed sequentially as 2312(0), 2312(1), . . . , 2312(S−1). Selecting both m and μ to be prime numbers, orthogonal sets, Q(c, r), 0≤c<μ, 0≤r<ν, of source nodes, where the orthogonal sets have an orthogonality index of 1, may be formed so that set Q(c, r) comprises source nodes 2312 of indices: $\{j\times(1+m\times c)+m\times r\}_{modulo\ s}$, 0≤j<m. The source nodes of a set Q(c, r) connect to a switch unit in column c, 0≤c<μ, and row r, 0≤r<ν. For general values of m, n, μ, and ν numerical methods may be used to select μ×ν orthogonal sets of source nodes connecting to switch units 2340, each set comprising at most m switch units 2340.

Figure 26:
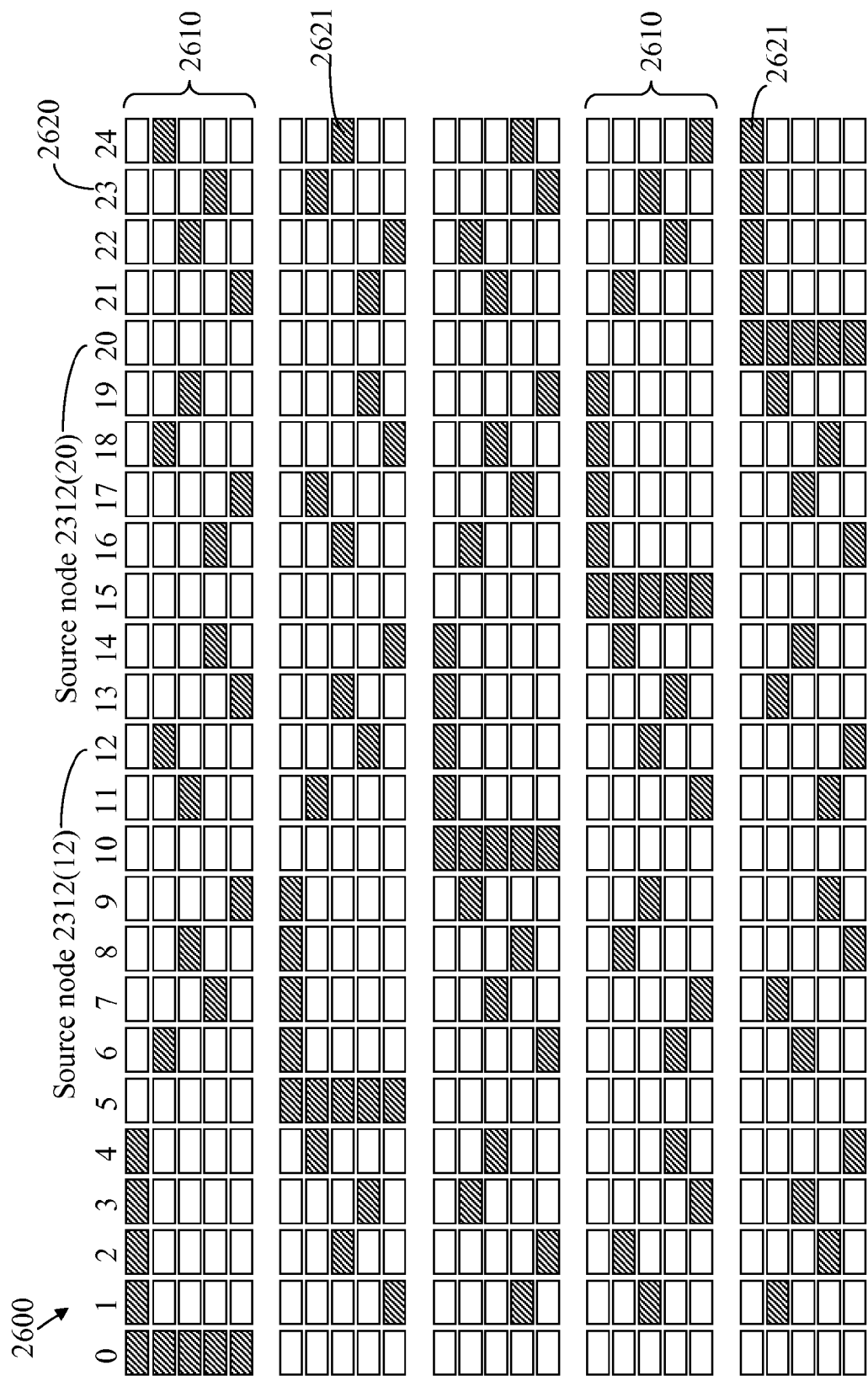
FIG. 26 illustrates orthogonal connectivity of source nodes to the matrix of switch units of FIG. 23 in accordance with an embodiment of the present invention.

The assignment of source nodes 2312 to the switch units 2340 is determined in a manner which ensures that a group 2520 of source nodes 2312 connecting to any switch unit 2340 has a small number (preferably at most one) of source nodes in common with a group of source nodes connecting to any other switch unit 2340. This property is illustrated in FIG. 26 which depicts a matrix 2600 divided into five sub-matrices 2610 each having 5 rows and 25 columns. Each sub-matrix 2610 corresponds to a row of switch units 2340 in switching node 2300 of FIG. 23. Each row in a matrix 2600 corresponds to one of the switch units 2340, and each column corresponds to a source node 2312(x) identified by the index "x" (reference numeral 2620). A connection of a source node 2312 to a switch unit 2340 according to the connection pattern of FIG. 25 is indicated by a marked cell 2621 in a matrix 2600. It is observed that each column in matrix 2600 includes exactly five marked cells 2621, and each row includes exactly five marked cells 2621. Furthermore, any two rows in a matrix 2600 have at most one marked cell 2621 in a same column. The source-node groups thus formed are called "orthogonal source-node groups". Any two source-node groups are said to be orthogonal if they contain at most a predefined number of common source nodes 2312 which defines an orthogonality index; in the example of FIG. 26, the orthogonality index is 1. The source-node groups may also be formed according to a more relaxed requirement, where a pair of source-node groups may have more than one source node in common.

Parallel Switch Planes

Figure 27:
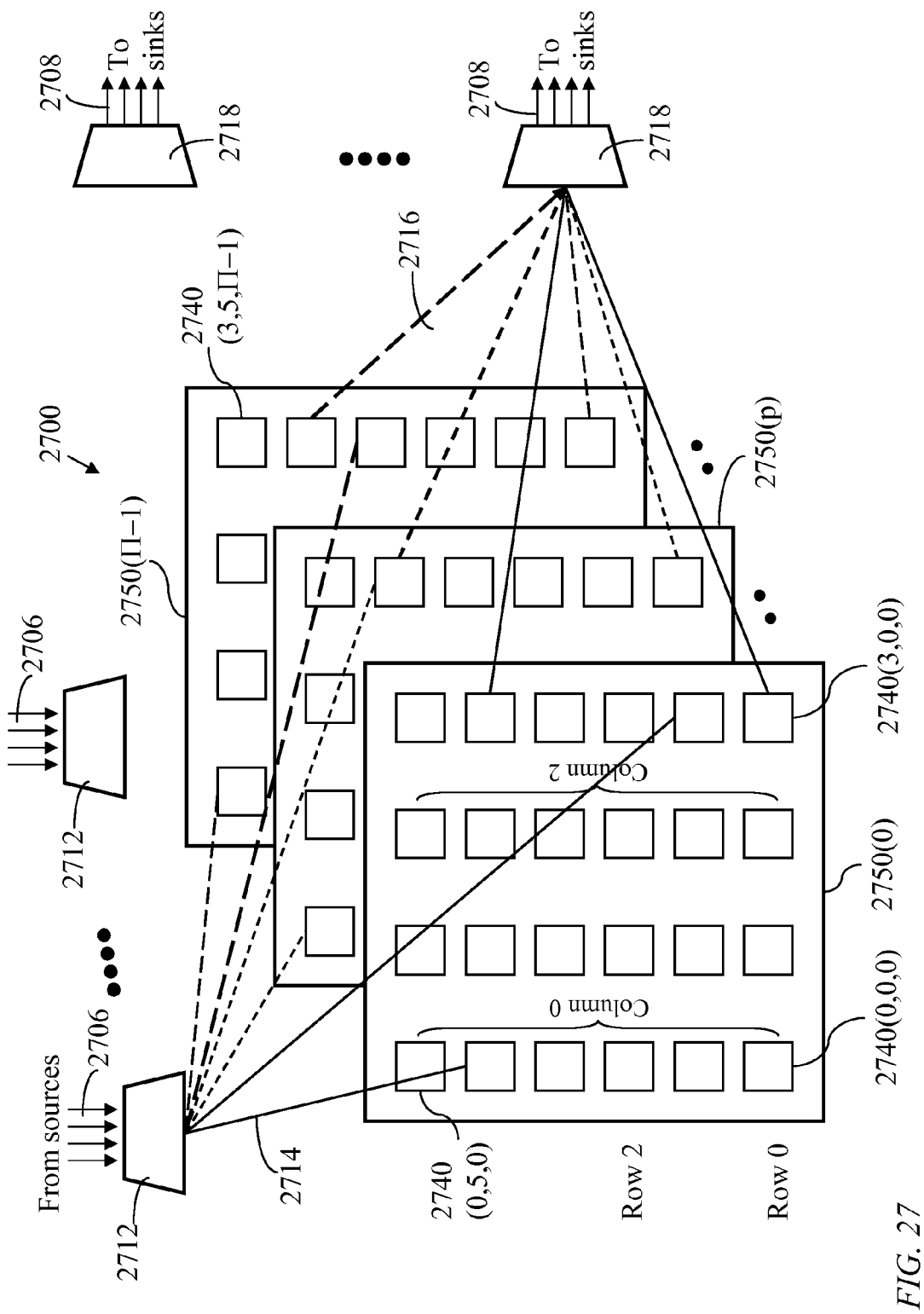
FIG. 27 illustrates a switching node having multiple switch planes, each switch plane comprising switch units arranged in a matrix in accordance with an embodiment of the present invention.

FIG. 27 illustrates a switching node 2700 similar to switch 2300 but having multiple switch planes 2750, individually identified as 2750(p), 0≤p<Π, where Π is the number of switch planes. Each switch plane 2750 comprises switch units 2740 arranged in a matrix of μ columns and ν rows. Each source node 2712 connects to a switch unit 2740 in each column in each switch plane 2750 through an outbound channel 2714 and each sink node 2718 connects to each switch unit of one column in each switch plane through an inbound channel 2716. With μ columns and ν rows per switch plane 2750, the number of outbound channels 2714 from a source node 2712 is μ×Π and the number of inbound channels 2716 to a sink node 2718 is ν×Π. A switch unit 2740, in column c and row r in a switch plane 2750(p) is herein identified as 2740(c,r,p).

Figure 28:
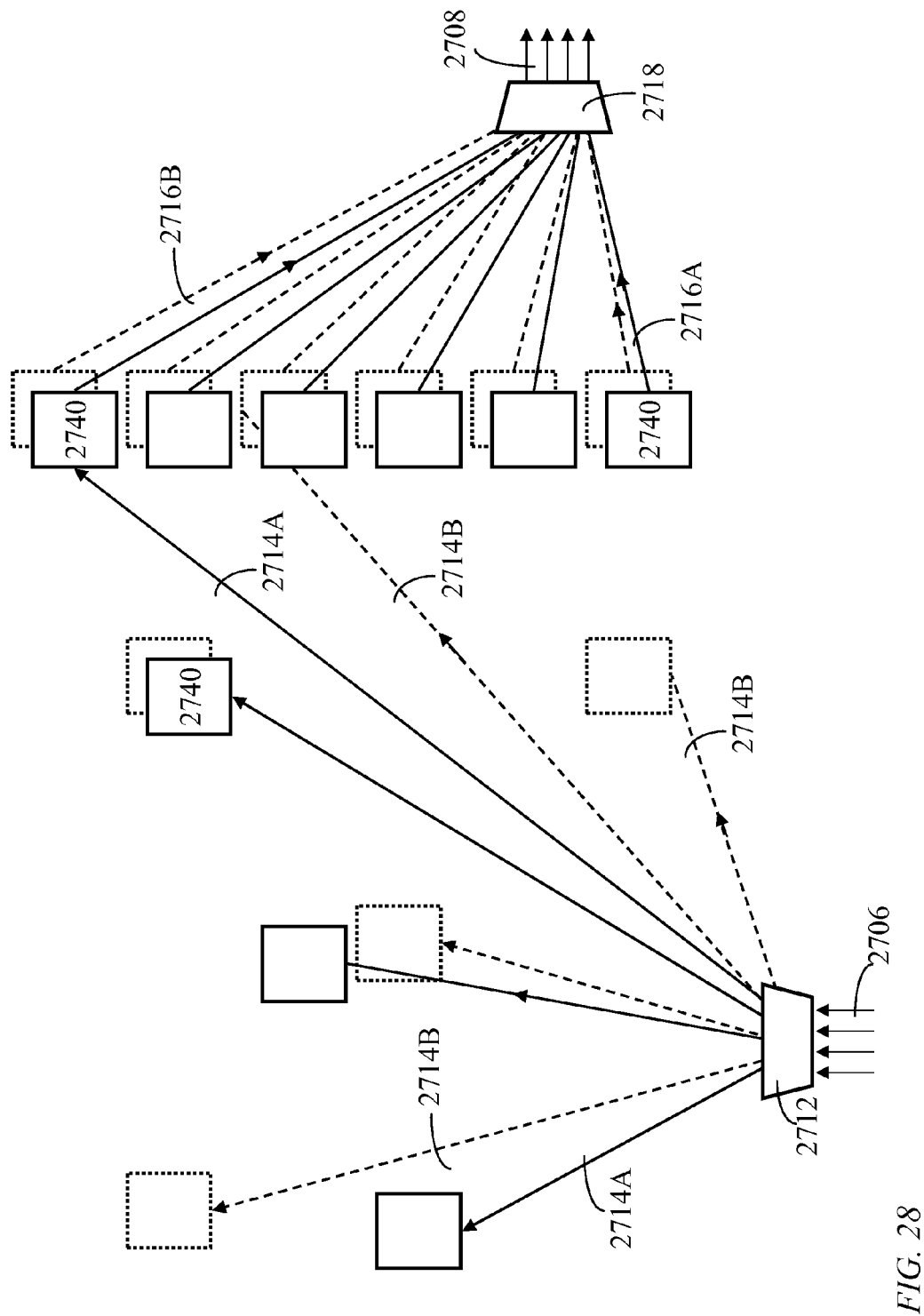
FIG. 28 illustrates the use of two parallel matrices of switch units in accordance with an embodiment of the present invention.

FIG. 28 illustrates connections from a source node 2712 to switch units 2740 and connections from switch units 2740 to a sink node 2718 in a switching node 2700 comprising two switch planes (Π=2). Source node 2712 receives data from data sources through ingress channels 2706, and has four channels 2714A to switch units 2740 in a first switch plane 2750 and four channels 2714B to switch units 2740 in a second switch plane 2750. Sink node 2718 has six channels 2716A from switch units 2740 of the first switch plane 2750 and six channels 27168 from switch units 2740 of the second switch plane 2750, and transmits data to data sinks through egress channels 2708. Source nodes 2712 and sink nodes 2718 are paired to form integrated edge nodes.

Orthogonal Connectivity within a Switch Plane

Within each switch plane p, 0≤p<Π, the connectivity of source nodes 2712 to switch units 2740(c,r,p), 0≤c<μ, 0≤r<ν, may be selected so that the source-node sets connecting to all switch units are mutually orthogonal as illustrated in FIG. 25.

Cross-Plane Orthogonality

With the switch units 2740 arranged in μ>1 columns and ν=μ rows, and with each switch unit 2740 having m inward ports and n=m outward ports, m>1, n>1, the maximum number S of source nodes 2712 is S=μ×m. The source nodes 2712 may be indexed sequentially as 2712(0), 2712(1), . . . , 2712(S−1). Selecting both m and μ to be prime numbers, orthogonal sets of source nodes, with an orthogonality index of 1, connecting to switch units 2740(c, r, p) in switch plane 2750(p), 0≤p<Π, row r, 0≤r<ν, and any column c, may be formed so that each set comprises m source nodes 2712 of indices determined according to the expression:

$$\{j\times(1+m\times p)+m\times r\}_{modulo\ S}, 0\le j<m.$$

For general values of m, n, μ, and ν numerical methods may be used to select orthogonal sets of source nodes connecting to switch units 2740 of different rows in different switch planes.

FIGS. 29-32 illustrate connection patterns of source nodes 2712 and sink nodes 2718 to switch units 2740 in four switch planes 2750 of a five-plane (Π=5) switching node 2700 where a first switch plane uses the same connectivity pattern of FIG. 24. Each source-node group 2920, 3020, 3120, or 3220 corresponds to a switch unit 2740(c,r,p) in column c and row r of a respective switch plane 2750(p), p=1, 2, 3, and 4. A source-node group in switch plane 2750(1) may be identified by indices (c, r). Likewise, each of source-node groups 3020 in switch plane 2750(2), 3120 in switch plane 2750(3), and 3220 in switch plane 2750(4) may be individually identified by a respective column c and row r. The indices (c,r,p) are appended to each source-node group in FIGS. 29-32. The sink nodes are grouped in a pattern similar to that of FIG. 24.

Figure 29:
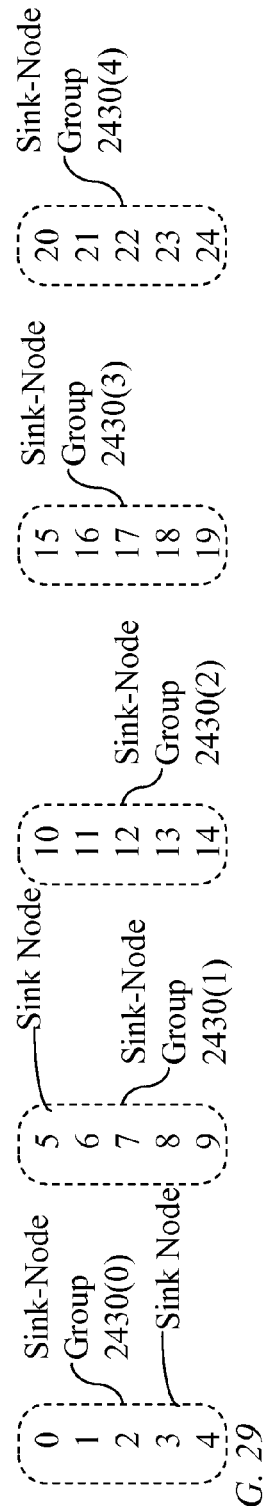
Figure 30:
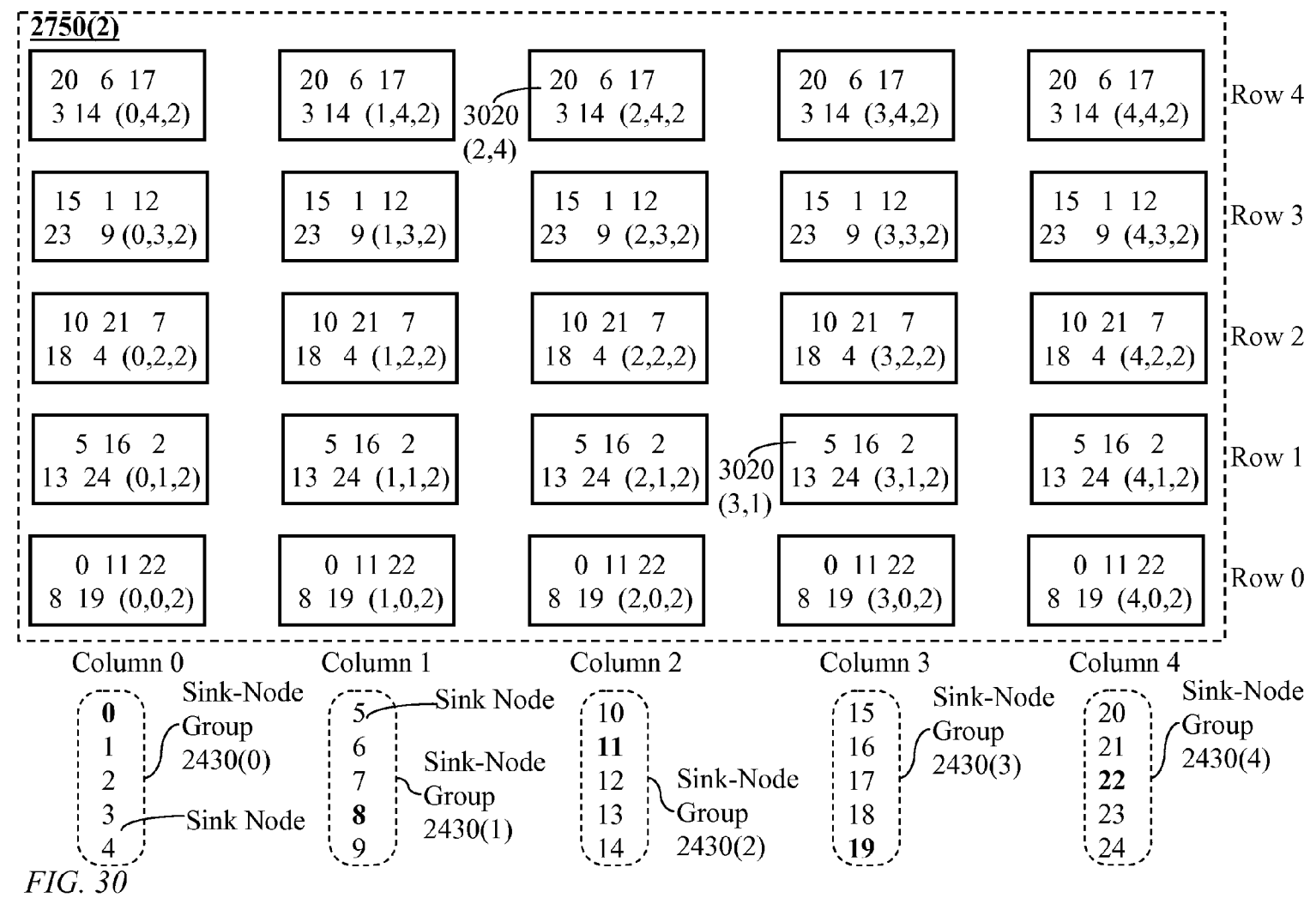
Figure 31:
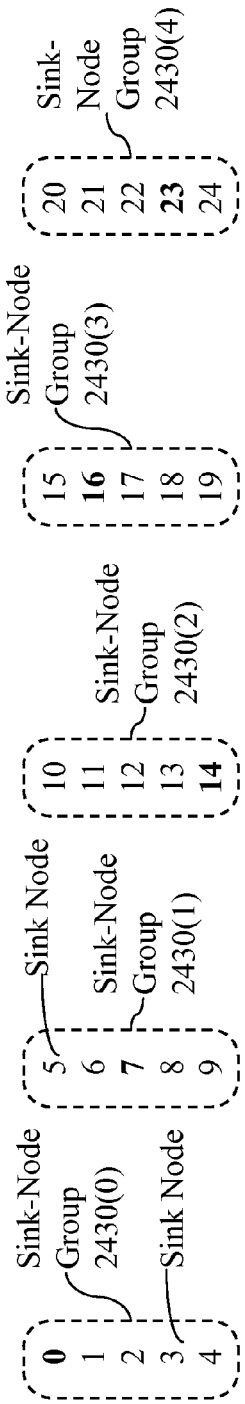
Figure 32:
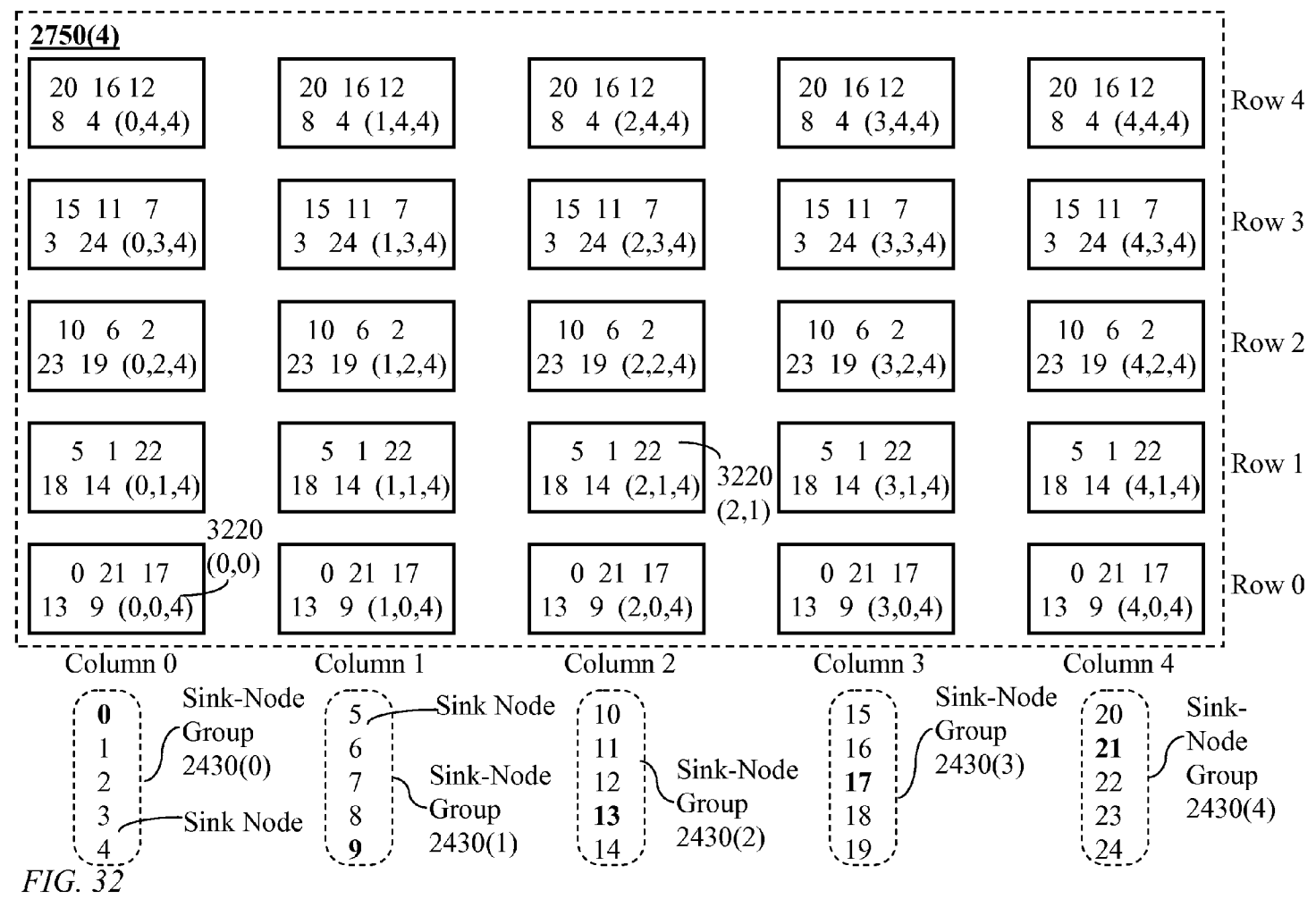

Source-node connectivity to the switch units 2740 differ among the five arrangements of FIG. 24 and FIGS. 29-32. For example, the source-node groups 2420 and 2920 connecting to switch units 2740(0,0,p) and to switch units 2740(0,2,p), for 0≤p<5 (Π=5) are listed below to illustrate cross-plane orthogonality. It is noted that source nodes 2712 connecting to a switch unit 2740(c,r,p) are listed in FIGS. 24, 29, 30, 31, and 32 in an order determined by the above expression for generating orthogonal sets. In the exemplary listing below, the source nodes 2712 connecting to a switch unit 2740 are listed according to an ascending order of their identifiers for ease of illustrating the mutual orthogonality of the sets of source nodes connecting to different switch units 2740. For example, the source nodes connecting to switch unit 2740 of column 0, row 2 of switch plane 1 are determined in the order 2712(10), 2712(16), 2712(22), 2712(3), and 2712(9) as indicated in FIG. 29 but are listed below in the order source nodes 2712(3), 2712(9), 2712(10), 2712(16), and 2712(22). A source-node group connecting to a switch unit 2740 in one switch plane has at most one source node in common with a source-node group connecting to any other switch unit 2740 in any other switch plane. For example, switch units 2740 in row 0 of all five switch planes have one common source node 2712(0), and switch units 2740 in row 2 of all five switch planes have one common source node 2712(10):

| Switch unit: 2712(x) |
|---|
| 2740(0, 0, 0): 0, 1, 2, 3, 4 |
| 2740(0, 0, 1): 0, 6, 12, 18, 24 |
| 2740(0, 0, 2): 0, 8, 11, 19, 22 |
| 2740(0, 0, 3): 0, 7, 14, 16, 23 |
| 2740(0, 0, 4): 0, 9, 13, 17, 21 |
| 2740(0, 2, 0): 10, 11, 12, 13, 14 |
| 2740(0, 2, 1): 3, 9, 10, 16, 22 |
| 2740(0, 2, 2): 4, 7, 10, 18, 21 |
| 2740(0, 2, 3): 1, 8, 10, 17, 24 |
| 2740(0, 2, 4): 2, 6, 10, 19, 23 |

Figure 33:
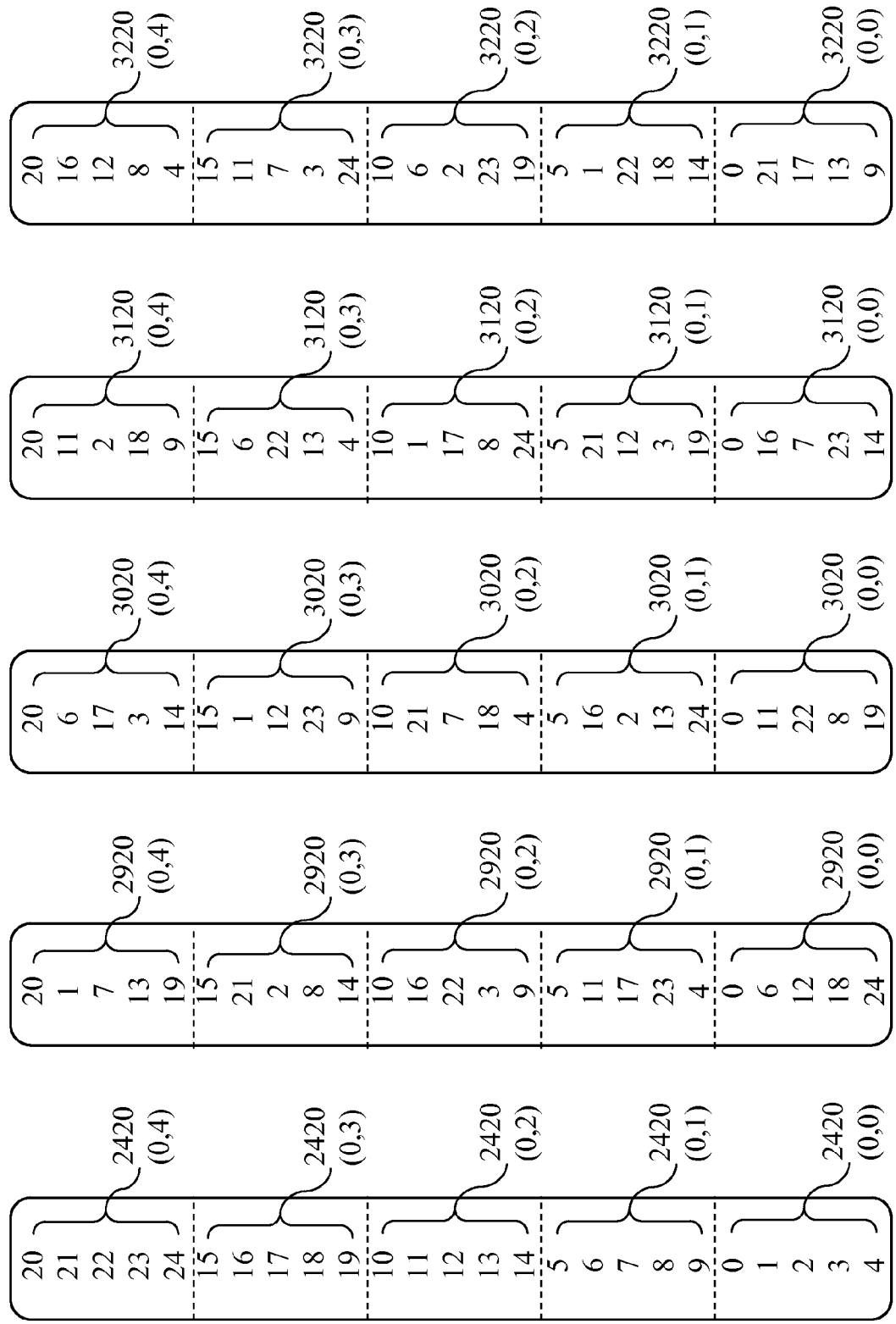
FIG. 33 concisely illustrates the connectivity patterns of the five parallel switch planes of FIGS. 24 and 29-32.

FIG. 33 summarizes the connection patterns of source nodes 2712 to switch units 2740 in the five switch planes 2750(0), 2750(1), 2750(2), 2750(3), and 2750(4) having the connectivity patterns of FIGS. 24, 29, 30, 31, and 32, respectively. Each source-node group connects to one of the switch units 2740 in a row r of a matrix in switch plane 2750(p), 0≤r<v, 0≤p<Π. Notably any two source-node groups have at most one source-node 2712 in common. i.e., the source-node groups are mutually orthogonal with an orthogonality index of 1.

Control System for a Single-Plane Switching Node

Figure 34:
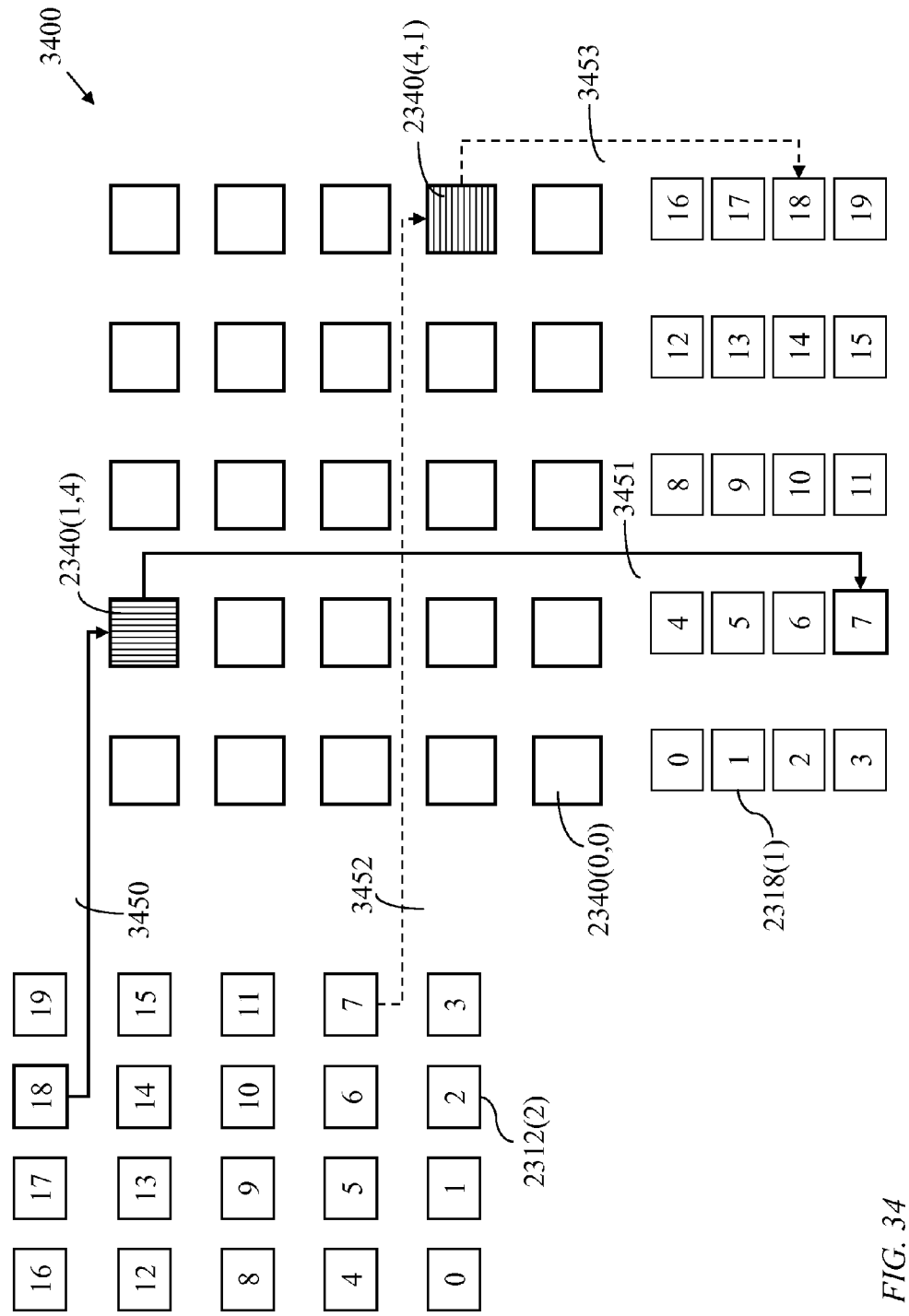
FIG. 34 illustrates a control path for setting up a direct connection from a source node to a sink node in accordance with an embodiment of the present invention.

FIG. 34 illustrates simple control paths according to the present invention for a switching node 3400, similar to exemplary switching node 2300 of FIG. 23, comprising 25 switch units 2340 arranged in five rows and five columns. Each switch unit 2340 in FIG. 34 is of dimension 4×4 (m=n=4), thus 20 source nodes 2312 and 20 sink nodes 2318 may be accommodated. The source nodes 2312 are individually identified as 2312(0), 2312(1), . . . , 2312(19), and the sink nodes 2318 individually identified as 2318(0), 2318(1), . . . , 2318(19). For brevity, only the indices 0, 1, . . . , 19 are used in FIG. 34 to identify the source nodes and sink nodes.

A control path 3450/3451 from a source node 2312(18) to a sink node 2318(7) is illustrated. The control path traverses one switch unit 2340(1,4) in column 1 and row 4. A reverse path 3452/3453 from source node 2312(7) to sink node 2318(18) traverses switch unit 2340(4,1) in column 4 and row 1; source node 2312(7) is integrated with sink node 2318(7) and sink node 2318(18) is integrated with source node 2312(18). The availability of a sufficient number of matching time slots for a connection from source node 2312(18) to sink node 2318(7) is determined by a controller of switch unit 2340(1,4) which communicates the result to a controller of edge node 2312(7)/2318(7). The controller of edge node 2312(7)/2318(7) uses the reverse path 3452/3453 to communicate the result to a controller of edge node 2312(18)/2318(18).

Each source node 2312 has a path to each sink node 2318 through a switch unit 2340 and, hence, a controller of any originating edge node, comprising a source node 2312 and a sink node 2318, can communicate with a controller of any destination edge node through a reserved control path traversing a single switch unit 2340 during a dedicated time slot in a slotted time frame. In establishing an indirect connection in a compound path traversing two switch units 2340, a controller of the originating source node 2312 may communicate with a controller of an intermediate edge node 2312/2318 as well as a controller of the destination sink node.

Figure 35:
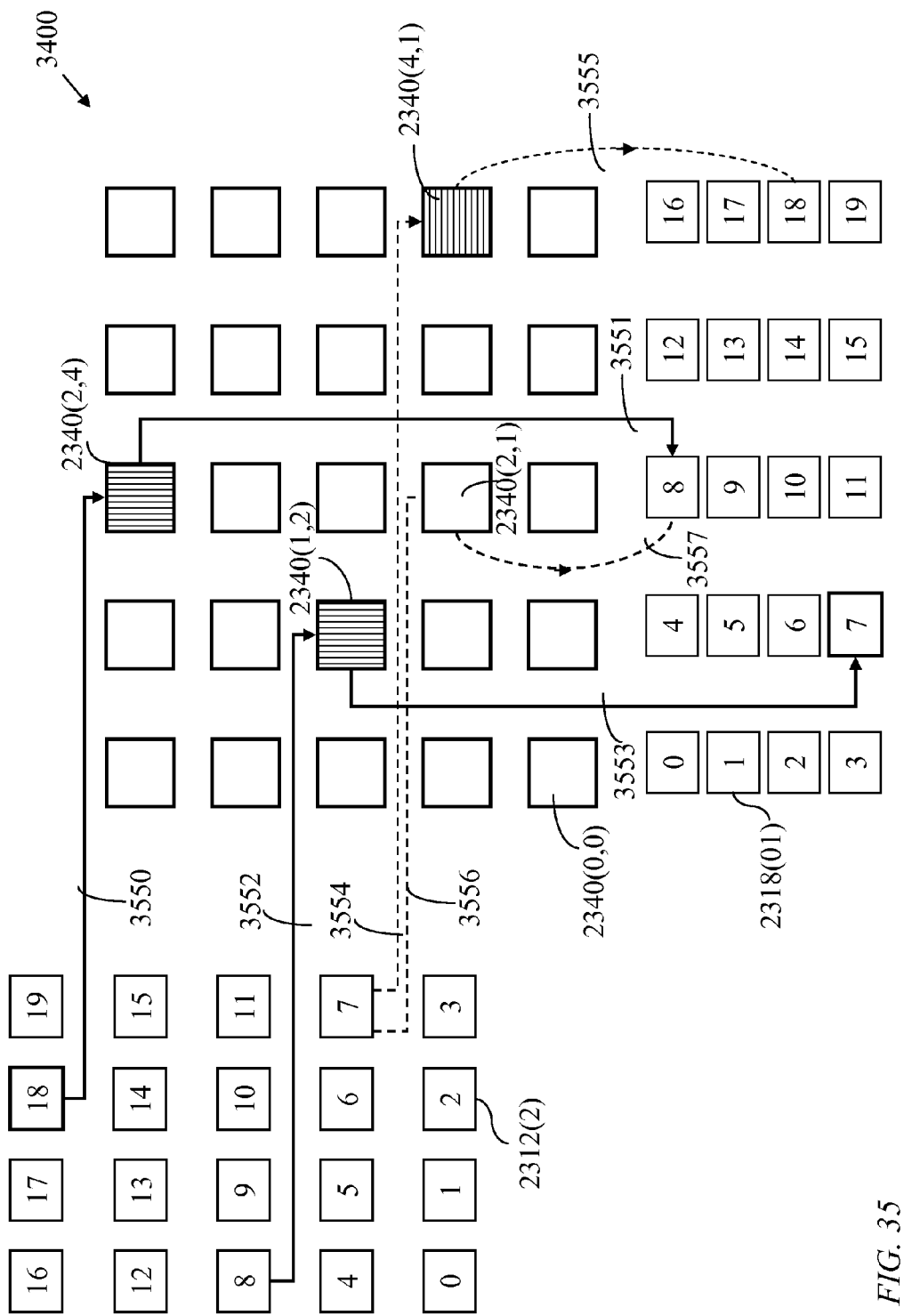
FIG. 35 illustrates allocation of a compound path from a source node to a sink node in a switching node in accordance with an embodiment of the present invention.

FIG. 35 illustrates compound control paths in switching node 3400 of FIG. 34. A control path 3550/3551 from a source node 2312(18) to an intermediate sink node 2318(8) and a control path 3552/3553 from intermediate source node 2318(8) to sink node 2318(7) are used to setup a connection specifying parameters including an identifier of the destination sink node 2318(7) and a number of time slots per time frame. Intermediate sink node 2318(8) and intermediate source node 2312(8) are integrated and, hence, the two control paths 3550/3551 and 3552/3553 are joined.

A controller of switch unit 2340(2,4) determines the availability of sufficient matching time slots for a requested connection. If availability is ascertained, the controller of switch unit 2340(2,4) communicates the parameters of the requested connection to a controller of sink node 2318(8) which is also the controller of source node 2312(8) integrated with sink node 2318(8). The controller of intermediate edge node 2312(8)/2318(8) communicates the connection requirement to a controller of switch unit 2340(1,2) which determines the availability of sufficient matching time slots. The result is communicated to the originating edge node 2312(18)/2318(18) through reverse path 3554/3555. The result may also be communicated to intermediate edge node 2312(8)/2318(8) through reverse path 3556/3557.

Connection Routing

A switching node 2300, comprising a single switch plane, may be treated as a special case of a multi-plane switching node 2700. As described above, an edge node comprises a source node and a sink node. The edge node has asymmetrical transmitting and receiving connections to switch units 2740 of a switch plane 2750 in switching node 2700. An edge node may transmit to a set of switch units 2740 but receive from a different set of switch units 2740. The connection routing process is first described for a switching node 2700 comprising a single switch plane 2750 having a matrix of switch units 2740.

Time sharing of the switch units 2740 may be based on a slotted time frame having a predefined number T of time slots each time slot having a predefined duration. A connection request initiated at a source node 2712(u) specifies a destination sink node 2718(v) and a number σ of time slots in the slotted time frame. A controller of the originating source node 2712(u) identifies the column of switch units 2740 to which the destination sink node 2718(v) connects and identifies the output port of the originating source node 2712(u) which has a channel to a switch unit 2740, in the identified column of switch units 2740, having an outward channel to sink node 2718(v). A temporal matching process is then performed between the channel from the originating source node 2712 (u) to the connecting switch unit 2740 and an outward channel from the connecting switch unit 2740 to the destination sink node 2718(v). If the temporal-matching process determines that less than σ time slots can be allocated in the direct path, a compound path is sought through an intermediate switch unit 2740 and an intermediate edge node 2712/2718. Several such compound paths may be sought. The σ time slots per time frame may be reserved in a single path or multiple paths. However, it is preferable that all the σ time slots of a connection be reserved within a single path.

As described above, inbound channels of each sink node 2718 preferably connects to switch units of one column in a given switch plane 2750. To simplify the internal routing process, the sink nodes 2718 may be numbered sequentially so that a switch node identifier may be directly associated with a column number in a matrix of switch units 2740 in a switch plane 2750(p). The maximum number of sink nodes 2718 that may connect to a switch unit 2740 of dimension m×n is n. The sink nodes connecting to a column c, 0≤c<μ in a switch plane 2750(p), may be numbered as {c×n} to {c×n+n—1}. This numbering scheme would apply even if a switch unit 2740 is not fully populated, i.e., if there are less than n sink nodes 2718 connecting to the switch unit. A sink node 2718(v) is then easily determined to be in column $\lfloor v/n \rfloor$, where v is the serial number of sink node 2718(v) the symbol $\lfloor y \rfloor$ denotes the integer part of a real number y. For example, in FIG. 23, or FIG. 27, n=5 and the sink nodes connecting to column 0 may be numbered as 0 to 4, the sink nodes connecting to column 1 may be numbered 5 to 9, and so on. Thus, a sink node 14 for example is easily associated with column $\lfloor 14/5 \rfloor$1=2.

If it is desired, however, to number the sink nodes in an arbitrary fashion, then an array 3602 (FIG. 36) may be used to indicate the column number (reference 3616) to which each sink node is assigned. Exemplary array 3602 corresponds to a switch plane 2750 having a matrix of 20 rows (v=20) and 20 columns (μ=20) of switch units 2740 each switch unit having 256 input ports and 256 output ports, of which one input port and one output port connect to a switch-unit controller and 255 integrated input-output ports (m=n=255) connect to edge nodes (each edge node comprising a source node 2712 and a sink node 2718). The maximum number of edge nodes would then be 20×255=5100 arbitrarily numbered as 0 to 5099. Array 3602 is indexed by a serial number (0, 1, . . . , 5009) of a sink node.

An outbound port number of a source node (in an integrated edge node) may be conveniently determined according to the column to which the outbound port connects. However, if another numbering system is applied, an array 3604 (FIG. 36), indexed by a column serial number (0, 1, . . . , 19), may be devised and used by a controller of an edge node to identify the outbound port of the edge node connecting to each column in the matrix of switch units 2740 of a switch plane 2750.

Control Paths

Figure 37:
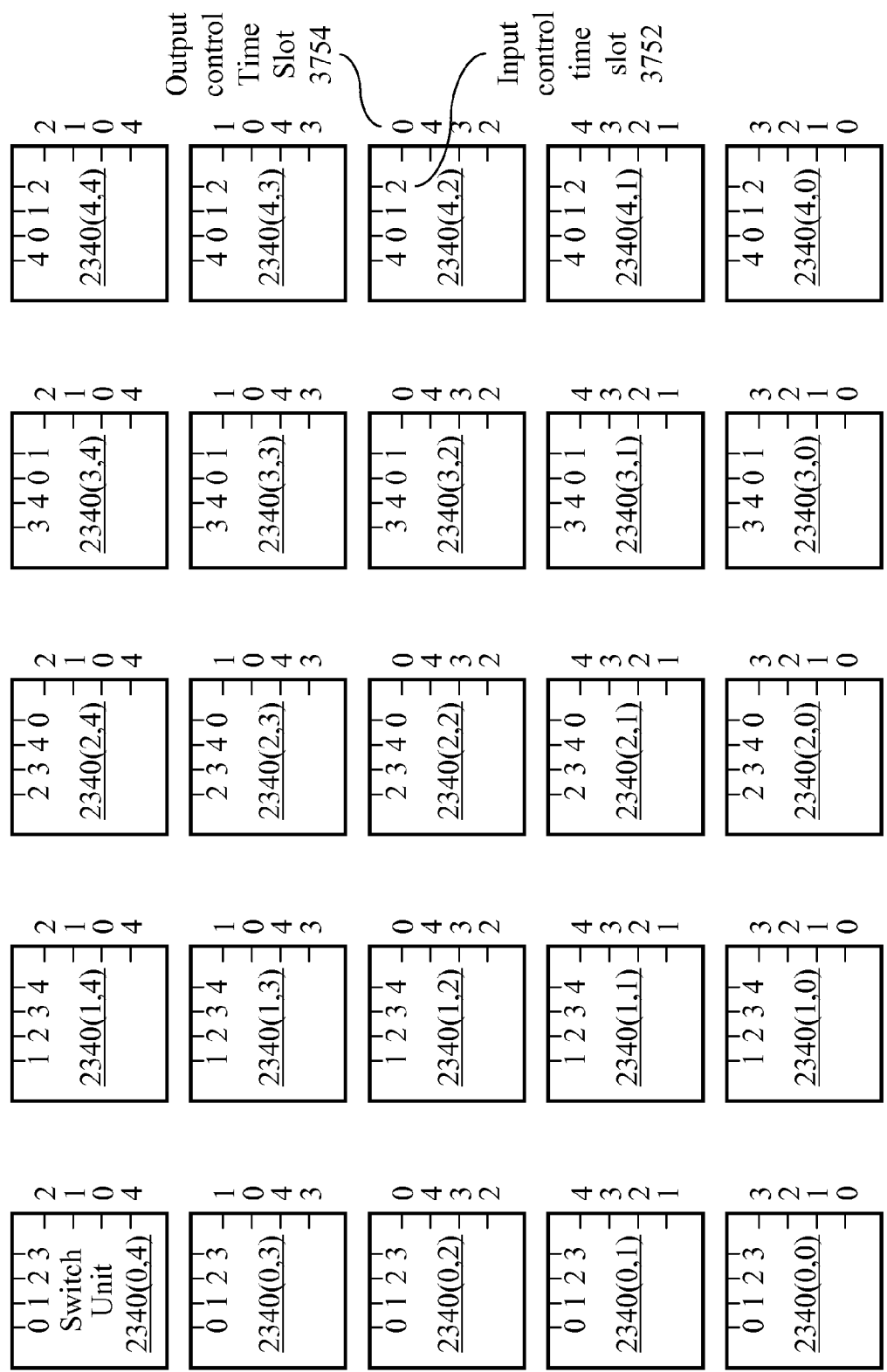
FIG. 37 illustrates an allocation of control time slots within a slotted time frame in accordance with an embodiment of the present invention.
Figure 38:
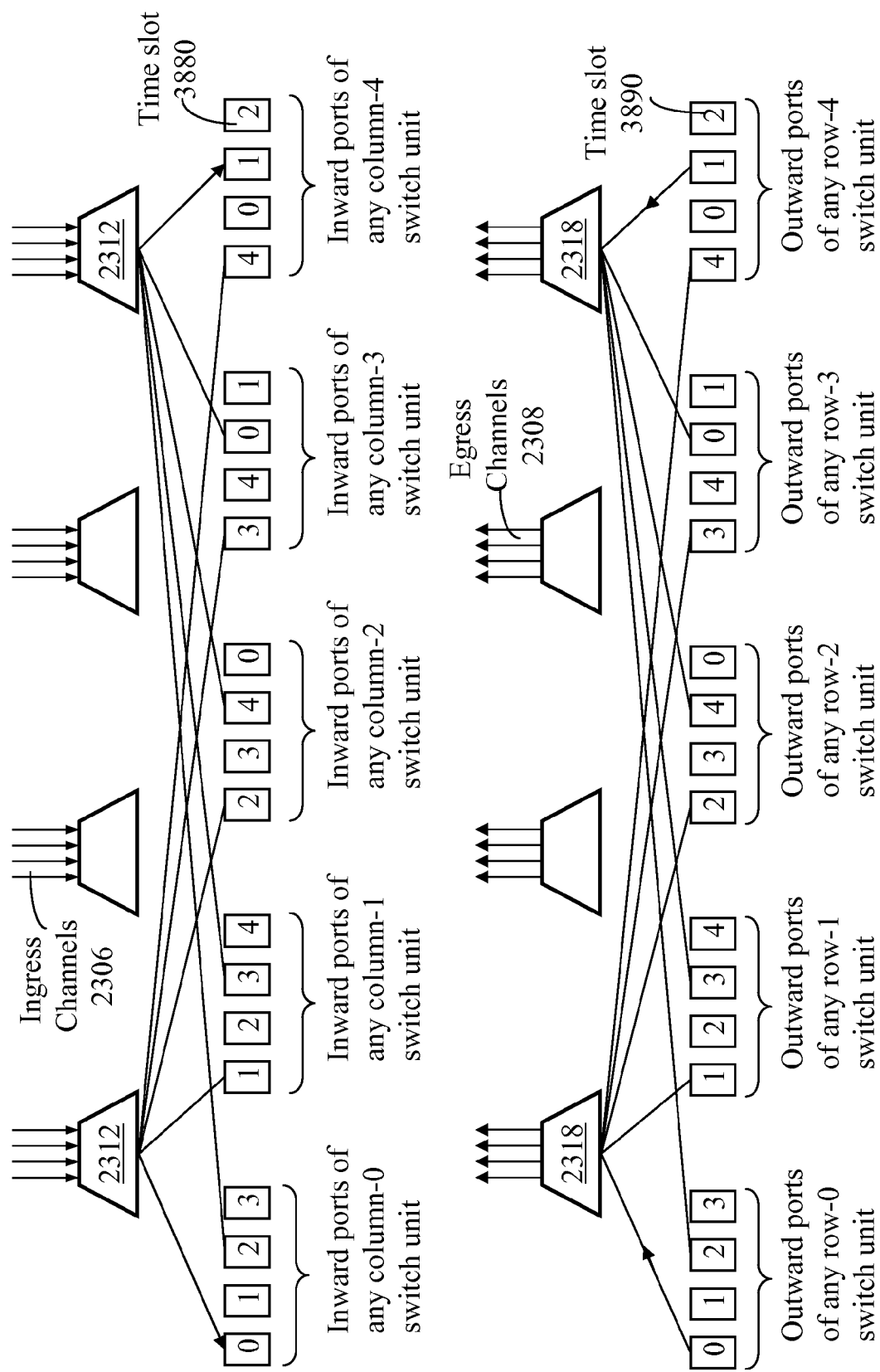
FIG. 38 illustrates a scheme of control-time-slot assignments in the switch of FIG. 23 where the switch units use instantaneous space switches in accordance with an embodiment of the present invention.
Figure 39:
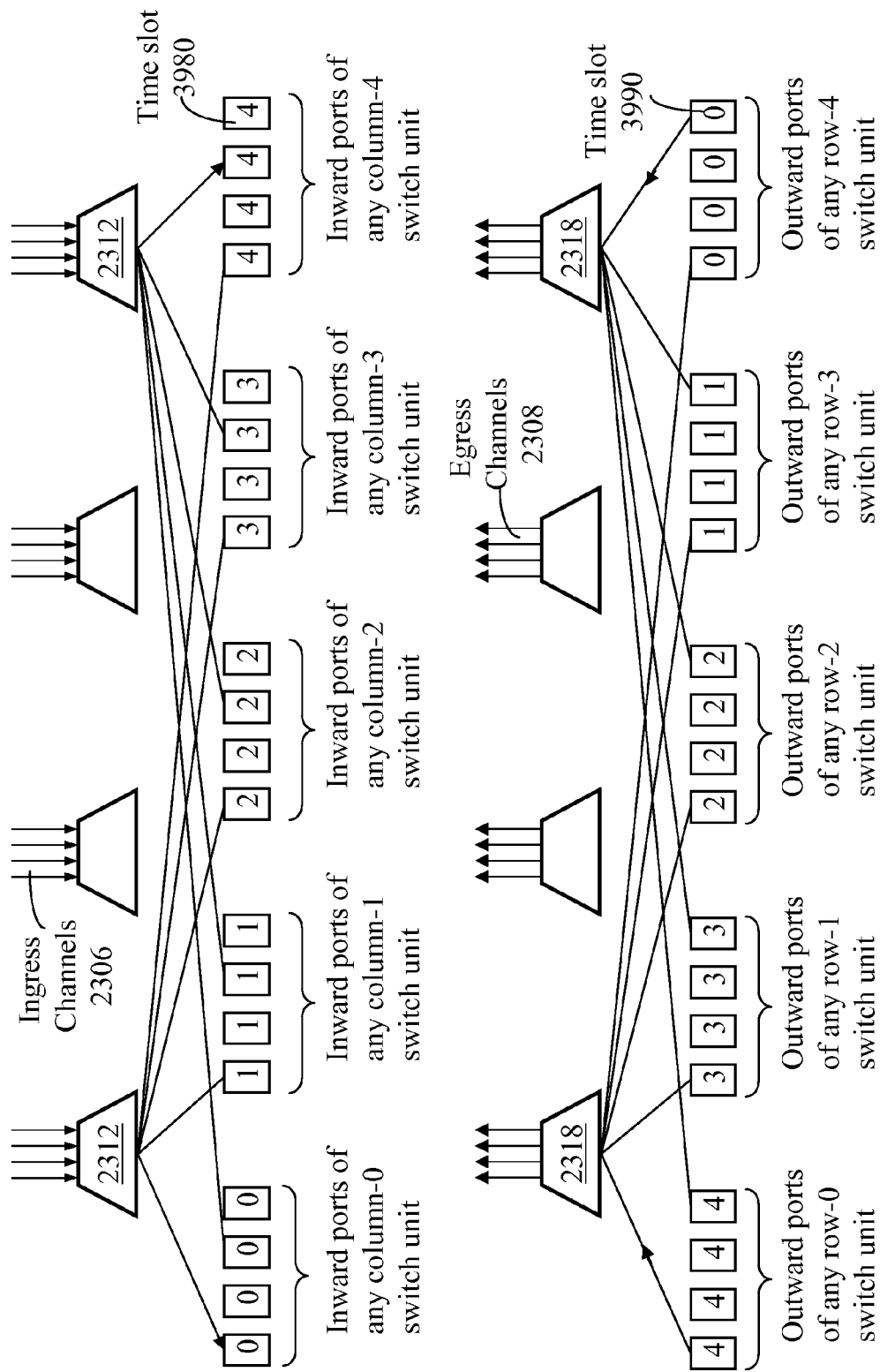
FIG. 39 illustrates a scheme of control-time-slot assignments where the switch units are latent space switches in accordance with an embodiment of the present invention.

A scheme for allocating control time slots is illustrated in FIG. 37, FIG. 38, and FIG. 39 for the case where one inward control time slot is allocated per inward channel and one outward control time slot is allocated per outward channel of a switch unit 340 (2340, 2740).

FIG. 37 illustrates an allocation of control time slots at inward ports and outward ports of switch unit 2340 in a switch 3400 where m=n=4, and where the switch units 2340 are instantaneous space switches described above with reference to FIG. 17. The inward control time slots at inward ports of a switch unit 2340 are consecutive (or generally non-coincident) to allow successive access to a controller of the switch unit 2340. Likewise, the outward control time slots allocated to outward ports of a given switch unit 2340 are consecutive to allow successive transmission of control signals from the controller of the switch unit 2340 to sink nodes 2318 connecting to the outward ports. The control time slots assigned to inward ports of switch units 2340 of the same column are preferably identical. For example, control time slots 2, 3, 4, and 1 are assigned to inward ports of switch units 2340(2,0), 2340(2,1), 2340(2,2), 2340(2,3), and 2340(2,4) of column 2. Control time slots assigned to outward ports of switch units 2340 of the same row are preferably identical. For example, control time slots 0, 2, 3, and 4 are assigned to outward ports of switch units 2340(0,2), 2340(1,2), 2340(2,2), 2340(3,2), and 2340(4,2) of row 2.

Channels from a source node 2312 to switch units 2340 of different columns may be allocated consecutive control time slots so that the source node 2312 may transmit successive control signals to controllers of switch units 2340. This is realized with the control-time-slot allocation scheme of FIG. 37 if each source node 2312 connects to likewise-numbered inward ports of switch units 2340 of different columns.

With the assignment of outward control time slots illustrated in FIG. 37, a sink node 2318 may receive successive control time slots from the switch units 2340 of a column if the sink node connects to likewise-numbered outward ports of switch units in different rows. The use of consecutive control time slots from a source node to switch units or from switch units to a sink node is desirable but not necessary; the outbound ports and inbound ports of an edge node (integrated source node and sink node) have buffers which may hold control signals for timing purposes. The control-time-slot assignment of FIG. 37 also applies to switch units 2740 of each switch plane 2750 in multi-plane switch 2700.

FIG. 38 concisely presents the scheme of control time-slot assignments of FIG. 37 where the switch units 2340 are instantaneous space switches as described with reference to FIG. 17. The control time slots 3880 associated with the inward ports of a switch unit 2340 are spread over the time frame in order to permit sharing an output port of the switch unit connecting to a controller of the switch unit. The control time slots 3890 associated with the outward ports of the switch unit are also spread over the time frame in order to permit transmission of control data from a single input port connecting to the controller of the switch unit to the outward ports of the switch unit. As described above with reference to FIG. 37, it is desirable, though not necessary, that the control time slots from each source node be non-coincident and the control time slots to each sink node be non-coincident. As indicated in FIG. 38, the control time-slot assignments for the inward ports of a switch unit differ from one column to another but are identical for switch units of the same column. The control time-slot assignments for the outward ports of a switch unit differ from one row to another, but are identical for switch units of the same row.

FIG. 39 illustrates a scheme of control time-slot assignments in a switching node 3400 (where m=n=4) using switch units 2340 which employ latent space switches. Preferably, the exemplary latent space switch of FIG. 18, having m inward ports 1814, m outward ports 1816, an input control port 1824, and an output control port 1826, is used as a latent space switch for each switch unit 2340. Control input port 1824 directs control data from the controller 1845 to outward ports 1816. Control output port 1826, receives control data from inward ports 1814 for delivery to switch-unit controller 1845. The rotation cycle has a duration of (m+1) time slots. The input ports may be indexed as 0 to m, with control port 1824 given index 0 and inward ports 1814 given indices 1 to m. Likewise, the outlet ports may be indexed as 0 to m, with control port 1826 given index 0 and outward ports 1816 given indices 1 to m.

If input rotator 1837 is an ascending rotator and output rotator 1839 is a descending rotator, a data segment transferred from an inlet port j, 0≤j≤m to an outlet port k, 0≤k≤m encounters a systematic delay $\Delta_{jk} = \{j-k\}_{modulo\ (m+1)}$. Thus, inward control signals presented to inlet ports of indices j=1 to j=m at time slot 0, are received at control output port 1826 (of index k=0) during time slots 1 to m. With m=4, for example, data segments presented to inlet ports of indices j=1 to j=4 at time slot 2, are received at outlet port 1826 (of index k=0) during m consecutive time slots 3, 4, 5, and 6 (cyclic time slots 3, 4, 0, and 1). Outward control signals transmitted from control input port 1824 (j=0) during consecutive time slots {0, 1, . . . , (m−1)} and directed to outlet ports of indices k=1 to k=m encounter systematic delays of {m, (m−1), . . . , 1} time slots, respectively, and are received simultaneously during time slot m at the outward ports 1816 of indices k=1 to k=m.

If input rotator 1837 is a descending rotator and output rotator 1839 is an ascending rotator, a data segment transferred from an inlet port j, 0≤j≤m to an outlet port k, 0≤k≤m encounters a systematic delay $\Delta_{jk} = \{k-j\}_{modulo\ (m-1)}$. Thus, inward control signals presented to inlet ports of indices j=1 to j=m at time slot 0, are received at outlet port 1826 (of index k=0) connecting to the input of switch-unit controller 1845 during time slots {m, (m−1), . . . , 1}. With m=4, for example, data segments presented to inlet ports of indices j=4, 3, 2, and 1 at time slot 0, are received at outlet port 1826 (of index k=0) during m consecutive time slots 1, 2, 3, and 4. With m=4, data segments presented to inlet ports of j=4, 3, 2, and 1 at time slot 2, are received at outlet port 1826 (of index k=0) during m consecutive time slots 3, 4, 5, and 6 (cyclic time slots 3, 4, 0, and 1). Outward control signals transmitted from input port 1824 (j=0) during consecutive time slots {0, 1, 2, 3} and directed to outlet ports of indices k=4, 3, 2, and 1, respectively, encounter systematic delays of {4, 3, 2, 1} time slots, respectively, and are received simultaneously during time slot m at the outlet ports of indices k=m to k=1. Thus, during successive time slots, input port 1824 transmits control signals to outward ports selected in an order which leads to concurrent transfer of control signals from the transit memory devices 1838 to the outward ports. In the above example, successive control signals are sent to outward ports 1816(4), 1816(3), 1816(2), and 1816(1).

The example of FIG. 39, considers five input ports indexed as 0 to 4, and five output ports indexed as 0 to 4. As indicated in FIG. 39, the control time slots 3980 for the inward ports of a switch unit 2340 are selected to be coincident. Thus, control data segments received at coincident time slots at the inward ports of the latent space switch of FIG. 18 are delivered, through the rotators 1837 and 1839, to the controller 1845 at consecutive time slots. Control data segments from controller 1845 directed to the outward ports of a switch unit 2340, are transmitted from control input port 1824 during consecutive control time slots to be read by outward ports 1816 during a common time slot 3990. The inward control time slots 3980 may differ from one column to another but may be identical for switch units of the same column. As illustrated, each inward port of each switch unit 2340 in column c is assigned control time slot c, where 0≤c<5. The control-time-slot assignment of FIG. 39 also applies to a switch plane 2750.

Figure 40:
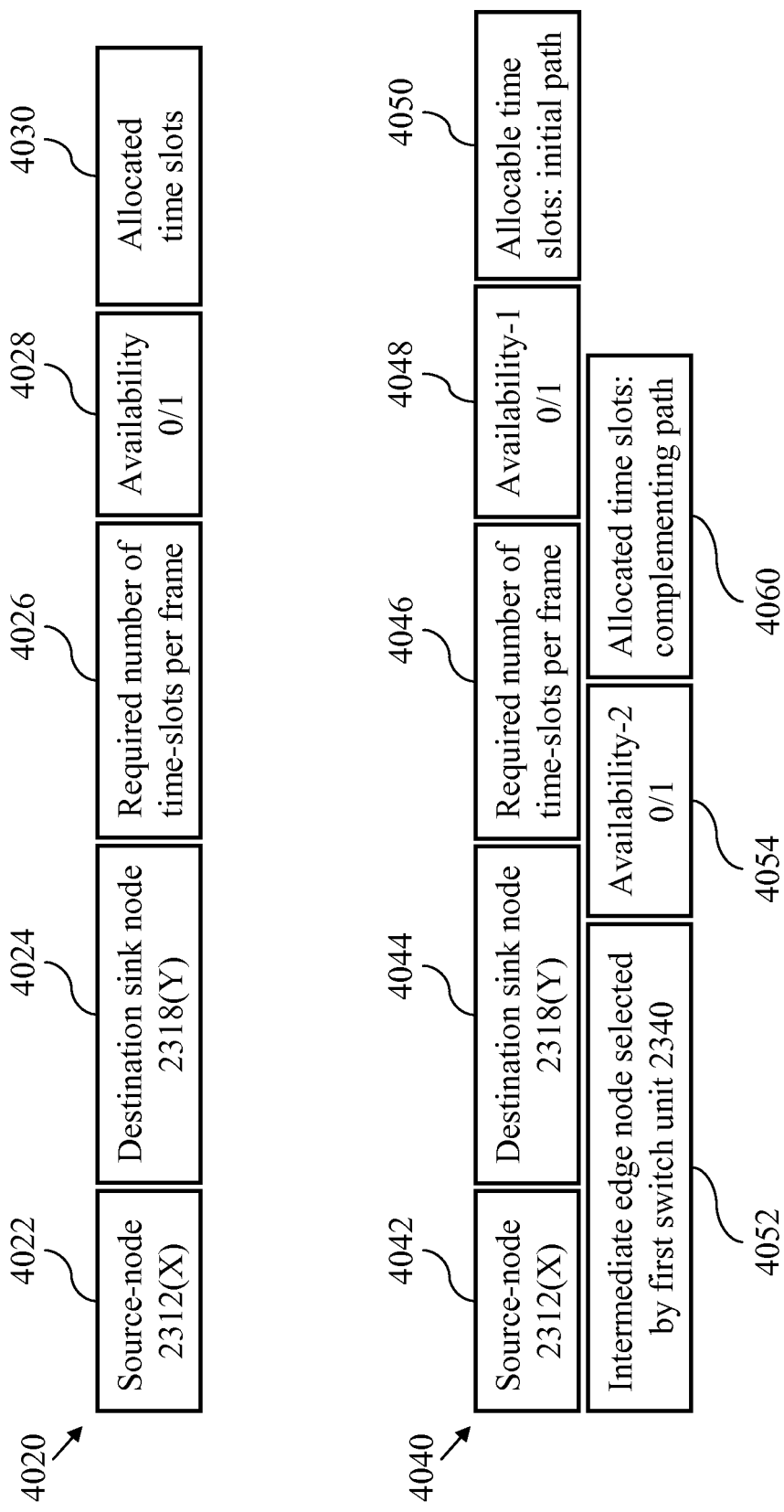
FIG. 40 illustrates a connection request formulated at a source node in accordance with an embodiment of the present invention.

FIG. 40 illustrates a first message 4020 sent by a source node 2312(X) to establish a simple path to a sink node 2318 (Y) and a second message 4040 sent by the source node 2312(X) to establish a compound connection to the sink node 2318(Y). The source node 2312(X) has a channel to a switch unit 2340 in each column in matrix 2310. The source node identifies a switch unit 2340 which has an outward channel to a target (destination) sink node 2318(Y) and sends a message 4020 to the identified switch unit 2340. The message includes a field 4022 identifying the source node 2312(X), a field 4024 identifying the target sink node 2318(Y), a field 4026 indicating a specified number σ of time slots per time frame for the connection, and a field 4028 to be used by the specific switch unit 2340 to indicate the availability or otherwise of a direct path. Field 4028 is initialized to binary "0". If a controller of the specific switch unit 2340 determines the availability of σ matching time slots, field 4028 is set to binary "1". Field 4030 identifies the allocated σ time slots. The message is sent to a controller of the target sink node 2318(Y) which is also the controller of a source node 2312(Y) integrated with sink node 2318(Y) forming an integrated edge node. The controller of the integrated edge node 2312(Y)/2318(Y) sends availability information to sink node 2318(X) associated with the source node 2312(X) so that the source node starts to send data along the allocated path during the allocated time slots if the availability indicator is "1", or starts to seek a compound connection if the availability indicator is "0".

If the availability indicator in field 4028 is "0", source node 2312(X), which has a channel to each of μ>1 switch units 2340 in different columns of matrix 2310 selects one of the switch units 2340 to establish a first part of a connection to an intermediate edge-node. Any of the (μ−1) switch units, which exclude the specific switch unit which has failed to establish a simple connection, may be selected as a first switch unit 2340 for the compound connection and any of the sink nodes connecting to the first switch unit may be used as an intermediate sink node.

The source node 2312(X) forwards a message 4040 to a controller of a switch unit 2340 selected to be the first switch unit 2340, from among (μ−1) candidate switch units, in a compound connection. The message include a field 4042 identifying the source node 2312(X), a field 4044 identifying the destination sink node 2318(Y), a field 4046 indicating a required number σ of time slots to be allocated per time frame, a field 4048 to be used by a first switch unit 2340 to indicate availability of a first part of a compound connection, a field 4052 to identify an intermediate edge node 2312(W)/ 2318(W), and a field 4054 to be used by a second switch unit 2340 to indicate availability of a second part of the compound connection. Fields 4048 and 4054 are initialized to "0". A controller of the first switch unit 2340 performs a time-slot-matching process to allocate σ matching time slots. If the controller of the first switch unit 2340 determines that a path, of σ time slots, is available to the intermediate edge node 2312(W)/2318(W), field 4048 is set to "1" and message 4040 is forwarded to a controller of the intermediate edge node which, in turn, identifies a second switch unit 2340 to which the target (destination) sink node 2318(Y) connects. Identifiers of σ allocable time slots for a candidate first segment of a compound path through the first switch unit are written in field 4050. The controller of the intermediate edge node forwards message 4040 to a controller of the second switch unit 2340 which performs a time-slot-matching process to allocate σ matching time slots. If successful, the controller of the second switch unit 2340 sets the availability field 4054 to "1" and forwards the message 4040 to a controller of the edge node 2312(Y)/2318(Y) which includes the target sink node 2318(Y). Identifiers of σ allocable time slots through the second switch unit are written in field 4060. The controller of edge node 2312(Y)/2318(Y) then informs the controller of the intermediate edge node 2312(W)/2318(W) and the controller of the source edge node 2312(X)/2318(Y) to use the respective allocated time slots. If the controller of the first switch unit 2340 determines that a path with sufficient vacancy to the intermediate edge node 2312(W)/2318(W) is not available, the controller selects another intermediate edge node. If a path with sufficient vacancy is not available to any edge node connecting to the first switch unit 2340, the controller of the first switch unit forwards message 4040 through any intermediate edge node to the controller of edge node 2312(X)/2318(X) which repeats the entire process of setting up a compound connection starting with another first switch unit 2340.

Temporal Matching

Each controller of an m×n switch unit 2340 or 2740 maintains an input-occupancy state matrix having m columns and T rows, and an output-occupancy state matrix having n columns and T rows, where T is the number of time slots in the predefined slotted time frame. To determine the availability of a path, occupying σ time slots, from a specific inward port of a switch unit 2340 to a specific outward port of the same switch unit 2340, the controller looks for 'matching time slots" during each of which the specific inward port and the specific outward port are unoccupied (or not reserved). If a sufficient number (σ) of matching time slot is found, a path through the switch unit is considered available. If the specific outward port connects to the destination sink node (either in a simple path or in the second part of a compound path), the connection is considered available. If the specific outward port connects to an intermediate sink node (of an intermediate edge node), then a successful path through the switch unit 2740 only permits continued processing to determine the second part of a compound path.

Figure 41:
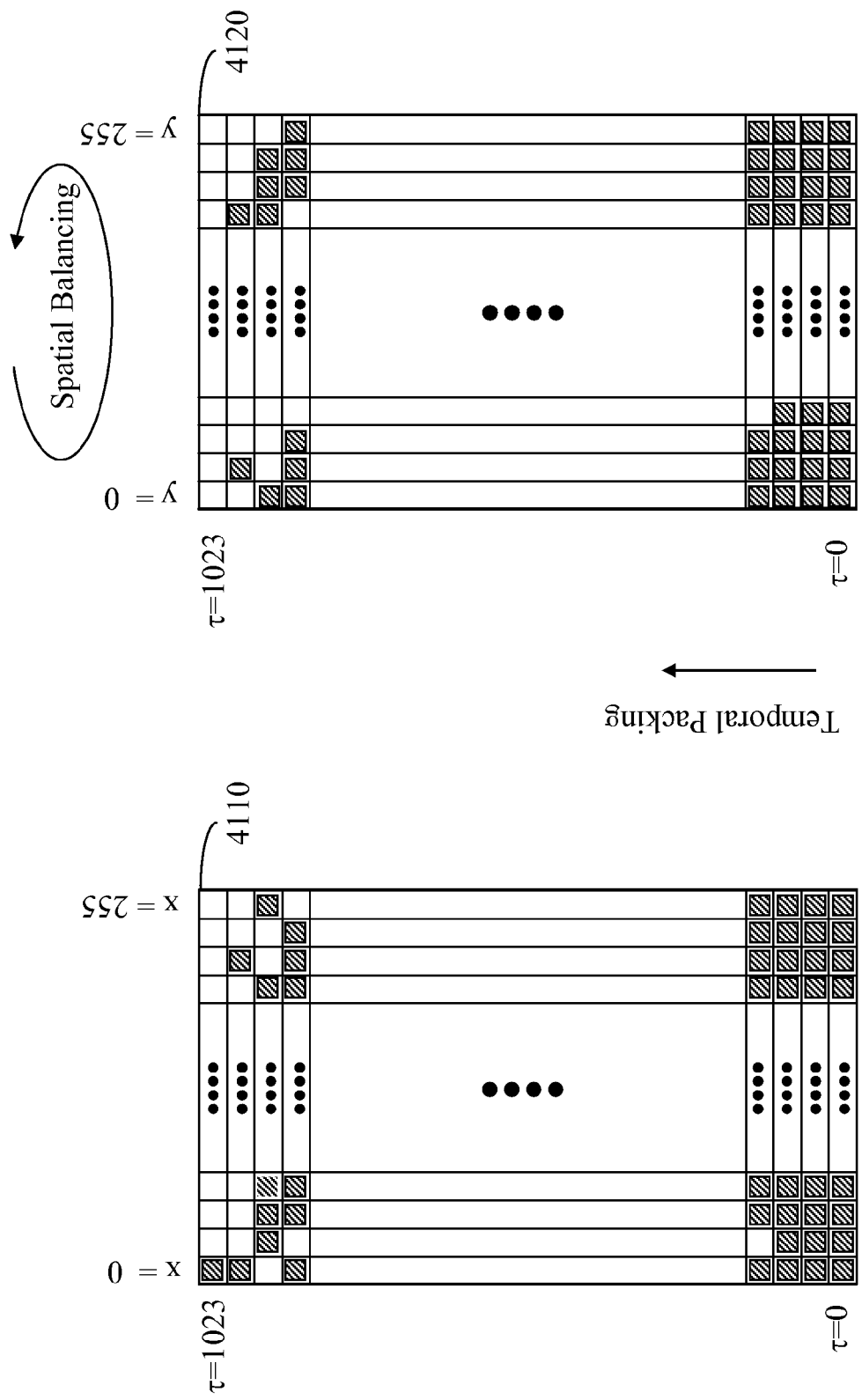
FIG. 41 illustrates data structures for use at a switch unit for scheduling connections in the switching node of FIG. 23 or FIG. 27 in accordance with an embodiment of the present invention.

FIG. 41 illustrates a data structure used by a controller of a switch unit 2340 to perform a temporal matching process for a simple path. The illustrated data structure comprises an input occupancy matrix 4110 and an output occupancy matrix 4120 of a 256×256 switch unit 2340 using a slotted time frame having 1024 time slots (T=1024) identified as time slots 0 to 1023. The input ports are identified by indices 0 to 255 and the output ports are identified by indices 0 to 255. An input port of index 0 and an output port of index 0 may connect to a controller of the switch unit, with input ports of indices 1 to 255 being inward ports and output ports of indices 1 to 255 being outward ports.

In a simple path, or the second part of a compound path, both the inward port and outward port are specified and the search for matching time slots proceeds along one column corresponding to the specified inward port in input-occupancy matrix 4110 and one column corresponding to the specified outward port in output-occupancy matrix 4120. In the first part of a compound path, only the inward port of the switch unit 2340 is specified and any outward port of the same switch unit 2340 may be a candidate for establishing the first part of the compound path. It may be desirable that sink nodes of the entire switch 2300 equitably share the extra transit loading of the compound paths. Therefore, in establishing the first part of the compound path, a column in the output occupancy matrix is preferably selected in a cyclic fashion. Thus, the controller of a switch unit 2340 of dimension m×n may maintain an identifier of a "last considered" outward port of the switch unit and increases the identifier by one (with a modulo-n operation) each time an outward port has been considered for transit (i.e., for a first part of a compound path). When an outward port is considered as a candidate for transit, a temporal matching process is performed between a column in occupancy matrix 4110 corresponding to the specified inward port of the switch unit 2340 and a column in occupancy matrix 4120 corresponding to the candidate outward port of the switch unit 2340.

Temporal Packing and Transit-Memory Packing

The structural capacity of a switch unit 340 (or either of corresponding switch units 2340 or 2740) is determined by the capacity of its switching fabric, the combined capacity of the inward ports, and the combined capacity of the outward ports. There are many ways of defining a "traffic capacity" of a switch unit. The simplest is to view the traffic capacity as the highest occupancy of a switch unit at which the probability of unavailability of a free path through the switch unit does not exceed a predefined value traditionally called a "grade of service". A typical grade of service is of the order of 0.01 with a typical corresponding occupancy of 0.9. In the switch 300, 2300, or 2700 of the present invention, there are numerous non-intersecting paths from any edge node to any other edge node and the probability of rejecting a connection is infinitesimally small, even with a switch-unit grade of service substantially exceeding 0.01.

The traffic capacity of a switch unit having a contention-free switching fabric is determined by the structural capacity of the switch unit and the traffic characteristics. The traffic capacity of a switch unit having a contention-based switching fabric is determined by the structural capacity of the switch unit, the traffic characteristics, and the method used for establishing a path through the switching fabric. A switch unit 340 of a relatively small dimension, such as 64×64, may be based on a contention-free switching fabric. Practically, a switch unit 340 of moderate dimension, such as 256×256, would be based on a contention-based switching fabric.

In a switch unit 340 where the switching fabric is an instantaneous space switch, it is well known that establishing a path according to a temporal-packing policy increases the traffic capacity. In a temporal-packing process, the search for a free path within the space switch for each connection request starts from a common reference time slot in a time-slotted frame. For example, the search may start from time-slot 0, in a time-slotted frame having T time slots indexed as 0 to (T−1), regardless of the originating source node, the destination sink node, or the specified number of time slot per frame for a connection.

In a switch unit 340 where the switching fabric is a latent space switch of the type described with reference to FIG. 18, the traffic capacity can be increased to approach the structural capacity by using a transit-memory-packing process where the search for a free path within the latent space switch for each connection request starts from a common transit memory 1838. For example, the search may start from a first transit memory in the array of transit memories 1838 regardless of the originating source node, the destination sink node, or the specified number of time slot per frame for a connection.

Path Setup

Figure 42:
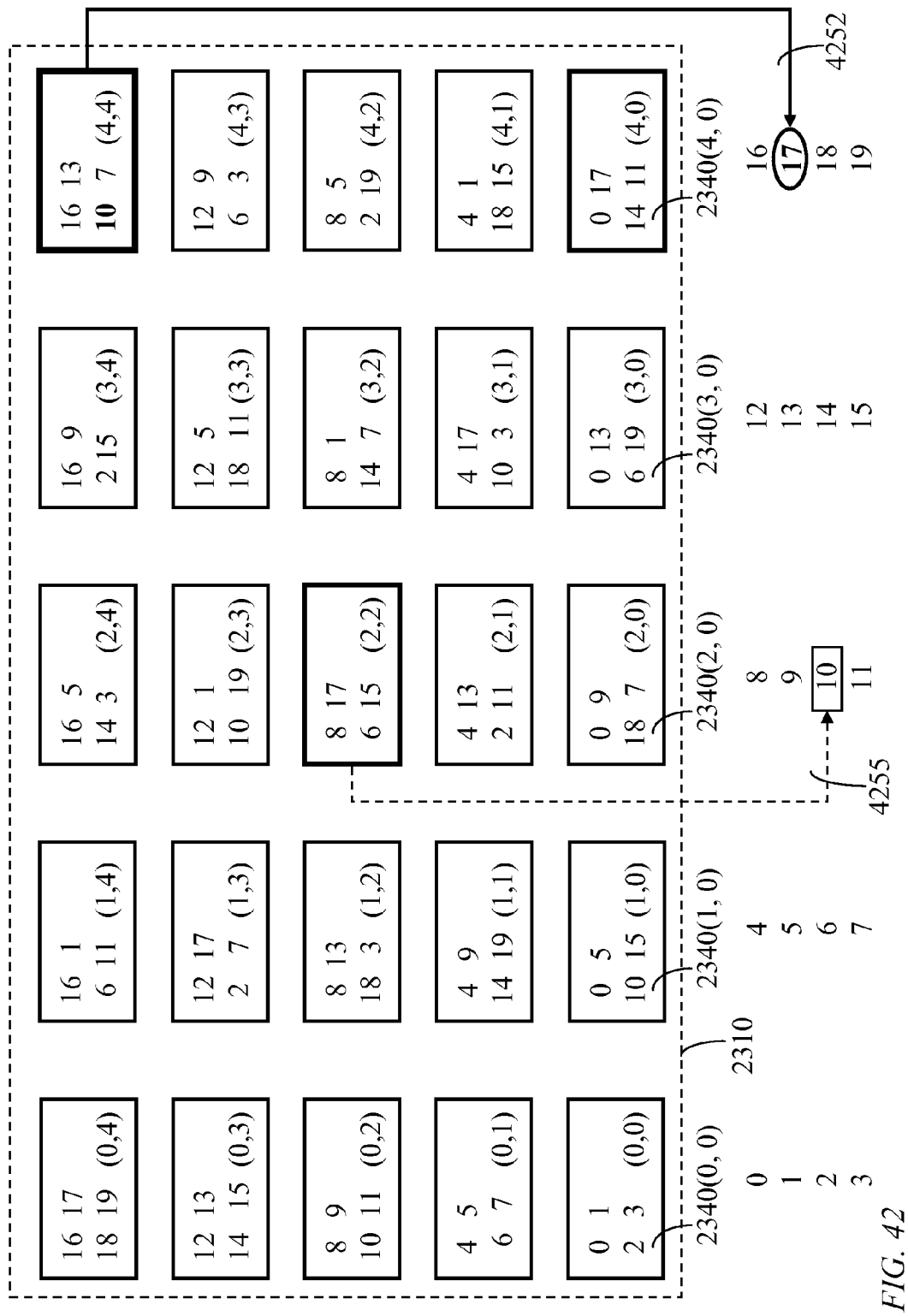
FIG. 42 illustrates a simple path through the switching node of FIG. 23 or FIG. 27 in accordance with an embodiment of the present invention.

FIG. 42 illustrates a simple path through a switch 3400 where each switch unit 2340 is of dimension 4×4. A simple path 4252 from any of source nodes 2312(x) of indices x=7, 10, 13, or 16 to any of sink nodes 2318(y) of indices y=16, 17, 18, or 19 traverses only switch unit 2340(4,4). With integrated source nodes 2312 and sink nodes 2318 of similar indices, an internal path from source-node 2312(16) to destination sink-node 2318(16) is set within the integrated edge node 2312(16)/2318(16) and need not traverse switch unit 2340(4,4). To establish a connection specifying a flow rate expressed as σ time slots per time frame along a simple path 4252, the controller of switch unit 2340(4,4) performs a time-slot matching process to allocate σ time slots. If successful, the request is accepted and source node 2312(17), which is integrated with destination sink node 2318(17), communicates to the originating source node 2312(10), through a path 4255, acceptance of the connection-request and identifiers of allocated time slots.

Figure 43:
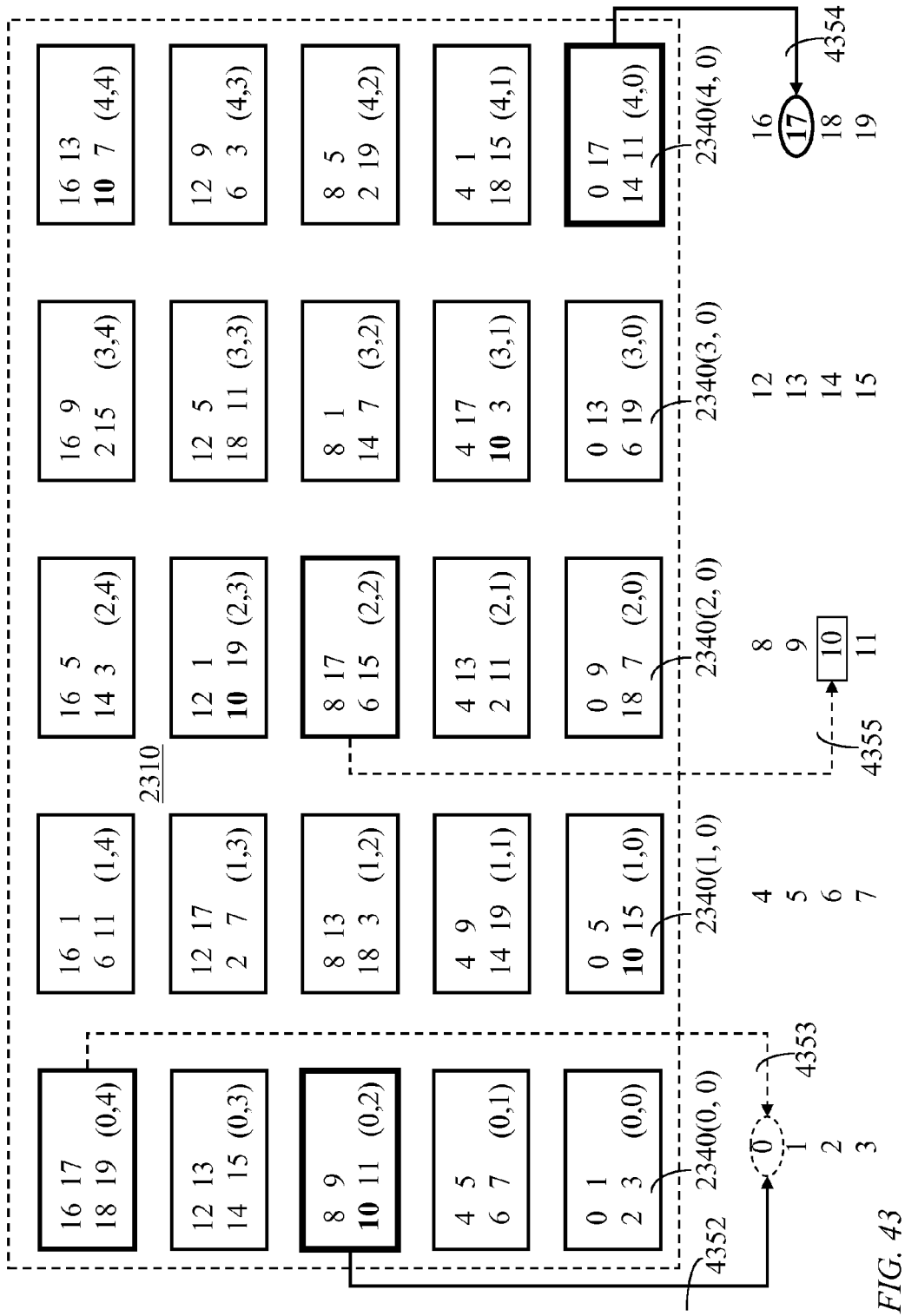
FIG. 43 illustrates a compound path through the switching node of FIG. 23 or FIG. 27 in accordance with an embodiment of the present invention.

FIG. 43 illustrates a compound path from originating source node 2312(10) to destination sink node 2318(17). Such a path is needed if the simple path 4252 illustrated in FIG. 42 is not available. The compound path illustrated in FIG. 43 traverses switch units 2340(0,2) and 2340(4,0). Switch unit 2340(0,2) connects to source nodes 2312 of indices 8, 9, 10, and 11, and to sink nodes 2318 of indices 0, 1, 2, and 3. A path 4352 from source node 2312(10) to any sink node 2318(y) of index y=0, 1, 2, or 3 may constitute a first part of the compound path. The selected first path in FIG. 43 traverses switch unit 2340(0,2) to sink node 2318(0) through path 4352. A controller of switch unit 2340(0,2) performs a time-slot matching process to allocate σ time slots. If successful, a corresponding second path 4354 from source node 2312(0), which is integrated with sink node 2318(0), to sink node 2318(17) through switch unit 2340(4,0) is examined. A controller of switch unit 2340(4,0) performs a time-slot matching process to allocate σ time slots. If successful, source node 2312(17), which is integrated with sink node 2318(17) confirms acceptance of the connection request to both the intermediate edge node 2312(0)/2318(0), and the source edge node 2312(10)/2318(10) through paths 4353 and 4355, respectively.

FIG. 44 illustrates a table 4400 of compound paths in a switch 2300, or a switch-plane 2750 of a multi-plane switch 2700, based on the connectivity pattern of FIG. 42 (and FIG. 43). The illustrated paths include compound paths from source node 2312(10) to sink node 2318(17). Each compound path traverses a first switch unit 2340(j,k) and a second switch unit 2340(x,y) in switch-unit matrix 2310, where j, k are column and row indices of the first switch unit and (x,y) are column and row indices of the second switch unit. As illustrated in FIG. 42, source node 2312(10) and sink node 2318(17) connect to a common switch unit 2340(4,4) which may be used for a simple connection from source node 2312(10) to sink node 2318(17) and is, therefore, excluded from the list of compound paths. Consequently, switch unit 2340(4,4) may not be used as a second switch unit in a compound path. As indicated in column 4412 of table 4400, a first subset of compound paths traverses a first switch unit 2340(0,2) which connects to candidate intermediate sink nodes 2318 of indices 0, 1, 2, and 3 as indicated in column 4414 of table 4400. Source nodes 2312(0), 2312(1), 2312(2), and 2312(3) connect to switch units 2340 of indices (4,0), (4,1), (4,2), and (4,3), respectively as indicated in column 4416 of table 4400, each of which having a channel to the target sink node 2318(17); for example, path 4354 from switch unit 2340(4,0) to target sink node 2318(17). The result, regarding the acceptance or otherwise, of path reservation is communicated to the source node 2312(10) and to an intermediate edge node 2312/2318, of index 0 for example, selected to complete the connection through a respective switch unit 2340. A controller of switch unit 2340(2,2) which has a channel from source node 2312(17), integrated with the target sink node 2318(17), communicates the result to sink node 2318(10) integrated with source node 2312(10). The result is communicated by a controller of switch unit 2340(0,4) to a controller of intermediate edge node 2312(0)/2318(0).

Likewise, a second subset, a third subset, and a fourth subset of compound paths from source node 2312(10) to sink node 2318(17) traverse first switch units 2340(1,0), 2340(2, 3), and 2340(3,1), respectively, as indicated in column 4412 of table 4400, with corresponding intermediate edge nodes as indicated in column 4414 and second switch units as indicated in column 4416. Column 4418 of table 4400 indicates, for each of the four subsets of compound paths, the switch units 2340 which communicate the path-search result to the source node 2312(10) and to any of selected intermediate edge nodes. In the third subset of compound paths, the same switch unit 2340(2,2) communicates the result to both the source node and the intermediate edge node. In the second subset of compound paths traversing switch unit 2340(1,0), a path from source node 2312(10) to sink node 2318(7) is not a candidate for a compound path because a compound path is attempted only after it is established in the process of FIG. 42 that a path from switch unit 2340(4,4), which connects to source nodes 2312 of indices 7, 10, 13, and 16, to sink node 2318(17) does not have sufficient vacancy to accommodate a requested connection. For the same reason, the fourth subset of compound paths traversing switch unit 2340(3,1) excludes a path from source node 2312(10) to sink node 2318(13).

Figure 45:
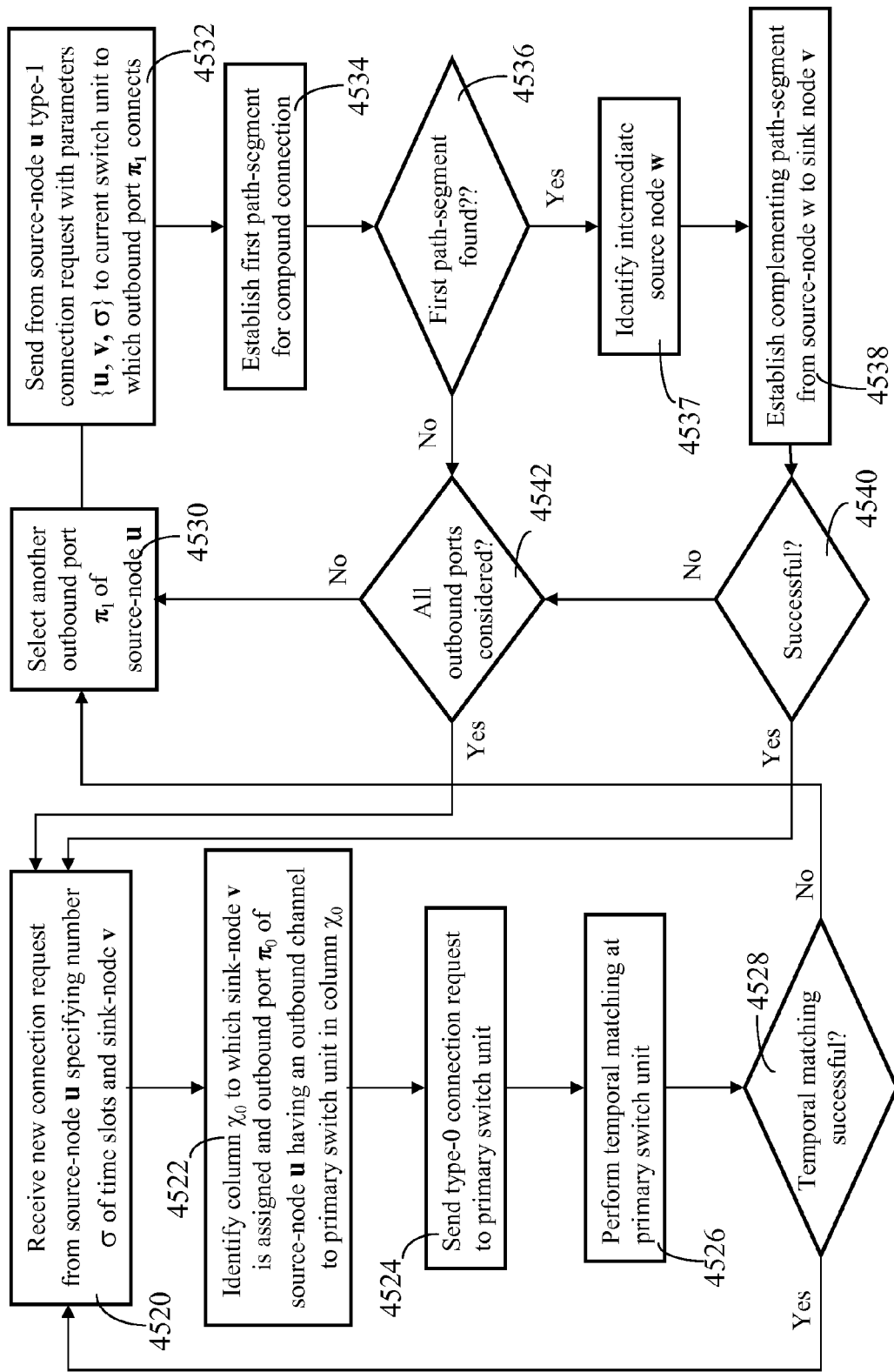
FIG. 45 is a flow chart illustrating a method used by a controller of an edge node for setting up a connection according to an embodiment of the present invention.
Figure 46:
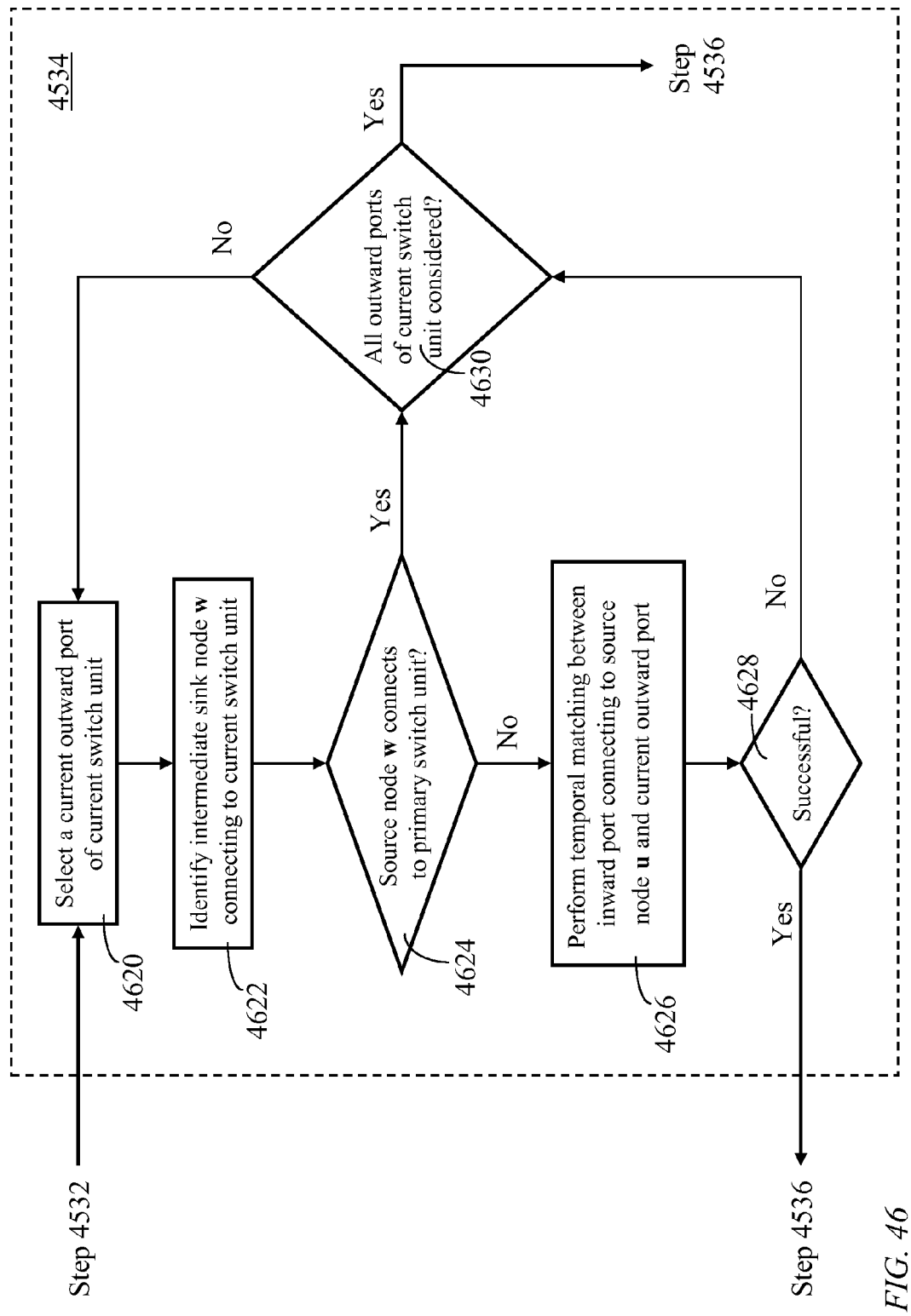
FIG. 46 is a flow chart detailing a step illustrated in the flow chart of FIG. 45 of establishing a first path-segment for a compound connection.
Figure 47:
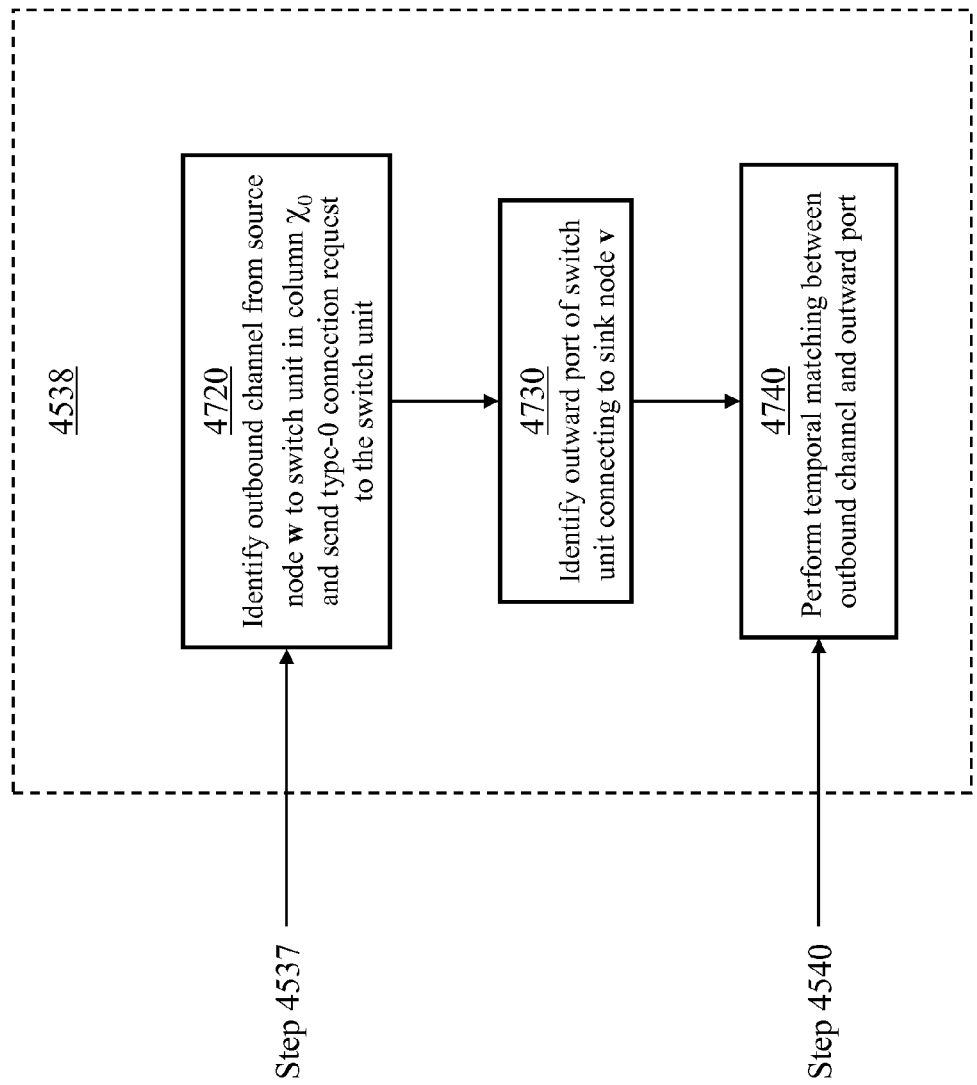
FIG. 47 is a flow chart detailing a step illustrated in the flow chart of FIG. 45 of establishing a complementing path-segment for a compound connection.

A process of path setup in a switch 2300 or 2700 is illustrated in FIGS. 45-47. The process is described herein for switch 2300 which may be adapted for use in switch 2700 by adding a step of selecting a switch plane 2750 from among the plurality of switch planes. The flow chart of FIG. 45 illustrates the part of the process initiated at an edge controller of an originating source node 2312(u). The process starts in step 4520 where the edge controller of the originating source node 2312(u) receives a request to setup a path to a designated destination sink node 2318(v). The request may explicitly specify a number σ of time slots per time frame. Alternatively, the edge controller may determine an appropriate number of time slots per time frame for the requested connection.

Figure 36:
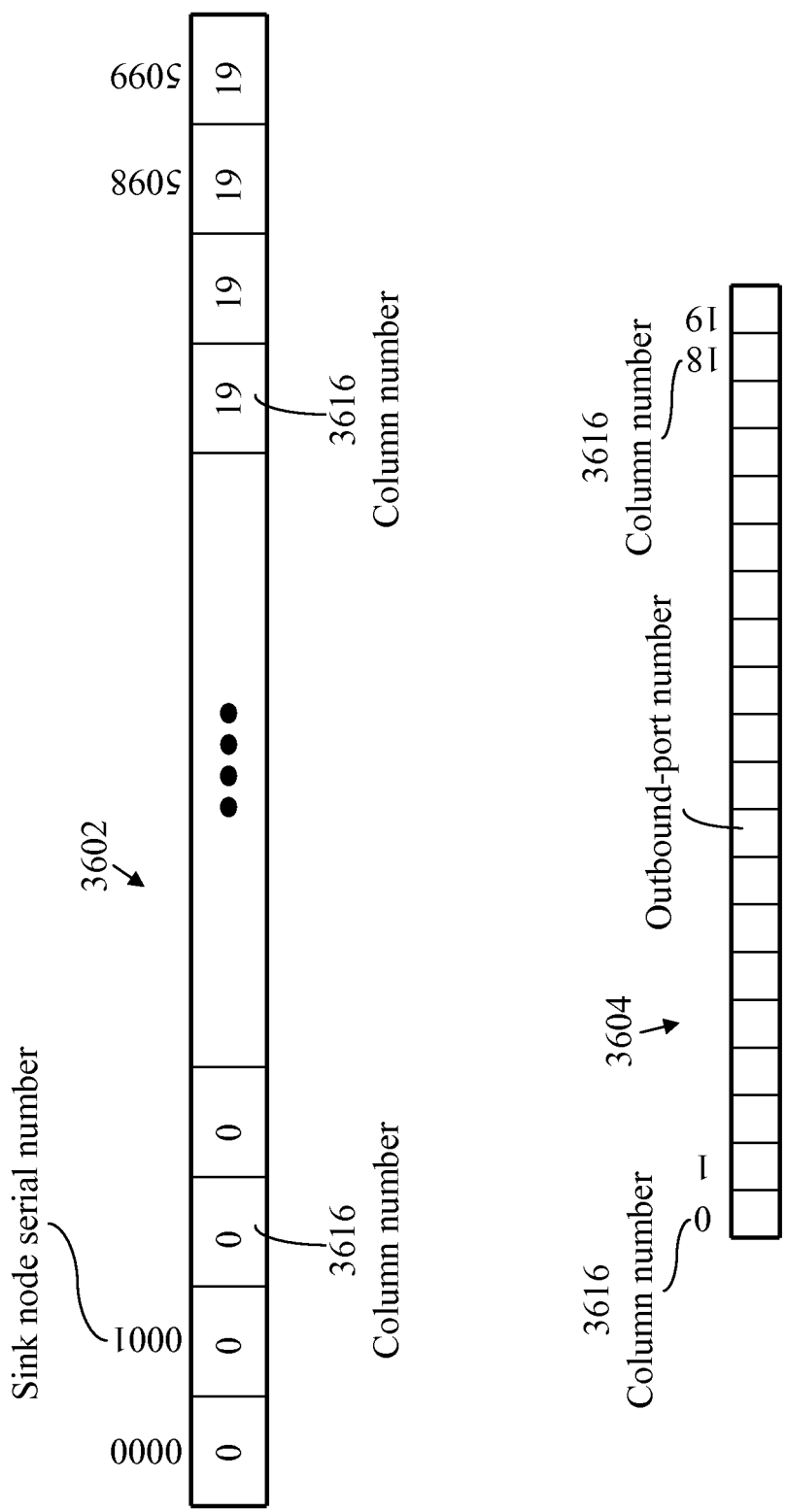
FIG. 36 illustrates control-data arrays for use in scheduling connections in the switching node of the present invention.

In step 4522, the column $\chi_0$, $0 \leq \chi_0 < \mu$, to which the destination sink node 2318(v) is assigned, and the outbound port $\pi_0$ of the source node leading to column $\chi_0$ are determined. If the edge nodes are numbered sequentially, starting from 0, the column number may be determined directly as $\chi_0 = \lfloor v/\mu \rfloor$, where v is the serial number of edge node 2312(v)/2318(v) and the notation $\lfloor y \rfloor$ denotes the integer part of a real number y. However, if an arbitrary numbering system is used, then the column $\chi_0$ corresponding to sink node 2318(v) may be determined from a lookup array 3602 (FIG. 36). The outbound port $\pi_0$ of the source node may also be determined directly ($\pi_0 = \chi_0$), or from a lookup array 3604 (FIG. 36). Each switch unit in column $\chi_0$ has a channel to sink node 2318(v) and a switch unit, herein referenced as a primary switch unit, that connects to both the originating source node 2312(u) and destination sink node 2318(v) may be selected for establishing a simple path.

In step 4524, an attempt is made to setup a simple connection from the originating source node to sink node 2318(v) traversing the primary switch unit 2340. A "type-0" connection request is then sent to the controller of the primary switch unit during a reserved control time slot. The type-0 connection request specifies both the index (serial number) v of the destination sink node 2318 and the required number σ of time slots per time frame. In step 4526, the primary switch unit 2340 then performs a temporal matching process, as will be described with reference to FIG. 48. The result of the temporal matching process is then communicated by the controller of the primary switch unit to the destination sink node 2318 (v). The source node 2312(v) integrated with the destination sink node 2318(v) then communicates the result to the sink node 2318(u) integrated with the originating source node 2312(u). If the result indicates acceptance (step 4528), the primary switch unit 2340 also communicates information identifying the reserved time slots for the connection.

If the result indicates that a simple path through the primary switch unit is available, the connection is setup, and the time slots allocated to the connection are reserved. The process then returns to step 4520 to process a new connection request. If a simple path is not available, step 4528 directs the process to step 4530 where another outbound port, $\pi_1$, of the source node 2312(u) is used to start a compound path. Thus, in step 4532, a request for a compound path, herein referenced as a "type-1 connection request", is send to a controller of a switch unit, herein called the "current switch unit" 2340, to which outbound port $\pi_1$ connects through an outbound channel 2314. In step 4534, the controller of the current switch unit attempts to establish a first path segment of a compound path. Details of step 4534 are provided in FIG. 46.

If the result of step 4534 indicates that a path starting from outbound port $\pi_1$ is not available (step 4536), step 4530 is revisited to select another outbound port $\pi_1$ if it is determined in step 4542 that at least one outbound port of the originating source node has not yet been considered. If step 4542 indicates that all outbound ports have been considered, a rejection message is communicated and step 4520 is revisited to process a new request. Otherwise, if the result of step 4534 indicates that a path starting from outbound port $\pi_1$ is available (step 4536), step 4534 returns an identifier of an intermediate sink node 2318(w) and identifiers of corresponding $\sigma$ time slots. In step 4537, the intermediate source node 2312 (w) integrated with intermediate sink node 2318(w) is identified. Like any other source node, the intermediate source node 2312(w) has a control path to each sink node 2318. In step 4538, detailed in FIG. 47, the intermediate source node 2312(w) attempts to establish a complementing path-segment through a switch unit 2340 in column $\chi_0$.

If in step 4538 it is determined that the complementing path is available (step 4540), an acceptance message is communicated to the originating source node and a new connection request may be processed (step 4520). It is noted that the process described in FIG. 45 may be pipelined in a manner which permits concurrent processing of two or more connection requests.

FIG. 46 details step 4534. In step 4620, the controller of the current switch unit selects a current outward port and step 4622 identifies a sink node 2318(w) to which the current outward port connects. Sink node 2318(w) may, however, be excluded if its associated source node 2312(w) has a channel to the primary switch unit. The reason is that step 4622 is reached only after it has been determined that the connection cannot be established through the primary switch unit. Thus, a list of identifiers (serial numbers) of edge nodes each having an outbound channel to the primary switch unit is formed, and the current switch unit selects an outward port that leads to an edge node that is not included in the list of edge nodes connecting to the primary switch unit. If it is determined in step 4624 that the source node 2312(w) connects to the primary switch unit, and if step 4630 determines that at least one outward port of the current switch unit has not yet been considered, step 4620 is revisited to select a new outward port. If it is determined in step 4624 that the source node 2312(w) does not connect to the primary switch unit, the controller of the current switch unit performs a temporal matching process to allocate $\sigma$ time slots through the current switch unit between an inward port connecting to source node 2312(u) and the current outward port. If successful, step 4534 is considered complete and the process continues to step 4536 of FIG. 45. If the temporal matching process of step 4626 fails to allocate $\sigma$ time slots for the connection, and if step 4630 determines that another outward port may be tried, step 4620 is revisited; otherwise an indication of unavailability of a first-path segment is returned to step 4536 of FIG. 45.

FIG. 47 details step 4538. In step 4720, the intermediate source node 2312(w) identifies an outbound channel to a switch unit in column $\chi_0$ and sends a type-0 to the switch unit. The type-0 connection request identifies the destination sink node 2318(v) and indicates the required number $\sigma$ of time slots per time frame. In step 4730, the controller of the switch unit identifies an outward port connecting to the destination sink node 2318(v). In step 4740, controller of the switch unit performs a time-slot matching process to allocate $\sigma$ time slots along an internal path within the switch unit connecting the outbound channel of the intermediate source node and the outward port leading to the destination sink node 2318(v).

Figure 48:
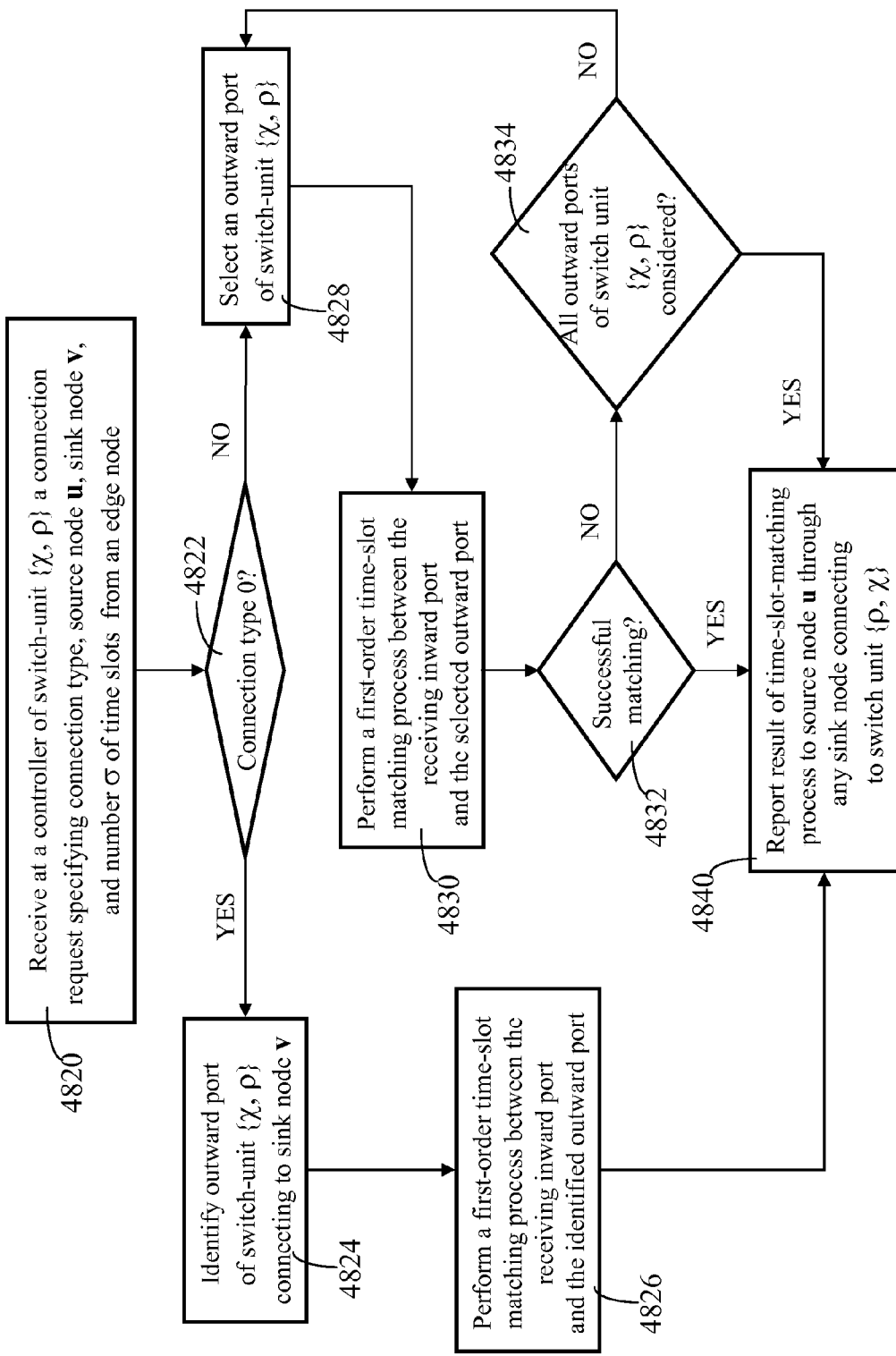
FIG. 48 is a flow chart illustrating steps of connection setup implemented by a controller of a switch unit in accordance with an embodiment of the present invention.

FIG. 48 illustrates steps of a temporal matching process performed by a controller of a switch unit 2340($\chi$,$\rho$) identified by the coordinates $\chi$ and $\rho$, respectively representing a column number and a row number in switch-unit matrix 2310. In step 4820, the controller of switch unit 2340{$\chi$,$\rho$} receives a connection request indicating a connection type and parameters {u, v, $\sigma$} indicating a source node 2312(u), a sink node 2318(v), and a number of time slots $\sigma$ to be reserved per time frame. In a type-0 connection, an output port of switch unit 2340{$\chi$,$\rho$} is specified or implied; the specified output port leads to the destination sink node. In a type-1 connection, any output port of switch unit 2340{$\chi$,$\rho$} may be selected. A type-0 connection applies to a simple path from the originating source 2312(u) node to the destination sink node 2318(v), or to the second part of a compound path from an intermediate edge node to the destination sink node. A type-1 connection applies to the first part of a compound path where any sink node connecting to switch unit 2340{$\chi$,$\rho$} may be used as an intermediate sink node.

Step 4822 directs a type-0 connection request to step 4824 and directs a type-1 connection request to step 4828. In step 4824, the switch-unit controller identifies the outward port of the switch unit 2340{$\chi$,$\rho$} which has an outward channel to sink node 2318(v). In step 4826, a temporal matching process is performed between the inward channel and the outward channel. The result is reported to the originating source node 2312(u) in step 4840. In step 4828, the switch-unit controller selects a candidate outward port and in step 4830, a temporal matching process is performed in a manner similar to that of step 4826. If the temporal-matching process is successful, the result is reported in step 4840; otherwise, step 4832 directs the computation to step 4834 which determines whether another outward port may be considered. If all outward ports have been considered, step 4834 directs the procedure to step 4840; otherwise, step 4834 directs the procedure to step 4828 which selects another outward port and repeat steps 4830 and 4832. A connection from a data source to a data sink, where both connect to a common edge node, is switched through the edge node without traversing a switch unit 2340 (or 2740).

Switch Dimension and Capacity

Using switch units 2340 each of dimension m×m and integrated edge nodes 2312/2318 where each edge node has η input ports divided into ν inbound ports connecting to ν switch units and (η−ν) ingress ports connecting to data sources, and μ output ports divided into ν outbound ports connecting to ν switch units and (μ−ν) egress ports connecting to data sinks (μ=ν), the maximum number of edge nodes would be ν×m, and the total number of ingress ports (or egress ports) would be (μ—ν)×ν×m. For example, with m=255, ν=20, the maximum number of edge nodes in the switching node would be 5100. With (μ—ν)=12, the maximum number of dual outer ports interfacing with data sources and sinks (each outer port comprising an ingress port and an egress port) would be 12×20×255=61200, i.e., the overall maximum dimension of the switching node is 61200×61200. With a port capacity of 10 Gb/s in each direction (ingress or egress), the maximum access capacity of the switching node exceeds 600 terabits per second. With μ=64, ν=40, and m=511, the overall maximum dimension of the switching node is 490560×490560 and with a port capacity of 10 Gb/s, the maximum access capacity of the switching node exceeds 4900 terabits per second.

Internal Routing

In operation, a source edge node receives a connection request specifying a destination terminal (a sink). The request includes the address of a destination terminal. In a switching node 2700 having multiple switching planes 2750, the source node first selects a switch plane 2750, based on a preference order, some load balancing strategy, or both. The source edge node then determines, from the address of the destination terminal, an identifier of the destination edge node which supports the destination terminal and examines a routing table which directly indicates the relative identifier of the switch unit, within a selected switch plane, which connects to the destination edge node. The source edge node then sends a connection request to the identified switch unit.

Switch Growth

Using switch units of dimension m×n arranged in a μ×ν matrix having μ columns and ν rows, and where each source node has μ channels connecting to switch units in different columns and each sink node has ν channels connecting to a switch unit in each row, the maximum number of source nodes that can be connected to the matrix is m×ν and the maximum number of sink nodes that can be connected to the matrix is n×μ. To grow the switch from an initial dimension and capacity, i.e., to increase the number of installed ingress ports which receive data from data sources and the number of installed egress ports which transmit data to data sinks, two approaches may be adopted. The first approach is to use expandable switch units 2340 or 2740 which permit increasing the dimensions m and n without service disruption. The second is to use expandable edge nodes (integrated source nodes and sink nodes) which permit increasing the number μ of columns and the number ν of rows without service disruption. A third approach to expanding the switch is to add a parallel matrix in the structure of FIG. 27. Each source node may have a channel to one switch unit 2740 in each column in each switch plane 2750 and each sink node is connected to each switch unit in a selected column in each switch plane. Preferably, for each sink node, the selected columns in different switch planes 2750 are likewise numbered to simplify the internal routing process. A combination of the three approaches may be employed.

Connectivity Configurations

In the preferred configuration described above with reference to FIG. 23 or FIG. 27, herein called "first configuration", each sink node is connected to each switch unit of a selected column of switch units and each source node connects to any switch unit in each column of switch units. The switch units to which a source node connects preferably belong to different rows. The requirement that a sink node connects to each switch unit in a selected column and that the source node connects to any switch unit in each column guarantees a simple path, traversing only one switch unit, from each source node 2312 to each sink node 2318 in switch 2300, or from each source node 2712 to each sink node 2718 through each switch plane 2750 of switch 2700. In an alternative configuration, herein called a "second configuration", each source node may connect to each switch unit in a selected column of switch units while each sink node connects to a switch unit in each column of switch units, and it is preferred in such configuration that the switch units to which a sink node is connected belong to different rows. This alternate configuration also guarantees a simple path, traversing only one switch unit, from each source node 2312 to each sink node 2318, or from each source node 2712 to each sink node 2718 through each switch plane 2750 of multi-plane switch 2700. Both the first configuration and the second configuration yield an agile switch which provides high performance regardless of the spatial distribution of traffic. However, the first configuration significantly simplifies internal routing because each destination sink node is associated with a single column.

Figure 49:
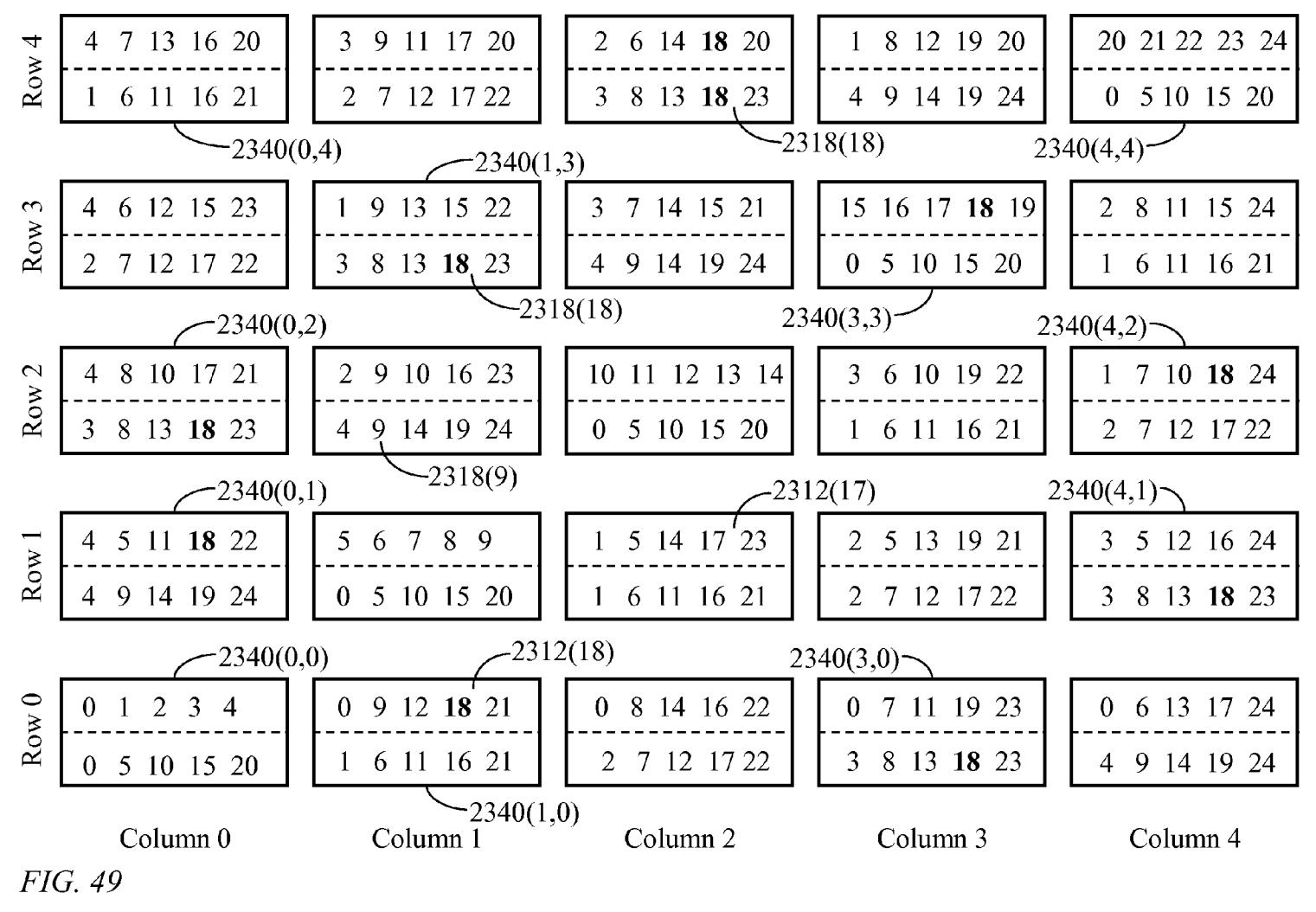

The above first and second configurations yielding an agile switch are only exemplary. Numerous other configurations may be devised to guarantee that each source node has a simple path to each sink node in the entire switch. FIG. 49 illustrates an alternative connectivity pattern of switch units 2340 of switch-unit matrix 2310 of FIG. 23 which guarantees a simple path from each source node 2312 to each sink node 2318. Identifiers of source nodes 2312 and identifiers of sink nodes 2318 connecting to each switch unit 2340 are listed in FIG. 49. The connectivity pattern of FIG. 49 relates to a switching node 2300 having 25 switch units 2340 arranged in five columns (μ=5) and five rows (ν=5). Each switch unit 2340 is of dimension 5×5, thus supporting up to 25 edge nodes 2312/2318 indexed as 0 to 24. The indices of a set of source nodes 2312 and a set of sink nodes 2318 connecting to each switch unit 2340 are indicated. A source node 2312 may connect to switch units 2340 of different rows and different columns in 2310, and a sink node may also connect to switch units of different rows and columns in switch-unit matrix 2310. For example, source node 2312(18) has outbound channels to switch units 2340(0,1), 2340(1,0), 2340(2,4), 2340(3, 3), and 2340(4,2) while sink node 2318(18) has inbound channels from switch units 2340(0,2), 2340(1,3), 2340(2,4), 2340(3,0), and 2340(4,1).

The 25 sets of source nodes 2312 connecting to the 25 switch units 2340 are mutually orthogonal with any two sets having at most one common source node. Each set of sink nodes 2318 connecting to any switch unit 2340 is orthogonal to each of the 25 sets of source nodes with an orthogonality index of 1. Orthogonal connectivity induces spatial balance of traffic loads.

Generalized Connectivity Pattern

The arrangement of switch units 340 in a matrix structure 310 and the pursuant connectivity of source nodes 312 and sink nodes 318 to the switch units simplify path search and setup of a connection. The matrix structure is only exemplary and other structures may be sought. A general connectivity pattern may be devised to provide a simple path, traversing one switch unit, and a predetermined number of non-intersecting compound paths which may be setup simultaneously from each source node to each sink node. In one realization, each source node may be associated with a respective set of µ switch units, herein called a primary set, and each sink node may be associated with a respective set of ν switch units, herein called a secondary set, where a primary set of any source node intersects a secondary set of any sink node in one common switch unit. Thus, a source node has an outbound channel to each switch unit of a respective primary set of µ switch units specific to the source node, and a sink node has an inbound channel from each switch unit of a respective secondary set of ν switch units specific to the sink node. To enable formation of compound paths, each source node is integrated with a respective sink node to form an edge node having an integrated switching fabric. Such a structure provides numerous compound paths, each traversing two switch units, from any source node to any sink node. The predetermined number of non-intersecting compound paths is the lesser of (µ−1) and (ν−1).

Preferably, the primary sets of switch units are selected to be mutually orthogonal. Thus, a primary set of µ switch units to which any source node connects and a primary set of µ switch units to which any other source node connects have at most a predefined number, preferably one, of common switch units. In the generalized connectivity pattern, as in the matrix-based connectivity pattern, each edge node (combining a source node and a sink node) has an edge controller and each switch unit has a switch-unit controller. The distribution of inward control signals from edge controllers to switch-unit controllers and outward control signals from switch-unit controllers to edge controllers is performed in a manner similar to that of the matrix-based structure.

Switch-Core Layout

Figure 50:
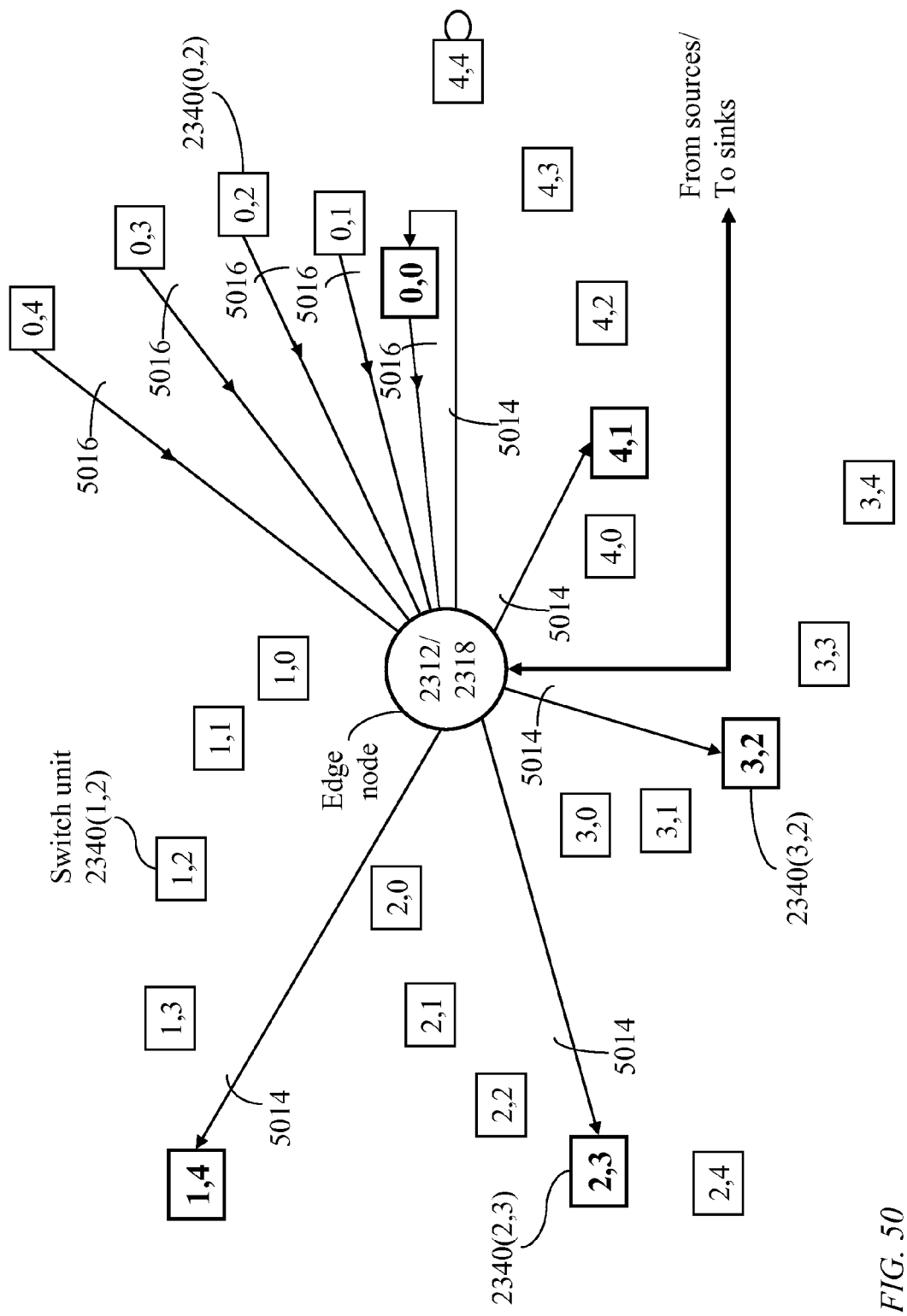
FIG. 50 illustrates connectivity of an edge node to switch units of the switch of FIG. 23 according to the arrangement of FIG. 25.

The core 2310 of switch 2300 and each switch plane 2750 of multi-plane switch 2700 comprises switch units logically arranged in a matrix form. The physical layout of the switch units may be influenced by design and packaging considerations, and the logical matrix representation is used mainly for ease of addressing and distribution of control signals. FIG. 50 illustrates switch units 2340 in an arbitrary layout, though individually indexed according to their column number and row number in the matrix structure of FIG. 23. Channels 5014 from a source node 2312 to switch units 2340(0,0), 2340(1,4), 2340(2,3), 2340(3,2) and 2340(4,1) correspond to channels 2314 to switch units 2340 in different rows and different columns in matrix 2310. Channels 5016 from switch units 2340(0,0), 2340(0,1), 2340(0,2), 2340(0,3), and 2340(0,4) to sink node 2318 integrated with the source node 2312 correspond to channels from switch units 2340 of a column to a sink node 2318. According to the switching method of the present invention, each source node has a switched simple path to each sink node and any logical arrangement of the independent switch units 2340 or 2740 which facilitates creation of simple paths from each source node to each sink node may be employed.

Asymmetrical Switching Node

Figure 51:
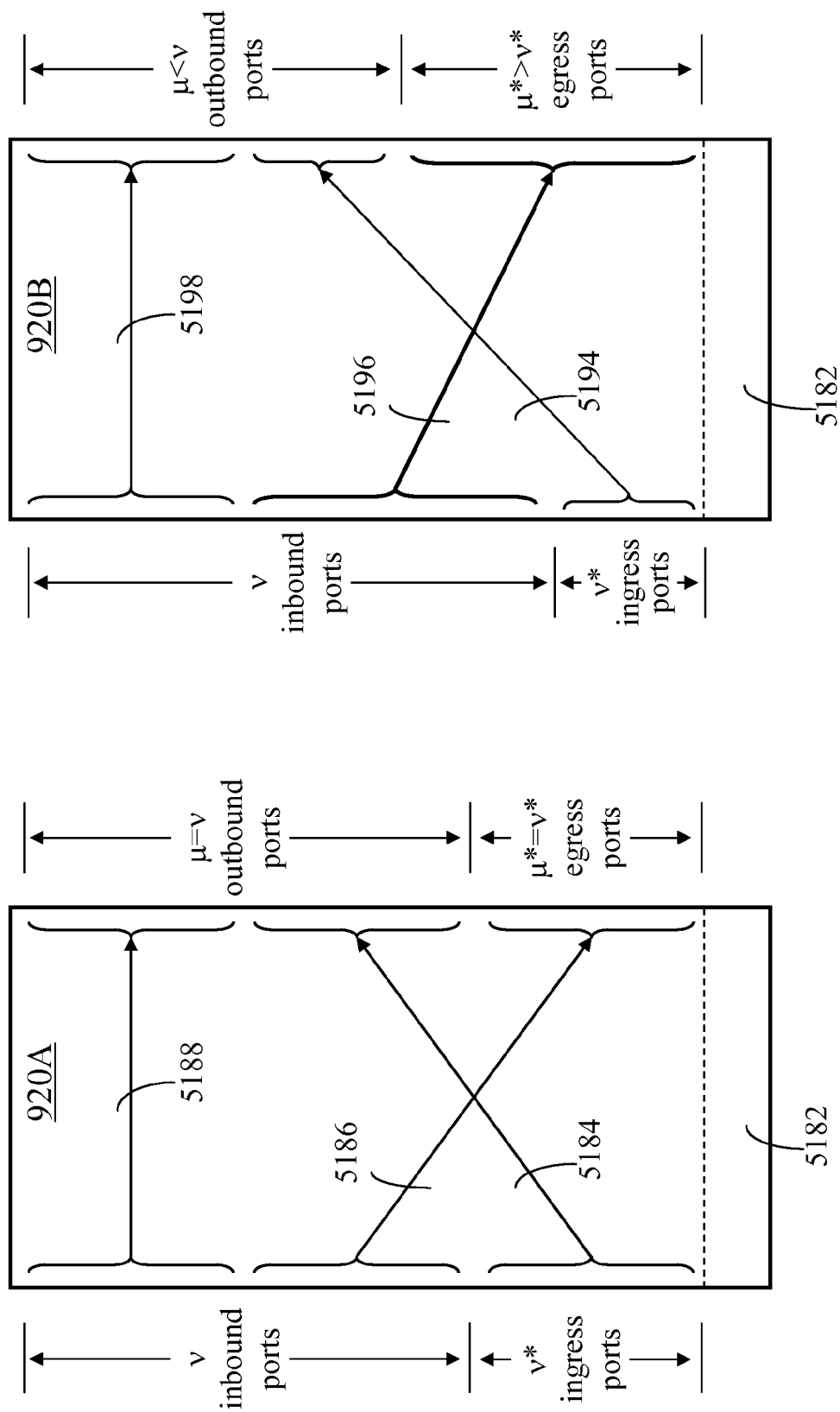
FIG. 51 illustrates an asymmetrical edge node.

As illustrated in FIG. 7, a switch 300 may be configured to have asymmetrical edge nodes each having a number ν of inbound ports that exceeds the number µ of outbound ports; µ and ν respectively represent the number of columns and the number of rows in matrix 310. With µ×n=ν×m, the number n of outward ports exceeds the number m of inward ports of a switch unit 340 if µ<ν. Additionally, edge node 312/318 has a number ν* of ingress ports for receiving data from data sources through ingress channels 306 and a number µ* of egress ports for transmitting data to data sinks as illustrated in FIG. 9. An edge node 312/318 may also have an input port (not illustrated) for receiving control data from an associated edge controller and an output port (not illustrated) for transmitting data to the associated edge controller. The ingress ports of all edge nodes collectively constitute the input ports of switching node 300, and the egress ports of all edge nodes collectively constitute the output ports of switching node 300. FIG. 51 illustrates access-capacity allocations in edge-node 900 of FIG. 9 integrating a source node and a sink node (312/318, 2312/2318, 2712/2718). Two edge-node switch-fabric configurations 920A and 920B, in which the total number of input ports equals the total number of output ports, are considered.

Configuration 920A is suitable where a connection from any source node has a single destination sink node, and data sources of an edge node initiate traffic at a flow rate approximately equal to the flow rate of the traffic directed to the sink nodes of the edge node. With the flow rate of internal traffic 5184 from ingress ports to outbound ports being approximately equal to the flow rate of internal traffic 5186 from inbound ports to egress ports, it would be appropriate to set ν*=µ* and ν=µ. The number ν of inbound ports of edge node 900 may exceed the number ν* of ingress ports, and the number µ of outbound ports may exceed the number µ* of egress ports because an edge node may switch transit traffic as described above. The flow-rate of transit traffic 5188 depends heavily on the spatial traffic distribution and decreases as more traffic is sent over simple connections.

In a particular switching node 300 (2300, 2700), a connection from an input port may be directed to more than one output port of the switching node and an edge node may receive more traffic than it sends; hence the number µ* of egress ports may exceed the number ν* of ingress ports as illustrated in switch-fabric configuration 920B. Thus, the flow rate of internal traffic flow 5194 from ingress ports to outbound ports would be less than the flow rate of internal traffic flow 5196 from inbound ports to egress ports. The flow-rate of transit traffic 5198 depends on the spatial traffic distribution as is the case in configuration 920A. In both configurations, 920A and 920B, control signals, represented by traffic flow 5182, may be switched to and from an edge-node controller.

Optical Switch Units

The edge nodes (integrated source nodes and sink nodes) are considered to be electronic based. The switch units are space switches which may be electronic or photonic based. If a switch unit is a photonic space switch, electrical-optical interfaces and optical-electrical interfaces would be needed. The selection of an electronic or photonic switch-unit fabric depends on several considerations including scalability and cost of interfaces. A single-stage electronic space switch of very large dimension, 4096×4096 for example, is realizable with the present state of the art. A single-stage fast switching photonic space switch may be limited to a relatively small dimension, 64×64 for example. A switch based on electronic switch units and in which all the edge nodes and switch units are collocated may not require internal Electrical-optical (E-O) or optical-electrical (O-E) interfaces. However, if the edge nodes are not collocated with the electronic switch units, and with the use of conventional optical transmission, such interfaces would be needed.

The invention has been described with reference to particular example embodiments. The described embodiments are intended to be illustrative and not restrictive. Further modifications may be made within the purview of the appended claims, without departing from the scope of the invention in its broader aspect.

What is claimed is:

1. A method of switching comprising:
arranging a plurality of switch units, each switch unit configured as an instantaneous space switch having a plurality of inputs and a plurality of outputs, into a matrix having a number of columns and a same number of rows;
connecting each node of a plurality of nodes to an input of a respective switch unit in each column of said matrix so that a first set of switch units, to inputs of which said each node connects, and a second set of switch units, to inputs of which any other node connects, have at most a predefined number of switch units in common;
connecting said each node to an output of every switch unit of a respective column of said matrix;
configuring a switch controller of said each switch unit to perform a temporal matching process to allocate a specified number of time slots, in a path from a designated input of said each switch unit to a designated output of said each switch unit, starting from a common reference time slot of a predefined slotted time frame; and
establishing, at a node controller of a selected node of said plurality of nodes, a connection of a requisite flow rate to a destination node of said plurality of nodes.

2. The method of claim 1 further comprising configuring said each node to:
receive data from external data sources;
receive data from switch units of said respective column;
transmit data to switch units of said first set of switch units; and
transmit data to external data sinks.

3. The method of claim 1 further comprising configuring said each node to provide non-blocking data transfer from said every switch unit of said respective column to each switch unit of said first set of switch units.

4. The method of claim 1 further comprising:
maintaining at said each node a routing table defining a set of compound paths to each other node, indicating for each compound path:
an identifier of an initial switch unit receiving data from said each node;
an identifier of an intermediate node;
an identifier of a terminating switch unit connecting said intermediate node to said each other node; and
an identifier of a switch unit connecting said each other node to said each node.

5. The method of claim 1 further comprising:
allocating non-coincident input control time slots of a slotted time frame for receiving input control signals at inputs of said each switch unit and successively transferring said input control signals to a switch controller of said each switch unit; and
allocating non-coincident output control time slots of said slotted time frame for successively transferring output control signals from said switch controller to outputs of said each switch unit.

6. The method of claim 5 further comprising selecting said non-coincident input control time slots to be identical for all switch units of a same column of said matrix and selecting said non-coincident output control time slots to be identical for all switch units of a same row of said matrix.

7. The method of claim 1 wherein said establishing comprises:
selecting at said node controller a preferred switch unit as a switch unit connecting directly to said destination node;
determining at said node controller said requisite flow rate as a requisite number of time slots in a predefined slotted time frame; and
performing, at a switch controller of said preferred switch unit, a first-order temporal matching process to determine availability of sufficient time slots to accommodate said requisite flow rate in a path from said selected node to said destination node through said preferred switch unit.

8. The method of claim 1 wherein said establishing comprises:
selecting at said node controller a candidate switch unit to an input of which said selected node connects; and
selecting at a switch controller of said candidate switch unit an intermediate node, of said plurality of nodes, connecting to a selected output of said candidate switch unit.

9. The method of claim 8 wherein said establishing further comprises:
determining said requisite flow rate as a requisite number of time slots in a predefined slotted time frame;
performing, at said switch controller of said candidate switch unit a first-order temporal matching process to determine availability of sufficient time slots to accommodate said requisite flow rate in a first path from said selected node to said intermediate node; and
performing, at a switch controller of a terminating switch unit connecting said intermediate node directly to said destination node, a first-order temporal matching process to determine availability of said sufficient time slots in a second path from said intermediate node to said destination node.

10. A method of switching comprising:
arranging a plurality of switch units, each switch unit having a plurality of inputs and a plurality of outputs, into a matrix having a number of columns and a same number of rows;
connecting each node of a plurality of nodes to an input of a respective switch unit in each column of said matrix so that a first set of switch units, to inputs of which said each node connects, and a second set of switch units, to inputs of which any other node connects, have at most a predefined number of switch units in common;
connecting said each node to an output of every switch unit of a respective column of said matrix;
configuring at least one node of said plurality of nodes as a circulating switch having a bank of switch elements interconnected through a first rotator and a second rotator, with each switch element having:
a dual access port;
a dual internal port connecting to said first rotator; and
a dual internal port connecting to said second rotator; and
establishing, at a node controller of a selected node of said plurality of nodes, a connection of a requisite flow rate to a destination node of said plurality of nodes.

11. The method of claim 10 further comprising:
configuring said each switch unit as an instantaneous space switch; and
configuring a switch controller of said each switch unit to perform a temporal matching process to allocate a specified number of time slots, in a path from a designated input of said each switch unit to a designated output of said each switch unit, starting from a common reference time slot of a predefined slotted time frame.

12. The method of claim 10 further comprising:
configuring said each switch unit as a latent space switch;
maintaining at said each node a routing table defining a set of paths to each other node, each path characterized by a respective systematic delay; and
in response to a connection request specifying a destination node and a requisite flow rate, selecting at said each node a path of least systematic delay having a sufficient vacancy.

13. The method of claim 10 further comprising maintaining at said each node descriptors of non-intersecting compound paths to each other node of said plurality of nodes, each compound path traversing an initial switch unit, connecting said each node to an intermediate node of said plurality of nodes, and a terminating switch unit connecting said intermediate node to a respective target node of said plurality of nodes.

14. A method of switching comprising:
arranging a plurality of switch units, each switch unit having a plurality of inputs and a plurality of outputs, into a matrix having a number of columns and a same number of rows;
connecting each node of a plurality of nodes to an input of a respective switch unit in each column of said matrix and an output of a respective switch unit in each row of said matrix so that:
  each pair of nodes of said plurality of nodes connects once to an input and an output of a same switch unit; and
  a set of nodes connecting to all inputs of any switch unit and a set of nodes connecting to all inputs of any other switch unit have a number of common nodes not exceeding a predefined upper bound;
and
establishing, at a node controller of a selected node of said plurality of nodes, a connection of a requisite flow rate to a destination node of said plurality of nodes.

15. The method of claim 14 further comprising:
reserving at each input of said each switch unit a number of input control time slots during each repetitive time frame having a number T of time slots, T>m, m being a number of inputs of said plurality of inputs;
reserving at each output of said each switch unit a number of output control time slots during said each repetitive time frame;
selecting said number of input control time slots to be at least 1 and at most $\lfloor T/m \rfloor$, where $\lfloor T/m \rfloor$ denotes the integer part of the ratio T/m; and
selecting said number of output control time slots to be at least 1 and at most $\lfloor T/m \rfloor$.

16. The method of claim 14 further comprising employing, at said each node, a table of compound paths from said each node to each other node of said plurality of nodes, for routing data from said each node to any other node of said plurality of nodes, each compound path traversing an initial switch unit to an intermediate node of said plurality of nodes and a terminating switch unit connecting said intermediate node to a target node of said plurality of nodes.

17. The method of claim 16 wherein said table indicates, for said each compound path:
an identifier of said initial switch unit;
an identifier of said intermediate node; and
an identifier of said terminating switch unit.

18. The method of claim 14 wherein said establishing comprises:
sending from said node controller of said selected node, over a control path to a switch controller of a preferred switch unit connecting directly to said destination node, a connection request specifying said destination node and said requisite flow rate;
performing, at said switch controller of said preferred switch unit, processes of:
  determining availability of a simple path to said destination node; and
  communicating a result of said determining to a node controller of said destination node;
and
communicating, from said node controller of said destination node, said result to said node controller of said selected node.

19. The method of claim 14 wherein said establishing comprises:
formulating at said node controller of said selected node a connection request specifying a compound path traversing an initial switch unit, an intermediate node, and a terminating switch unit, said intermediate node connecting to an output of said initial switch unit and an input of said terminating switch unit; and
forwarding said connection request from said selected node along said compound path.

* * * * *